US009219975B2

(12) United States Patent
Holman et al.

(10) Patent No.: US 9,219,975 B2
(45) Date of Patent: *Dec. 22, 2015

(54) SYSTEMS AND METHODS FOR RECEIVING GESTURE INDICATIVE DATA AT A LIMB WEARABLE

(71) Applicant: Elwha LLC, Bellevue, WA (US)

(72) Inventors: Pablos Holman, Seattle, WA (US); Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/072,207

(22) Filed: Nov. 5, 2013

(65) Prior Publication Data

US 2015/0031299 A1     Jan. 29, 2015

Related U.S. Application Data

(63) Continuation of application No. 14/071,116, filed on Nov. 4, 2013, which is a continuation-in-part of application No. 13/950,926, filed on Jul. 25, 2013, and a continuation-in-part of application No. 13/962,373, (Continued)

(51) Int. Cl.
*H04B 7/00* (2006.01)
*H04W 4/00* (2009.01)
(Continued)

(52) U.S. Cl.
CPC ............... *H04W 4/005* (2013.01); *H04B 1/385* (2013.01); *H04B 7/24* (2013.01); *H04B 2001/3861* (2013.01); *H04B 2001/3866* (2013.01); *H04W 4/008* (2013.01); *H04W 4/203* (2013.01)

(58) Field of Classification Search
CPC ......... H04B 1/385; H04B 7/26; H04W 4/008; H04W 8/005
USPC .................. 455/41.1, 41.2, 63.4, 66.1, 550.1, 455/556.1, 557, 134, 135, 334
See application file for complete search history.

(56) References Cited

U.S. PATENT DOCUMENTS

| 6,711,414 B1 | 3/2004 | Lightman et al. |
| 6,771,224 B2 | 8/2004 | Apostolos |

(Continued)

OTHER PUBLICATIONS

PCT International Search Report; International App. No. PCT/US2014/048167; Nov. 4, 2014; pp. 1-3.

(Continued)

*Primary Examiner* — Tuan Pham

(57) ABSTRACT

Computationally implemented methods and systems include soliciting to provide to a limb wearable computing device from one or more functional devices that are within the communication range of the limb wearable computing device gesture indicative data that is indicative of one or more user gestures, the communication range being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary, the limb wearable computing device being designed to be worn around a limb of a user; and facilitating the limb wearable computing device to receive the gesture indicative data from the one or more functional devices. In addition to the foregoing, other aspects are described in the claims, drawings, and text.

39 Claims, 33 Drawing Sheets

Related U.S. Application Data filed on Aug. 8, 2013, which is a continuation of application No. 13/961,187, filed on Aug. 7, 2013, said application No. 14/071,166 is a continuation-in-part of application No. 14/017,693, filed on Sep. 4, 2013, now Pat. No. 9,037,087, which is a continuation of application No. 14/014,882, filed on Aug. 30, 2013, said application No. 14/071,116 is a continuation-in-part of application No. 14/044,576, filed on Oct. 2, 2013, which is a continuation of application No. 14/043,395, filed on Oct. 1, 2013, said application No. 14/071,116 is a continuation-in-part of application No. 14/059,036, filed on Oct. 21, 2013, which is a continuation of application No. 14/057,082, filed on Oct. 18, 2013.

(51) Int. Cl.
*H04B 1/3827* (2015.01)
*H04B 7/24* (2006.01)
*H04W 4/20* (2009.01)

(56) References Cited

U.S. PATENT DOCUMENTS

| | | | |
|---|---|---|---|
| 6,995,723 | B1 | 2/2006 | Adams |
| 7,500,747 | B2 | 3/2009 | Howell et al. |
| 7,715,873 | B1* | 5/2010 | Biere et al. ............... 455/557 |
| 7,929,914 | B2 | 4/2011 | Tegreene |
| 8,184,983 | B1 | 5/2012 | Ho et al. |
| 8,340,658 | B2 | 12/2012 | Tsui et al. |
| 8,430,310 | B1 | 4/2013 | Ho et al. |
| 8,442,542 | B2 | 5/2013 | Brisebois et al. |
| 8,489,546 | B2 | 7/2013 | Rappaport |
| 8,493,353 | B2 | 7/2013 | Blanchflower et al. |
| 8,493,849 | B2 | 7/2013 | Fuste Vilella et al. |
| 2002/0142734 | A1* | 10/2002 | Wickstead ............... 455/90 |
| 2012/0194399 | A1 | 8/2012 | Bily et al. |
| 2012/0195464 | A1 | 8/2012 | Ahn |
| 2012/0250615 | A1 | 10/2012 | Gupta et al. |
| 2013/0044130 | A1* | 2/2013 | Geisner et al. ............... 345/633 |
| 2013/0080616 | A1 | 3/2013 | Tsui et al. |
| 2013/0165138 | A1 | 6/2013 | Bahl et al. |
| 2014/0241540 | A1* | 8/2014 | Hodges et al. ............... 381/74 |
| 2015/0031286 | A1* | 1/2015 | Holman et al. ............... 455/39 |
| 2015/0031290 | A1* | 1/2015 | Holman et al. ............... 455/41.2 |
| 2015/0031291 | A1* | 1/2015 | Holman et al. ............... 455/41.2 |
| 2015/0031292 | A1* | 1/2015 | Holman et al. ............... 455/41.2 |
| 2015/0031293 | A1* | 1/2015 | Holman et al. ............... 455/41.2 |
| 2015/0031294 | A1* | 1/2015 | Holman et al. ............... 455/41.2 |
| 2015/0031295 | A1* | 1/2015 | Holman et al. ............... 455/41.2 |
| 2015/0031296 | A1* | 1/2015 | Holman et al. ............... 455/41.2 |
| 2015/0031297 | A1* | 1/2015 | Holman et al. ............... 455/41.2 |
| 2015/0031298 | A1* | 1/2015 | Holman et al. ............... 455/41.2 |
| 2015/0031299 | A1* | 1/2015 | Holman et al. ............... 455/41.2 |
| 2015/0031300 | A1* | 1/2015 | Holman et al. ............... 455/41.2 |
| 2015/0031301 | A1* | 1/2015 | Holman et al. ............... 455/41.2 |

OTHER PUBLICATIONS

Brown, Michael, "Meet 60GHz Wi-Fi, the insanely fast future of wireless networking," PC World, Mar. 6, 2013, 4 pages, http://www.pcworld.com/article/2030041/meet-60ghz-wi-fi-the-insanely-fast-future-of-wireless-networking.html.

Experton Group, "Bluetooth to Decide on 60GHZ Standard this Month," Experton Group, Apr. 19, 2010, 1 page, http://www.experton-group.com/nc/home/itnews/itnewsarticle/article/bluetooth-to-decide-on-60ghz-standard-this-month.html.

mmWAVES, "60GHz Wireless Technology Overview," 2013, 4 pages, http://www.mmwaves.com/products.cfm/product/20-194-0.htm, accessed Jul. 25, 2013.

Stevens et al., "White Paper: The Benefits of 60 GHz Unlicensed Wireless Communications," Dec. 2011, 10 pages, Sub10 Systems Limited, http://www.sub10systems.com/wp-content/uploads/2011/03/White-Paper-Benefits-of-60GHz.pdf.

University of California, Berkely, "60 GHz Short-Range Wireless Communication," Connectivity Lab, Feb. 2008, 1 page, http://connectivitylab.eecs.berkeley.edu/brochures/60ghz.pdf.

* cited by examiner

10* Limb Wearable Computing Device

20a Functional Device

Non-Augmented View 301

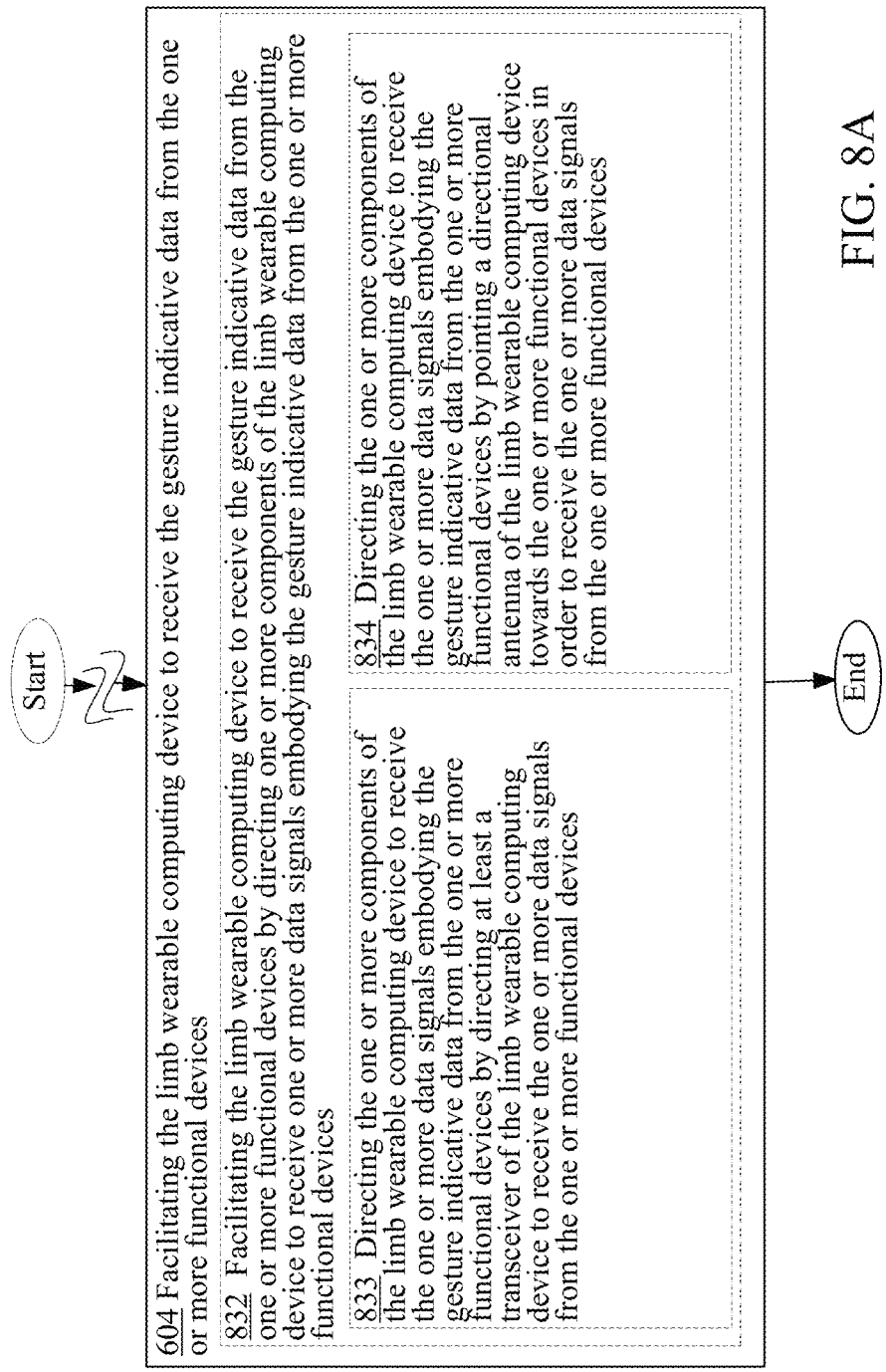

SYSTEMS AND METHODS FOR RECEIVING GESTURE INDICATIVE DATA AT A LIMB WEARABLE

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 14/071,116, entitled SYSTEMS AND METHODS FOR RECEIVING GESTURE INDICATIVE DATA AT A LIMB WEARABLE COMPUTING DEVICE, naming PABLOS HOLMAN; RODERICK A. HYDE; ROYCE A. LEVIEN; RICHARD T. LORD; ROBERT W. LORD; MARK A. MALAMUD; CLARENCE T. TEGREENE as inventors, filed 4, Nov. 2013, which is currently co-pending or is an application of which a currently co-pending application is entitled to the benefit of the filing date.

The present application constitutes a continuation-in-part of U.S. patent application Ser. No. 13/950,926, entitled SYSTEMS AND METHODS FOR PROVIDING ONE OR MORE FUNCTIONALITIES TO A WEARABLE COMPUTING DEVICE WITH SMALL FORM FACTOR, naming Pablos Holman, Roderick A. Hyde; Royce A. Levien; Richard T. Lord; Robert W. Lord; Mark A. Malamud; Clarence T. Tegreene as inventors, filed 25, Jul. 2013, which is currently co-pending or is an application of which a currently co-pending application is entitled to the benefit of the filing date.

The present application constitutes a continuation-in-part of U.S. patent application Ser. No. 13/962,373, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 8, Aug. 2013, which is currently co-pending or is an application of which a currently co-pending application is entitled to the benefit of the filing date, and which is a continuation of U.S. patent application Ser. No. 13/961,187, entitled SYSTEMS AND METHODS FOR PROVIDING ONE OR MORE FUNCTIONALITIES TO A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 7, Aug. 2013.

The present application constitutes a continuation-in-part of U.S. patent application Ser. No. 14/017,693, entitled SYSTEMS AND METHODS FOR PROVIDING ONE OR MORE FUNCTIONALITIES TO A WEARABLE COMPUTING DEVICE WITH DIRECTIONAL ANTENNA, naming Pablos Holman, Roderick A. Hyde; Royce A. Levien; Richard T. Lord; Robert W. Lord; Mark A. Malamud; Clarence T. Tegreene as inventors, filed 4, Sep. 2013, which is currently co-pending or is an application of which a currently co-pending application is entitled to the benefit of the filing date, and which is a continuation of U.S. patent application Ser. No. 14/014,882, entitled SYSTEMS AND METHODS FOR PROVIDING ONE OR MORE FUNCTIONALITIES TO A WEARABLE COMPUTING DEVICE WITH DIRECTIONAL ANTENNA, naming Pablos Holman, Roderick A. Hyde; Royce A. Levien; Richard T. Lord; Robert W. Lord; Mark A. Malamud; Clarence T. Tegreene as inventors, filed 30, Aug. 2013.

The present application constitutes a continuation-in-part of U.S. patent application Ser. No. 14/044,576, entitled SYSTEMS AND METHODS FOR COMMUNICATING BEYOND COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 2, Oct. 2013, which is currently co-pending or is an application of which a currently co-pending application is entitled to the benefit of the filing date, and which is a continuation of U.S. patent application Ser. No. 14/043,395, entitled SYSTEMS AND METHODS FOR COMMUNICATING BEYOND COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 1, Oct. 2013.

The present application constitutes a continuation-in-part of U.S. patent application Ser. No. 14/059,036, entitled SYSTEMS AND METHODS FOR SELECTING FOR USAGE ONE OR MORE FUNCTIONAL DEVICES DETECTED WITHIN A COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 21, Oct. 2013, which is currently co-pending or is an application of which a currently co-pending application is entitled to the benefit of the filing date, and which is a continuation of U.S. patent application Ser. No. 14/057,082, entitled SYSTEMS AND METHODS FOR SELECTING FOR USAGE ONE OR MORE FUNCTIONAL DEVICES DETECTED WITHIN A COMMUNICATION RANGE OF A WEARABLE COMPUTING DEVICE, naming Pablos Holman, Roderick A. Hyde; Royce A. Levien; Richard T. Lord; Robert W. Lord; Mark A. Malamud; Clarence T. Tegreene as inventors, filed 18, Oct. 2013.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, soliciting to provide to a limb wearable computing device from one or more functional devices that are within the communication range of the limb wearable computing device gesture indicative data that is indicative of one or more user gestures, the communication range being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary, the limb wearable computing device being designed to be worn around a limb of a user, and facilitating the limb wearable computing device to receive the gesture indicative data from the one or more functional devices. In various implementations, at least one of the soliciting or facilitating is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for soliciting to provide to a limb wearable computing device from one or more functional devices that are within the communication range of the limb wearable computing device gesture indicative data that is indicative of one or more user gestures, the communication range being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary, the limb wearable computing device being designed to be worn around a limb of a user, and means for facilitating the limb wearable computing device to receive the gesture indicative data from the one or more functional devices. In addition to the foregoing, other system aspects are described in the claims, drawings, and text forming a part of the disclosure set forth herein.

In one or more various aspects, a system includes, but is not limited to, circuitry for soliciting to provide to a limb wearable computing device from one or more functional devices that are within the communication range of the limb wearable computing device gesture indicative data that is indicative of one or more user gestures, the communication range being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary, the limb wearable computing device being designed to be worn around a limb of a user, and circuitry for facilitating the limb wearable computing device to receive the gesture indicative data from the one or more functional devices. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, soliciting to provide to a limb wearable computing device from one or more functional devices that are within the communication range of the limb wearable computing device gesture indicative data that is indicative of one or more user gestures, the communication range being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary, the limb wearable computing device being designed to be worn around a limb of a user, facilitating the limb wearable computing device to receive the gesture indicative data from the one or more functional devices, and facilitating the limb wearable computing device to receive the gesture indicative data from the one or more functional devices. In addition to the foregoing, other computer program product aspects are described in the claims, drawings, and text forming a part of the disclosure set forth herein.

In one or more various aspects, a system includes, but is not limited to, a functional device soliciting module configured to solicit, to provide to a limb wearable computing device that is designed to be worn around a limb of a user, gesture indicative data that is indicative of one or more user gestures from one or more functional devices that are within the communication range of the limb wearable computing device, the communication range of the limb wearable computing device being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary; a gesture indicative data receive facilitating module configured to facilitate the limb wearable computing device to receive the gesture indicative data from the one or more functional devices; and a device operating module configured to operate the limb wearable computing device based, at least in part, on the gesture indicative data provided by the one or more functional devices.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 8A is a high-level logic flowchart of a process depicting alternate implementations of the gesture indicative data reception facilitating operation 604 of FIG. 6.

DETAILED DESCRIPTION

Figure 1A:
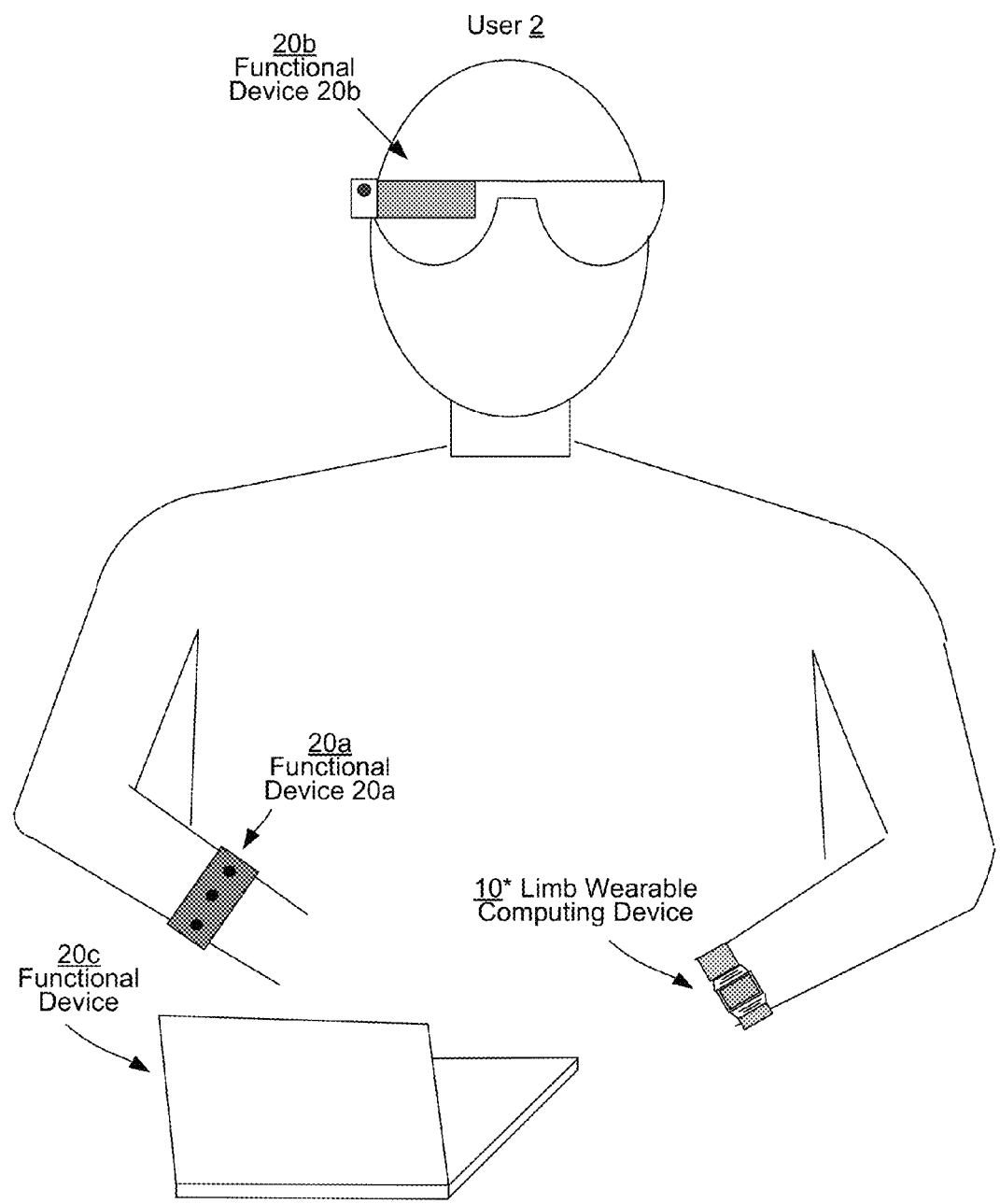
FIG. 1A illustrates an exemplary user 2 wearing multiple functional devices 20*a* and 20*b* and a limb wearable computing device 10*.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited to, physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The rapid advancement and miniaturization of integrated circuitry and microelectronics over the last three decades have greatly facilitated those in the mobile computing industry to develop functionally powerful computing/communication devices, from the original clunky brick-sized portable telephones to today's sleek cellular telephones and Smartphones, and from yesterday's bulky laptops to today's slim tablet computers and e-readers. One recent trend in the evolution of mobile computing is the development of wearable computing devices. That is, there are currently multiple efforts by various high-tech groups to develop computing/communication devices in the form of wearable computing devices. Such devices having very small form-factors that are designed to be worn by people and that will supposedly be able to provide various functionalities beyond simple time/chronograph functionalities including, for example, at least some communication capabilities (e.g., connectivity to Wi-Fi or cellular networks) and capabilities for executing applications (e.g., software programs). Examples of such wearable computing devices include, for example, augmented reality (AR) devices having the form of glasses or goggles (herein "computing glasses"), and computerized watches (herein "Smartwatches" or "limb wearable computing devices").

Although the recent advancements in the fields of integrated circuitry and microelectronics (e.g., microprocessors) make the eventual implementation of wearable computing devices a likely inevitability, developers of such devices still face a number of hurdles that may prevent such devices from being able to provide the same type of functionalities that larger mobile devices (e.g., Smartphones, tablet computers, and so forth) can provide. One of the problems faced by developers of wearable computing devices is to try to cram into such small form-factor devices all of the components that may be necessary in order to provide the same functionalities provided by larger mobile devices. That is, because a wearable computing device (e.g., an AR device or a Smartwatch) is designed to be worn by a user, it is generally preferable that such devices have relatively small form-factors and be relatively lightweight. As a result, such a device may only accommodate a small and/or limited number of core components including a power storage device (e.g., battery) that is relatively small (and as a result, with limited power storage capabilities) and light, and a relatively small communication system (e.g., a communication system that employs a small and/or limited number of antennas).

Another hurdle that must addressed with respect to limb wearable computing devices (i.e., Smartwatches) is the very small user interfaces (e.g., displays such as a touch screen) that may be employed by such devices which may make it difficult for users to provide input to such devices. In particular, and unlike larger mobile devices such as tablet computers and Smartphones, limb wearable computing devices can only accommodate relative small displays, thus it may be very difficult for such devices to employ, for example, touch screens. That is, because of the relative size of a user's fingers relative to the size of a display of a limb wearable computing device, integrating a small touch screen into such devices for inputting data may not make much sense.

Accordingly, systems, articles of manufacture and methods are provided herein that allow a limb wearable computing device (i.e., Smartwatch) to receive user input by having the limb wearable computing device receive gesture indicative data that is indicative of one or more user gestures (e.g., hand gestures) from one or more nearby functional devices (e.g., other wearable computing devices such as an AR device). In some embodiments, the received gesture indicative data may be used in order to, for example, control or direct the operations of the limb wearable computing device.

More particularly, the systems, articles of manufacture and methods may be designed to, among other things, solicit to provide to a limb wearable computing device from one or more functional devices that are within the communication range of the limb wearable computing device gesture indicative data that is indicative of one or more user gestures, the communication range being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary, the limb wearable computing device being designed to be worn around a limb of a user; and facilitate the limb wearable computing device to receive the gesture indicative data from the one or more functional devices. In some embodiments, the systems, articles of manufacture and methods may be further designed to operate or control the limb wearable computing device based, at least in part, on the gesture indicative data provided by the one or more functional devices.

Referring now FIG. 1A, which illustrates an exemplary user 2 wearing an exemplary limb wearable computing device 10*, which may be in communication with one or more functional devices 20*. Note that in the following, "*" represents a wildcard. Thus, references in the following description to, for example, "limb wearable computing device 10*" may be in reference to the example limb wearable computing device 10* of FIG. 1A, as well as to the example limb wearable computing device 10' of FIG. 4A or to the limb wearable computing device 10" of FIG. 4B, which are two different implementations of the limb wearable computing device 10* of FIG. 1A (as well as of FIGS. 2A, 2B, and 2C). Similarly, references to a functional device 20* may be in reference to the functional device 20a, functional device 20b, or functional device 20c of FIG. 1A (as well as of FIGS. 2A, 2B, and 2C).

Figure 1B:
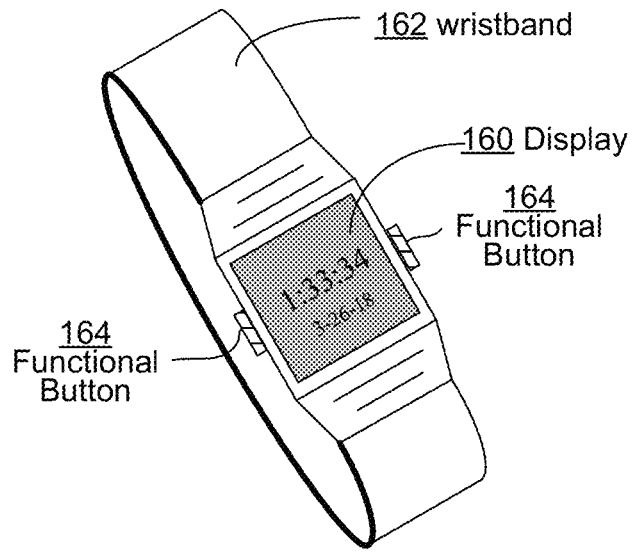
FIG. 1B shows a more detailed view of the limb wearable computing device 10* of FIG. 1A.

In various embodiments, the limb wearable computing device 10* of FIG. 1A may be in the form of a computerized watch (FIG. 1B provides a more detailed view of the limb wearable computing device 10*) with a display 160 (see FIG. 1B). The limb wearable computing device 10* may wirelessly communicate with the various functional devices 20* using, for example, an omnidirectional or directional antenna broadcasting low-power signals (e.g., signals transmitting using less than 0.8 milliwatt of transmit power). The use of a directional antenna such as a metamaterial antenna rather than an omnidirectional antenna may provide certain advantages such as minimizing power requirements for communicating with one or more functional devices 20*. Because metamaterial antennas are smaller than most conventional directional antennas, such antennas may be particularly suitable for use in a limb wearable computing device 10*, which need to have a small form factor.

In various embodiments, the limb wearable computing device 10* may wirelessly communicate with one or more functional devices 20* using, for example, the 2.4 GHz industrial, scientific and medical (ISM) frequency band (e.g., frequency range between 2.400 GHz and 2.4835 GHz), the 5 GHz ISM frequency band or the 5 GHz U-NII (Unlicensed National Information Infrastructure) frequency band (e.g., frequency range between 5.180 GHz and 5.825 GHz), or the 60 GHz (e.g., millimeter waveband or mmWave band with a frequency range between 57 and 64 GHz (U.S) or between 57 and 66 GHz (Japan and Europe)). Since it may be desirable in some cases to reduce or minimize the size of the communication range of the limb wearable computing device 10*, the 60 GHz frequency band may be employed for communication between the limb wearable computing device 10* and the one or more functional devices 20* since signals having frequencies from the 60 GHz frequency band tend to attenuate quickly in normal atmospheric conditions (e.g., attenuates quickly when passing through air and/or solid objects).

Figure 1C:
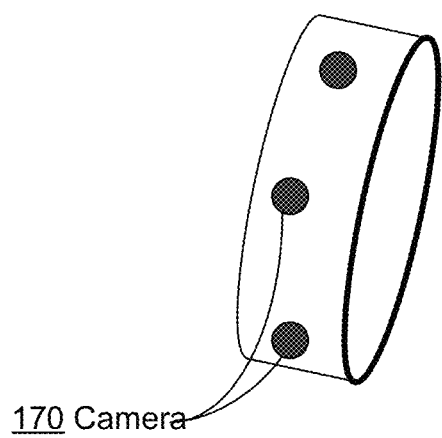
FIG. 1C shows a more detailed view of the functional device 20*a* of FIG. 1A, which is in the form of a wrist or arm band.

In various embodiments, each of the functional devices 20* illustrated in FIG. 1A may be endowed with one or more sensors for detecting/sensing gestures made by the user 2. Examples of sensors that may be employed by the functional devices 20* for sensing user gestures include, for example, visual sensors (visible or infrared cameras, black silicon sensors, and so forth), motion sensors (e.g., accelerometers, inertia sensors, gyro sensors, and so forth), electrical activity sensors such as electromyography (EMG) sensors for sensing electrical activities of muscles/tendons, and so forth. Note that for purposes of this description, the functional devices 20* are called "functional" devices because these devices provide sensor functionalities. Some of the functional devices 20* illustrated in FIG. 1A are actually wearable computing devices. For example, functional device 20a is a wearable computing device having the form of a wrist or arm band (see FIG. 1C, which a more detailed view of the functional device 20a). Note that although functional device 20a is a wearable device, it is not a fully functioning wearable computing device since it does not have a user interface. That is, and unlike the limb wearable computing device 10*, the functional device 20a does not include a display as illustrated in FIG. 1C. As will be further described herein, the functional device 20a may include a variety of different types of sensors for detecting hand and/or arm gestures including, for example, one or more cameras for capturing images of hand and/or arm gestures (gestures of the left arm) and one or more motion sensors for detecting the movements of right arm. Note that references in the following to "hand gestures" includes, in addition to overall hand gestures, finger gestures.

Figure 1D:
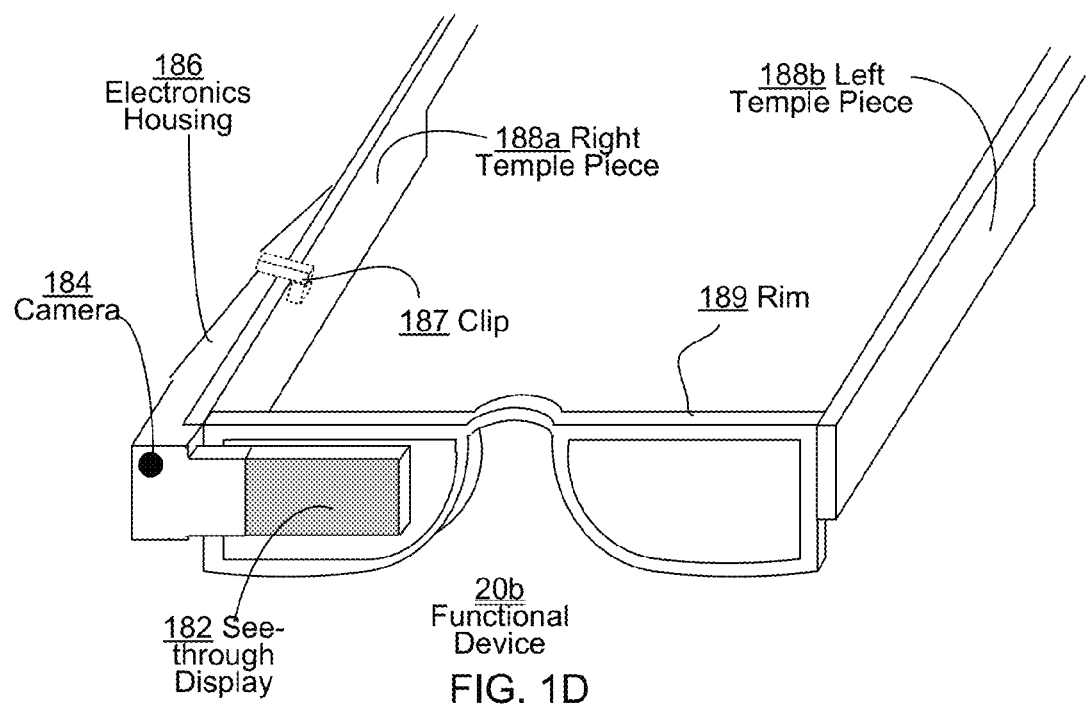
FIG. 1D shows a more detailed view of the functional device 20*b* of FIG. 1A, which is in the form of glasses.

Functional device 20b is yet another wearable computing device, but instead of being in the form of an arm or wrist band, this functional device 20b is in the form of glasses (see FIG. 1D, which is a more detailed view of the functional device 20b). In particular, functional device 20b may be an augmented reality (AR) device with a see-through display for providing augmented views of actual sceneries. The functional device 20b may include one or more cameras for detecting hand and/or arm gestures of the user 2. Functional device 20c is a laptop computer having at least one camera for capturing images of hand and/or arm gestures of the user 2. Although not depicted, the limb wearable computing device 10* may communicate with other types of functional devices 20* that may be near the limb wearable computing device 10* (e.g., within the communication range of the limb wearable computing device 10*) such as a desktop computer or a Smartphone. All of these functional devices 20* may be endowed with one or more sensor functionalities for sensing gestures of the user 2.

Turning particularly now to FIG. 1B, which shows a more detailed view of the limb wearable computing device 10* of FIG. 1A. The limb wearable computing device 10* may be in the form of a computer wristwatch and may include a display 160 and a wristband 162 for wrapping around the wrist/arm of a user 2 (e.g., coupling with the limb of the user 2). The display 160 may be a variety of displays including, for example, an LED display or liquid crystal display (LCD). In some embodiments, the limb wearable computing device 10* may comprise merely the watch portion of the computer wristwatch without the wristband 162 and one or more coupling components that couples with the wristband 162 (e.g., the wristband 162 portion of the computer wristwatch is optional). In various embodiments, the limb wearable computing device 10* may include one or more functional buttons 164 for activating or deactivating functionalities or for providing input. Note that the limb wearable computing device 10* includes at least one component (e.g., the wristband 162 of the limb wearable computing device 10* or a bar or clip to couple to the wristband 162) to facilitate coupling the limb wearable computing device 10* to the arm/wrist of the user 2.

Turning now to FIG. 1C, which illustrates a more detailed view of the functional device 20a of FIG. 1A. The functional device 20a as illustrated is in the form of an arm band or a wrist band and may include one or more sensors for detecting user gestures (e.g., hand and/or arm gestures). For example, in some embodiments, the functional device 20a may include one or more cameras 170 (e.g., visible light or infrared cameras, black silicon sensors, and so forth) for capturing images of a hand or an arm of the user 2 (e.g., the opposite arm other than the arm that the functional device 20a is wrapped around). In some embodiments, the functional device 20a may additionally or alternatively include one or more motion sensors (e.g., an accelerometer) for sensing the movements of the arm that the functional device 20a is coupled to and/or one or more electrical activity sensors (e.g., EMG sensors) for sensing electrical activities of the muscles of the arm that the functional device 20a is coupled to.

Referring now to FIG. 1D, which illustrates a more detailed view of the functional device 20b of FIG. 1A. The functional device 20b is illustrated as being in the form of computing glasses, which is another type of wearable computing device. The functional device 20b, in various embodiments, may be an augmented reality (AR) system or device. The functional device 20b may comprise a see-through display 182, a camera 184, an electronic housing 186 (which houses the electronics), and/or a frame that comprises a right temple piece 188a, a left temple piece 188b, and a rim 189. The right temple piece 188a and the left temple piece 188b are designed to extend to and wrap around the ears of the user 2 and to couple the functional device 20b to the head of the user 2. Note that in alternative implementations, the functional device 20b may take on the form of computing goggles rather than computing glasses, where the computing goggles employ a "regular" display such as a light emitting diode (LED) display rather than a see-through display 182. Note further that in some cases, functional device 20b may comprise merely the electronic housing 186 and the electronics housed by the electronic housing 186, the see-through display 182, the camera 184, and a coupling component such as an optional clip 187 for coupling to a frame (e.g., the rim 189 and the right temple piece 188a and the left temple piece 188b). That is, the rim 189 and the right and left temple pieces 188* are optional and may not necessarily be required in various alternative embodiments.

Figure 2A:
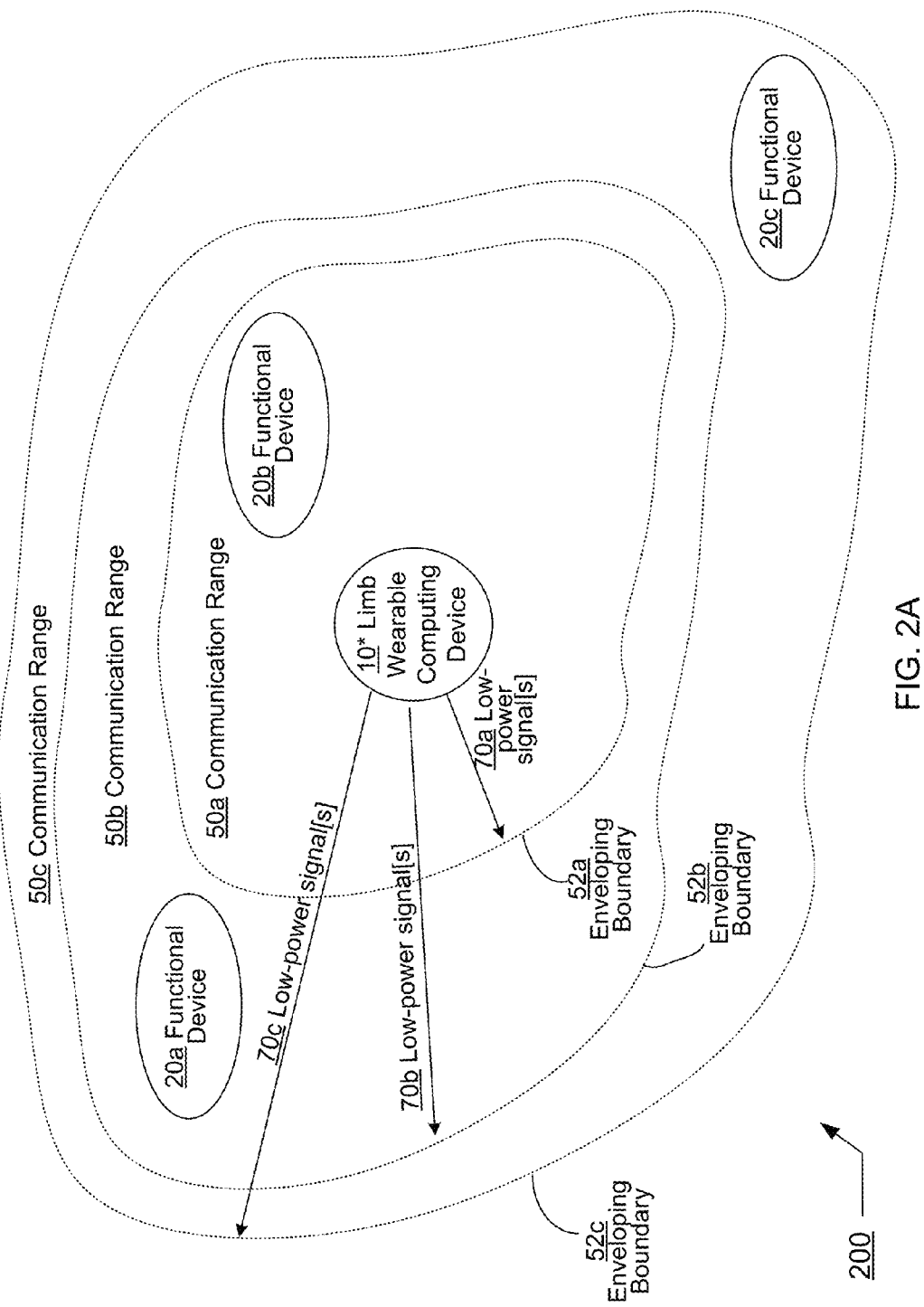
FIG. 2A is a high-level block diagram of one perspective of the limb wearable computing device 10* of FIG. 1A operating in an exemplary environment 200.
Figure 2B:
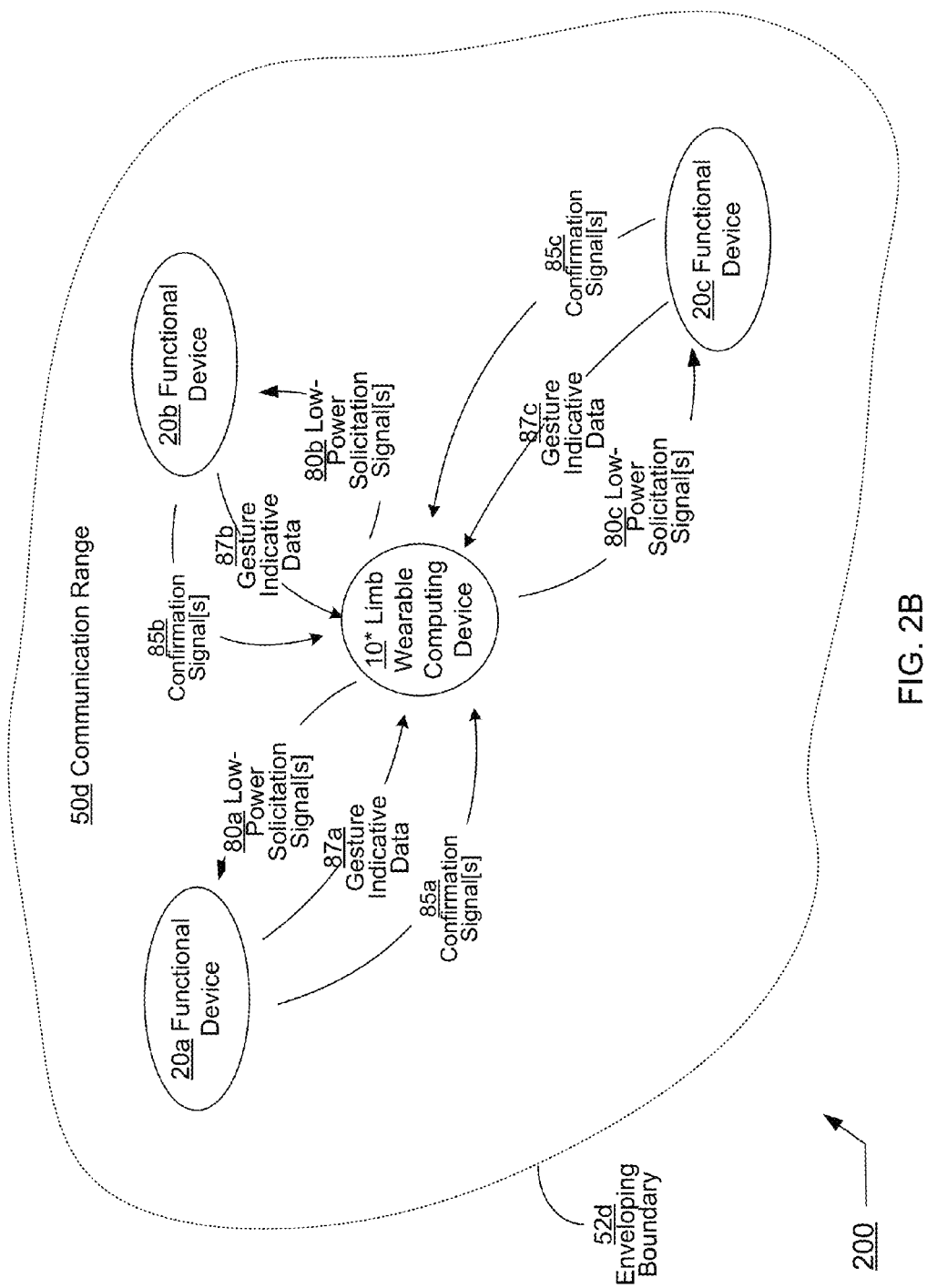
FIG. 2B is a high-level block diagram of another perspective of the example limb wearable computing device 10* operating in the exemplary environment 200.
Figure 2C:
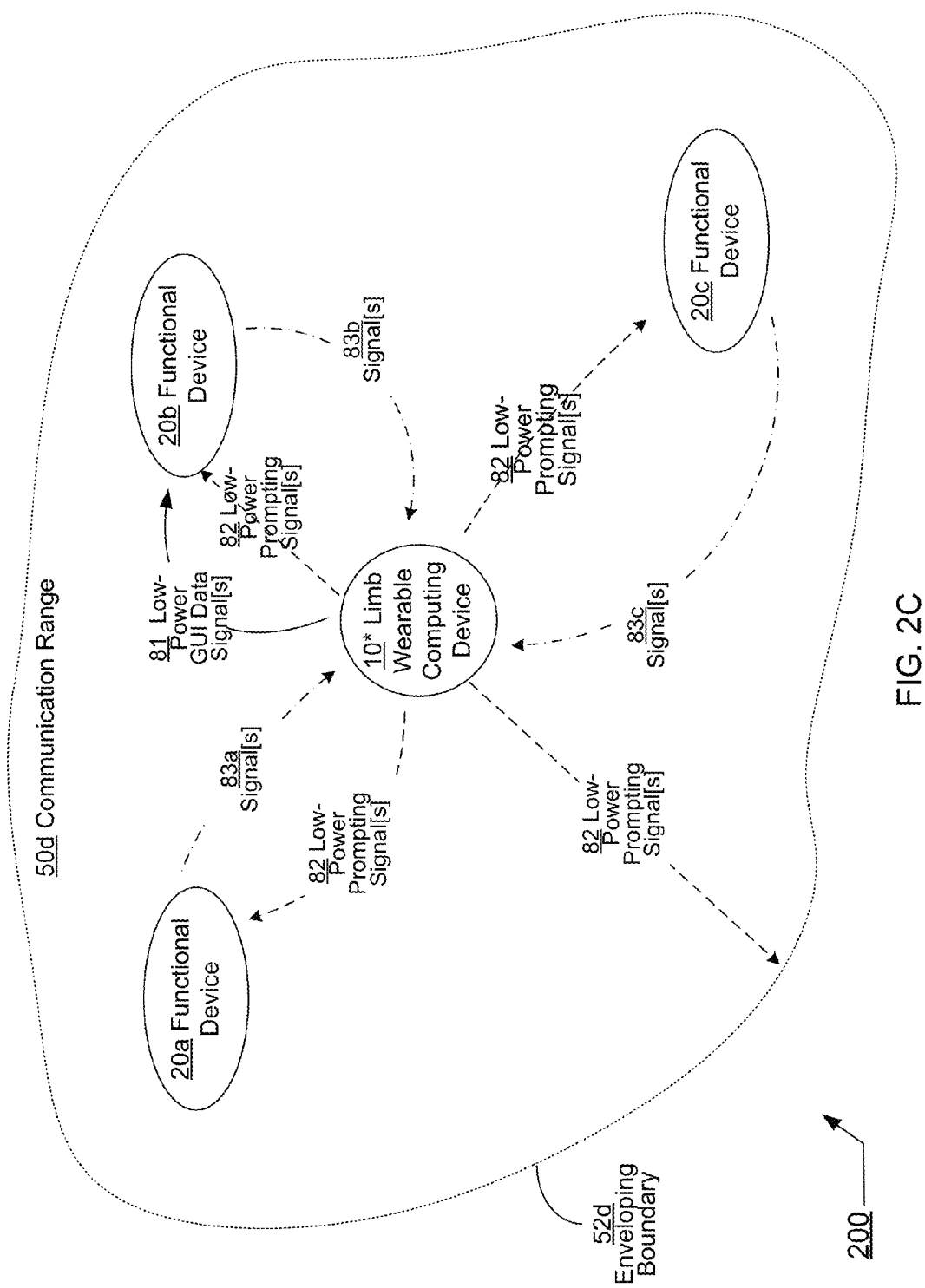
FIG. 2C is a high-level block diagram of still another perspective of the example limb wearable computing device 10* operating in the exemplary environment 200.

Referring now to FIGS. 2A, 2B, and 2C which are block diagrams of the limb wearable computing device 10* operating in an exemplary environment 200 in accordance with various embodiments. More particularly, FIGS. 2A, 2B, and 2C introduce the various concepts that may be relevant for understanding the various processes and operations to be described herein. Turning particularly now to FIG. 2A, which illustrates the one or more functional devices 20* of FIG. 1A being within the various communication ranges 50* (e.g., communication range 50a, communication range 50b, and communication range 50c) of the limb wearable computing device 10*. In various embodiments, a communication range 50* of the limb wearable computing device 10* is a spatial volume that surrounds the limb wearable computing device 10* and that is externally defined by an enveloping boundary 52*, where low-power signals 70* transmitted by the limb wearable computing device 10* being discernible over background noise (e.g., noise caused by background radiation) within the enveloping boundary and not discernible over background noise outside the enveloping boundary.

In various embodiments, references in the following to low-power signals 70* may be in reference to wireless signals that may be transmitted using a directional antenna (or a omnidirectional antenna) with substantially less than 1 milliwatt of transmit power such as 0.5 milliwatt of transmit power. Note that the shape of a communication range 50* will not be spherical in most cases since the size and shape of a communication range 50* will be affected by environmental conditions (e.g., atmospheric conditions) and the presence of various objects in the environment (e.g., people, walls, chairs, etc.).

In some embodiments, the limb wearable computing device 10* may be designed to transmit low-power signals 70* (e.g., low-power signals 70a, low-power signals 70b, and low-power signals 70c) at various levels of transmit powers up to some maximum amount of transmit power (e.g., up to 0.8 milliwatt of transmit power) in order to generate various sizes of communication ranges 50* (e.g., communication range 50a, communication range 50b, communication range 50c, and so forth). For example, the limb wearable computing device 10* may initially transmit one or more low-power signals 70a with a first transmit power (e.g., 0.1 milliwatt of transmit power) using a directional or omnidirectional antenna in order to create a first communication range 50a that surrounds the limb wearable computing device 10* and that is externally defined by enveloping boundary 52a. Because the first communication range 50a is relatively small, only functional device 20b may be able to detect the one or more low-power signals 70a transmitted by the limb wearable computing device 10* and to respond to it when detected.

In order to increase the size of its communication range 50*, the limb wearable computing device 10* may then transmit one or more low-power signals 70b with a second transmit power (e.g., 0.2 milliwatt of transmit power) using a directional or omnidirectional antenna in order to create a second communication range 50b that surrounds the limb wearable computing device 10* and that is externally defined by enveloping boundary 52b. Because the second communication range 50b is bigger than the first communication range 50a, both functional device 20a and functional device 20b may be able to detect the one or more low-power signals 70b transmitted by the limb wearable computing device 10* and to respond to it when detected. In order to further increase the size of its communication range 50*, the limb wearable computing device 10* may then further transmit one or more low-power signals 70c with a third transmit power (e.g., 0.3 milliwatt of transmit power) using a directional or omnidirectional antenna in order to create a third communication range 50c that surrounds the limb wearable computing device 10* and that is externally defined by enveloping boundary 52c. Because the third communication range 50c is even bigger than the second communication range 50b, functional devices 20a and 20b, as well as functional device 20c may be able to detect the one or more low-power signals 70c transmitted by the limb wearable computing device 10* and to respond to such low-power signals 70c when detected.

Referring now to FIG. 2B, which illustrates, among other things, how the limb wearable computing device 10* may broadcast to one or more nearby functional devices 20* that are within the communication range 50d of the limb wearable computing device 10* that is externally defined by enveloping boundary 52d one or more low-power solicitation signals 80* (e.g., low-power solicitation signals 80a, low-power solicitation signals 80b, and/or low-power solicitation signals 80c) for soliciting from the one or more nearby functional device 20* gesture indicative data 87* (e.g., gesture indicative data 87a, gesture indicative data 87b, and/or gesture indicative data 87c) that is indicative of one or more user gestures (e.g., hand and/or arm gestures). In various embodiments, the gesture indicative data 87* to be solicited may be obtained in a variety of different forms. For example, in some embodiments, the gesture indicative data 87* to be solicited may be in the form of one or more images of the user gestures, in the form of motion data indicating movements of the arm of the user 2, and/or in the form of electrical activity data that indicates electrical activities associated with the muscles/tendons of the arm of the user 2. Note that in some embodiments, the limb wearable computing device 10\* may employ a directional antenna such as a metamaterial antenna for communicating with the one or more nearby functional devices 20\*. As a result, the one or more functional devices 20\* (e.g., functional device 20*a*, functional device 20*b*, and functional device 20*b*) may each receive separate and distinct low-power solicitation signals 80\* (e.g., low-power solicitation signals 80*a*, low-power solicitation signals 80*b*, and/or low-power solicitation signals 80*c*) as the directional antenna points to the different functional devices 20\*.

In response to the one or more low-power solicitation signals 80\*, the one or more functional device 20\* may transmit to the limb wearable computing device 10\*, the gesture indicative data 87\* via one or more data signals. In some embodiments, the one or more low-power solicitation signals 80\* may be transmitted by the limb wearable computing device 10\* in order to obtain from the one or more functional devices 20\* that detects the one or more low-power solicitation signals 80\* one or more confirmations via one or more confirmation signals 85\* (e.g., confirmation signals 85*a*, confirmation signals 85*b*, and/or confirmation signals 85*c*) that confirms, among other things, that the one or more functional devices 20\* can indeed provide the gesture indicative data 87\*. In some cases, the one or more confirmations transmitted via the one or more confirmation signals 85\* may additionally or alternatively confirm that the one or more functional devices 20\* can provide specific types of gesture indicative data 87\* (e.g., image data or electrical activity data). In still other cases, other types of confirmations may be solicited from the one or more functional devices 20\* in various alternative embodiments as will be described herein.

Referring to FIG. 2C, which illustrates how a determination can be made as to whether one or more functional device 20\* are located within the communication range 50*d* of the limb wearable computing device 10\* based on one or more signals 83\* transmitted by the one or more functional devices 20\*. FIG. 2C, as will be further described, also shows how at least one functional device 20*b* (e.g., a functional device 20*b* that is in the form of a AR device with a display) may receive one or more low-power GUI data signals 81 from the limb wearable computing device 10\* that facilitates the at least one functional device 20*b* to display one or more graphical user interfaces (GUIs). As will be further described herein, such GUIs upon being displayed to a user 2 may prompt the user 2 to exhibit one or more gestures (e.g., hand and/or arm gestures) that may be detected by one or more sensors (e.g., cameras) of the functional device 20*b*.

There are at least two ways to determine whether there are any functional devices 20\* within the communication range 50*d* of the limb wearable computing device 10\* and/or which of a plurality of functional devices 20\* that are detected within the communication range 50*d* of the limb wearable computing device 10\* is or are nearest to the limb wearable computing device 10\* (e.g., which functional devices 20\* require the least or less power to communicate with by the limb wearable computing device 10\*). Both ways involves detection by the limb wearable computing device 10\* of one or more signals 83\* (which may be one or more "beacon signals" in some cases or, alternatively, may be one or more "responsive signals") transmitted by one or more functional devices 20\*.

The first possible way to determine whether there are any functional devices 20\* within the communication range 50*d* of the limb wearable computing device 10\* is to measure the signal strengths of one or more received beacon signals (e.g., signals 83\* of FIG. 2C) transmitted by one or more functional devices 20\* and received by the limb wearable computing device 10\*. That is, if each of the one or more functional devices 20\* transmit beacon signals (e.g., signals 83\* of FIG. 2C) with known transmit power or powers, then by determining the signal strengths of the beacon signals (e.g., signals 83\* of FIG. 2C) upon being received by the limb wearable computing device 10\*, a determination can be made as to which of the one or more functional devices 20\* that transmitted the beacon signals are in the communication range 50*d* of the limb wearable computing device 10\* and/or which of a plurality of functional devices 20\* that were determined to be near the limb wearable computing device 10\* (e.g., determined to be within the communication range 50*d* of the limb wearable computing device 10\*) are nearest to the limb wearable computing device 10\* (as well as the amount of transmit power needed by the limb wearable computing device 10\* in order to communicate with such devices).

That is, the amount of signal transmit power needed by the limb wearable computing device 10\* in order to communicate with the one or more functional devices 20\* may be determined based on the detected signal strengths of the beacon signals received by the limb wearable computing device 10\*. The stronger the signal strength of the received beacon signals (e.g., signals 83\* of FIG. 2C) received by the limb wearable computing device 10\* (which suggests that the one or more functional device[s] 20\* that transmitted the beacon signals are relatively close), the less transmit power may be needed by the limb wearable computing device 10\* in order to successfully communicate with the one or more functional device[s] 20\* that transmitted the beacon signals.

The second possible way of determining which functional devices 20\* are within communication range[s] 50\* of the limb wearable computing device 10\* and/or which of a plurality of functional devices 20\* that are detected near the limb wearable computing device 10\* are nearest to the limb wearable computing device 10\* is by having the limb wearable computing device 10\* transmit one or more low-power "prompting" signals 82 at various levels of low transmission power and wait to see if any of the functional devices 20\* respond to the prompting signals 82 after each transmission of the prompting signals 82 at each level of low transmission power. For example, the limb wearable computing device 10\* may initially transmit first low-power prompting signals 82 at a very low transmit power (e.g., 0.1 milliwatt of transmit power) that are designed to, upon being received/detected by a functional device 20\*, prompt the functional device 20\* that detects the first low-power prompting signals 82 to transmit back to the limb wearable computing device 10\* one or more "responsive" signals (e.g., one or more signals 83\* of FIG. 2C). After the transmission of the first low-power prompting signals 82, the limb wearable computing device 10\* may monitor for the one or more responsive signals (e.g., one or more signals 83\*) in order to determine whether any functional devices 20\* are nearby.

If the limb wearable computing device 10\* does not detect any responsive signals (e.g., one or more signals 83\*) from a functional device 20\* and/or if there is a need to find more functional devices 20\* (that may be further away from the limb wearable computing device 10\*) then the limb wearable computing device 10\* may repeat the above process by transmitting second low-power prompting signals 82 at a higher transmit power (e.g., 0.2 milliwatt of transmit power) than the first low-power prompting signal 82 and then monitoring for one or more responsive signals (e.g., one or more signals 83\*). This process may then be repeated over and over again for incrementally higher transmit powers in order to determine whether there are any functional devices 20\* near the limb wearable computing device 10\* within different communication ranges 50* of the limb wearable computing device 10*, to determine the amount of power needed to communicate with those functional devices 20* found nearby, and/or to determine which functional devices 20* are nearest to the limb wearable computing device 10* when multiple functional devices 20* are found nearby. In some cases, this process of transmitting prompting signals and monitoring for responsive signals may be part of a handshaking protocol. Note that this process of transmitting low-power prompting signals 82 at incrementally increasing amounts of transmit power is generally illustrated in FIG. 2A.

Figure 3A:
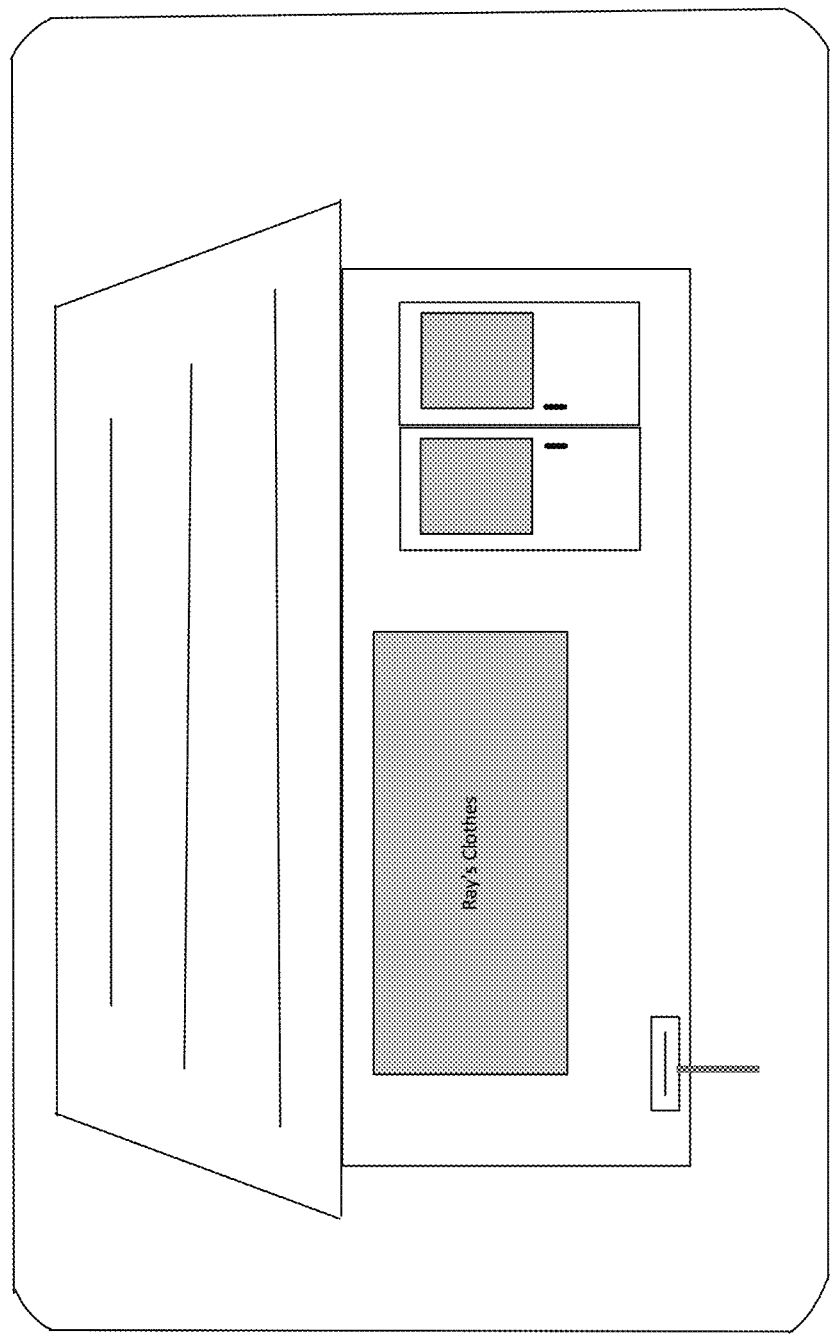
FIG. 3A shows an exemplary non-augmented view 301 of an actual storefront that may be displayed through the Augmented Reality (AR) device (e.g., functional device 20*b*) of FIG. 1A.
Figure 3B:
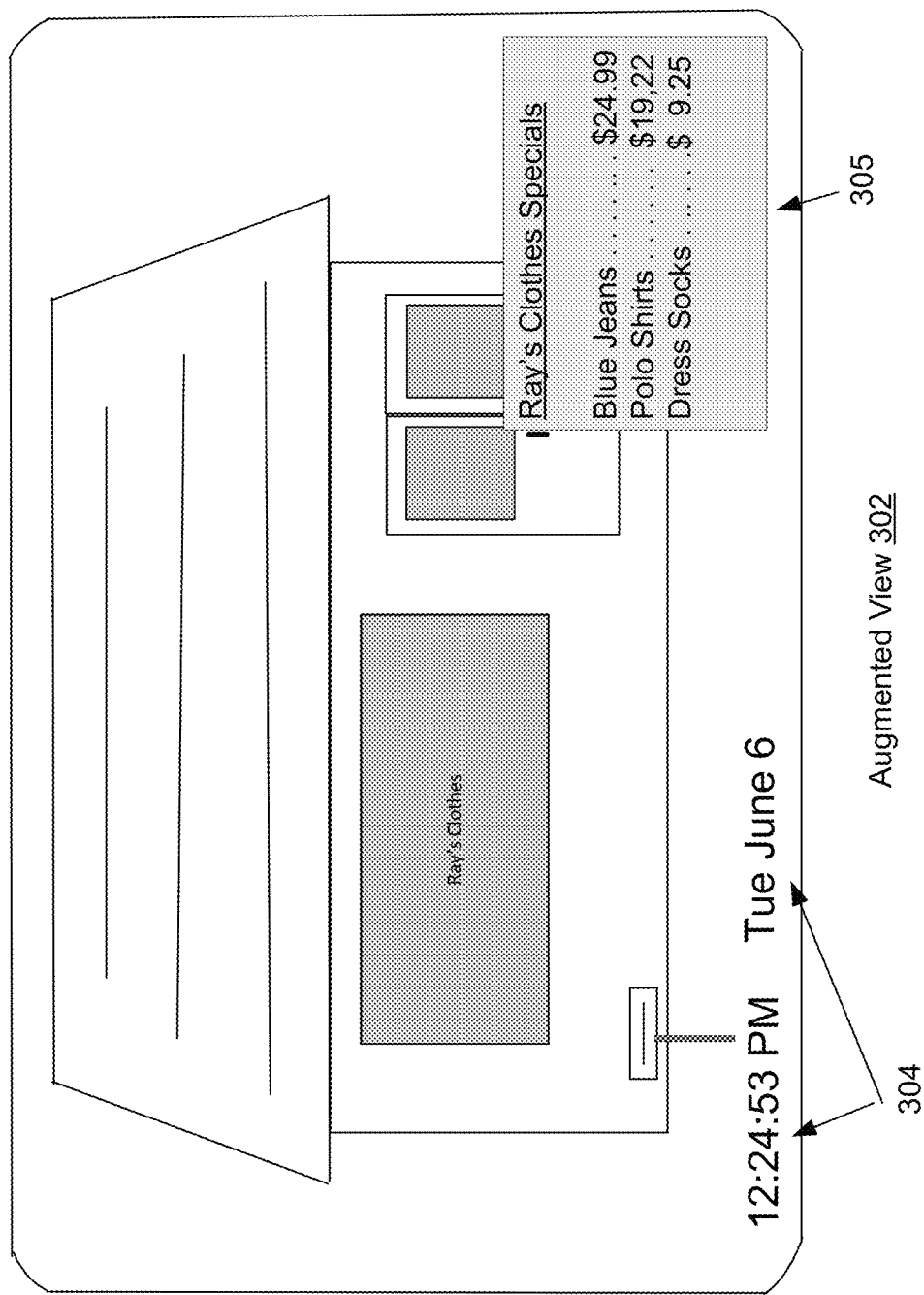
FIG. 3B shows an exemplary augmented view 302 that may be presented through the functional device 20*b* of FIG. 1A in accordance with some embodiments.

Turning now to FIG. 3A, which illustrates an example non-augmented view 301 of an actual scene of a storefront that may be displayed through the augmented reality (AR) device (e.g., functional device 20b) of FIG. 1A. Recall that functional device 20b may be in the form of computing glasses (e.g., as illustrated in FIG. 1D) and that may be designed to operate as an AR device. Referring now to FIG. 3B, which illustrates an augmented view 302 of the actual storefront scene depicted in FIG. 3A. In particular, the augmented view 302 includes textual information 304 (e.g., general chronograph information) and textual information 305 (e.g., sales information related to the store detected in the actual scenery) that may be displayed by the functional device 20b during the course of normal operations.

Figure 3C:
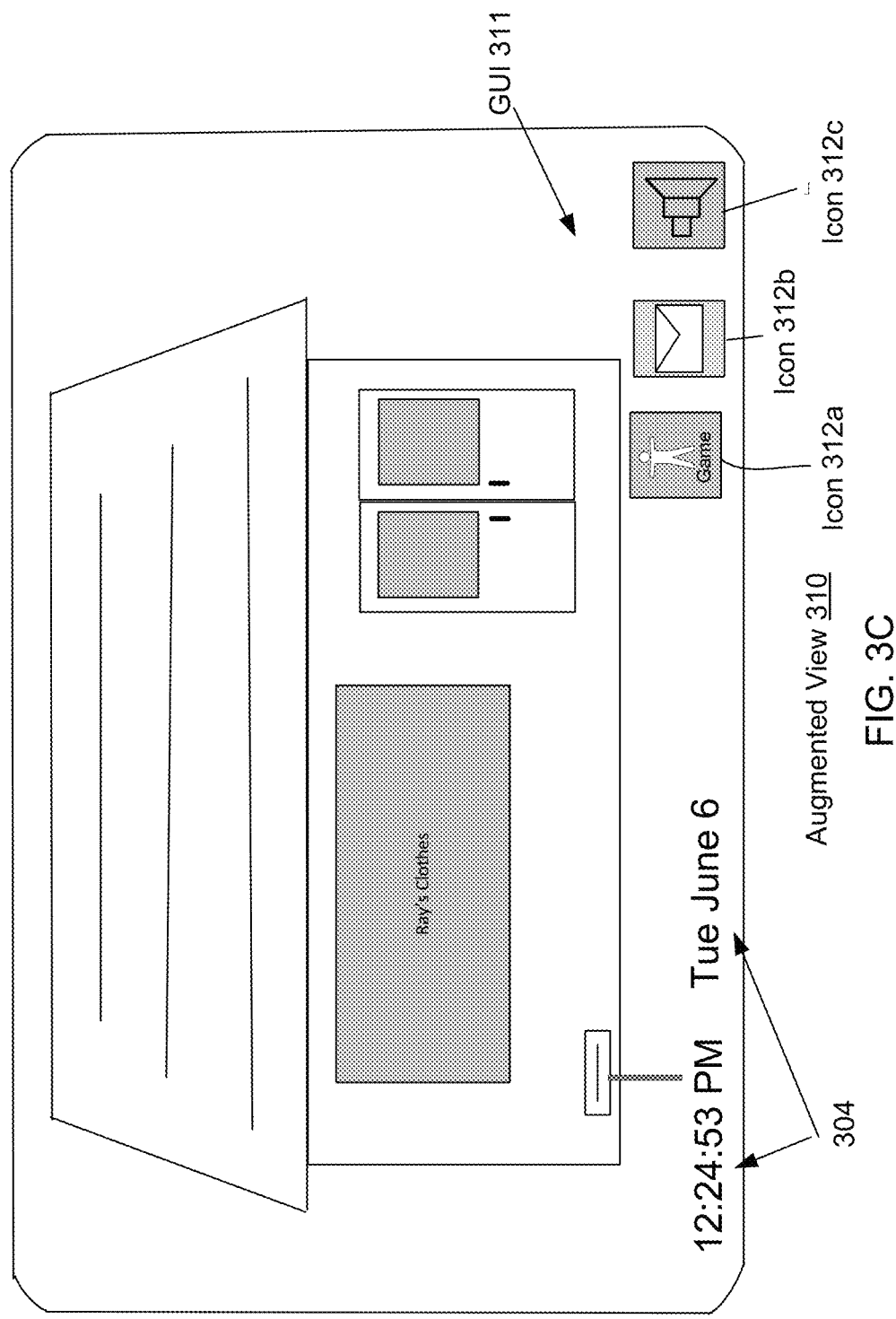
FIG. 3C shows another exemplary augmented view 310 that may be presented through the functional device 20*b* of FIG. 1A in accordance with some embodiments.
Figure 3D:
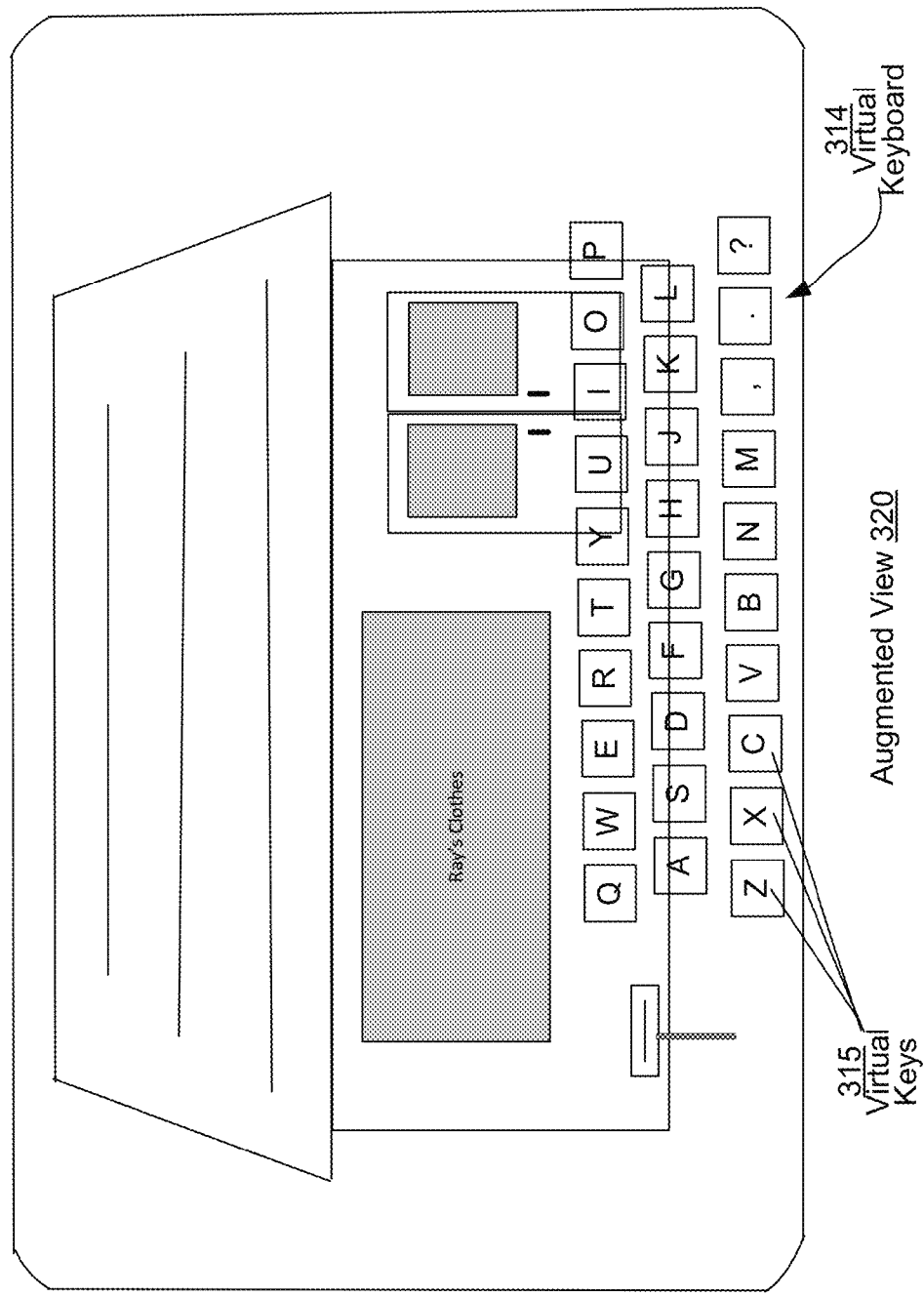
FIG. 3D shows another exemplary augmented view 320 that may be presented through the functional device 20*b* of FIG. 1A in accordance with some embodiments.

In contrast, FIGS. 3C and 3D illustrate exemplary augmented views 310 and 320 that may be displayed by the functional device 20b in response to the functional device 20b receiving one or more low-power GUI data signals 81 from the limb wearable computing device 10*. That is, in some embodiments, the limb wearable computing device 10* may be designed or configured to transmit to at least one functional device 20b that has an integrated display (e.g., an AR device such as functional device 20b as illustrated in FIG. 1D) one or more low-power GUI data signals 81 that cause the at least one functional device 20b to display one or more virtual elements (e.g., one or more icons and/or one or more GUIs) when the at least one functional device 20b receives the one or more low-power GUI data signals 81. For these embodiments, the one or more virtual elements may be displayed to a user 2, which when viewed by the user 2 may prompt the user 2 to exhibit or execute certain user gestures (e.g., hand or finger gestures) in order for the user 2 to provide user input. These user gestures may then be detected and/or recorded by the at least one functional device 20b and provided to the limb wearable computing device 20*.

Referring particularly now to FIG. 3C, which illustrates an augmented view 310 that may be displayed by a functional device 20b in response to the functional device 20b receiving one or more low-power GUI data signals 81 from, for example, the limb wearable computing device 10* (note that in some alternative embodiments the one or more low-power GUI data signals 81 may be received from another source other than the limb wearable computing device 10*). The augmented view 310 includes icon 312a, icon 312b, and icon 312c that may be selected by a user 2 for activating three different applications at the limb wearable computing device 10* rather than at the functional device 20b. For example, a user 2 may select any one of the three icons 312a, 312b, and 312c by executing one or more gestures (e.g., hand and/or arm gestures such as placing a finger over one of the icons and executing a pushing motion with the finger) in order to select an icon. The gestures executed by the user 2 may be visually captured by the camera 184 of the functional device 20b, and the resulting image data (e.g., gesture indicative data 87* of FIG. 2B) may then be transmitted to the limb wearable computing device 10*, which may then process the image data in order to, for example, activate an application. In this example, icon 312a may be selected for activating a gaming application, icon 312b may be selected for activating an email application, and icon 312c may be selected for activating an audio/music application. These applications may actually be integrated in the limb wearable computing device 10* rather than at the functional device 20b so activating any one of the applications would cause the selected application to be activated at the limb wearable computing device 10*.

Turning now to FIG. 3D, which illustrates another augmented view 320 that may be displayed by the functional device 20b in response to the functional device 20b receiving one or more low-power GUI data signals 81 from, for example, the limb wearable computing device 10*. The augmented view 320 includes a virtual keyboard 314 that further includes a plurality of virtual keys 315 for inputting data by a user 2. The user 2 may select any of the virtual keys 315 by making, for example, certain hand gestures relative to the virtual keys 315 (e.g., the user 2 may manipulate his hands so that his or her fingers are making pressing movements with respect to selective virtual keys 315). By executing such hand/finger gestures, the user 2 may input at least textual data. Note that although not depicted, in alternative embodiments, the virtual keys 315 may include keys for inputting numeric data rather than textual data input. The hand/finger gestures of the user 2 may be visually captured by the camera 184 of the functional device 20b, and the resulting image data (e.g., gesture indicative data 87* of FIG. 2B) may then be transmitted to the limb wearable computing device 10*, which may then process the image data in order to, for example, control the operations of the limb wearable computing device 10*.

Figure 4A:
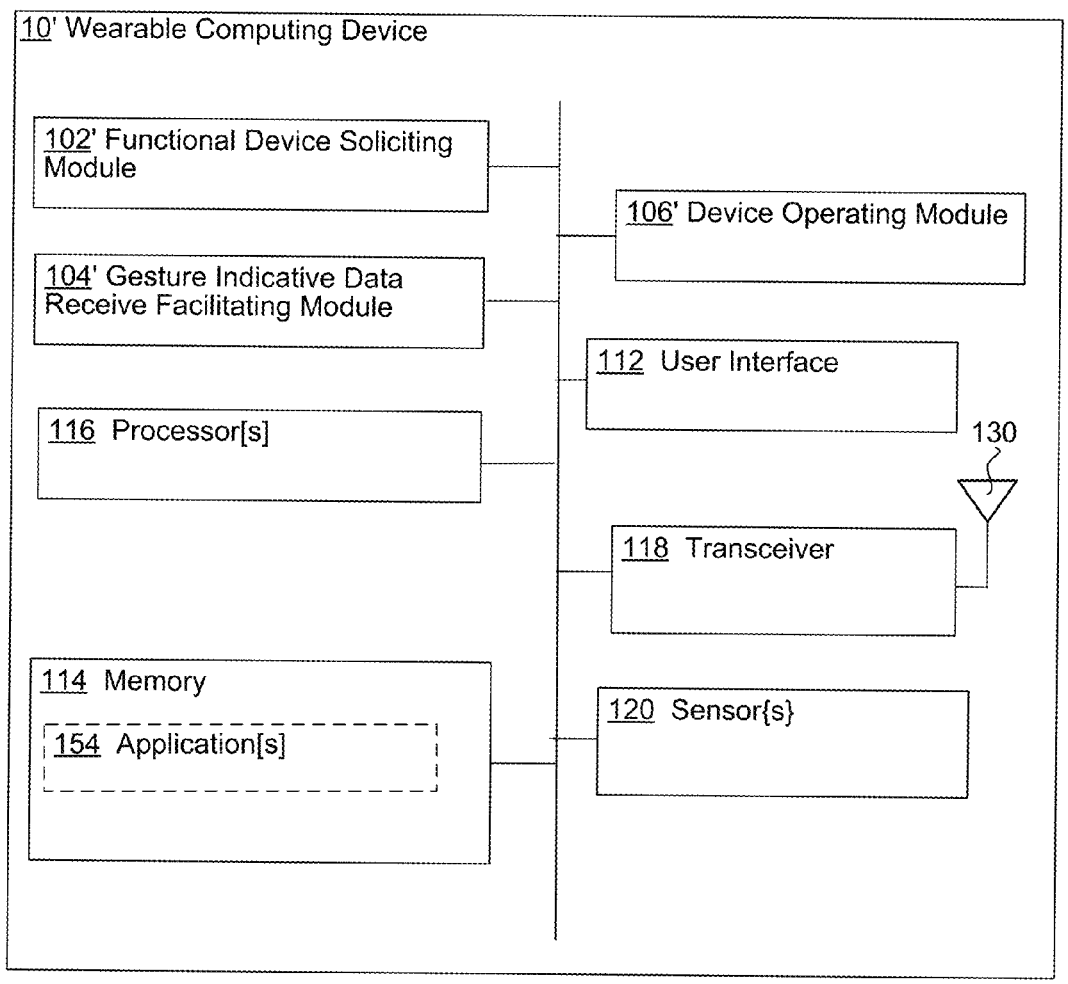
FIG. 4A shows a block diagram of particular implementation of the limb wearable computing device 10* of FIGS. 1A, 2A, 2B, and 2C.
Figure 4B:
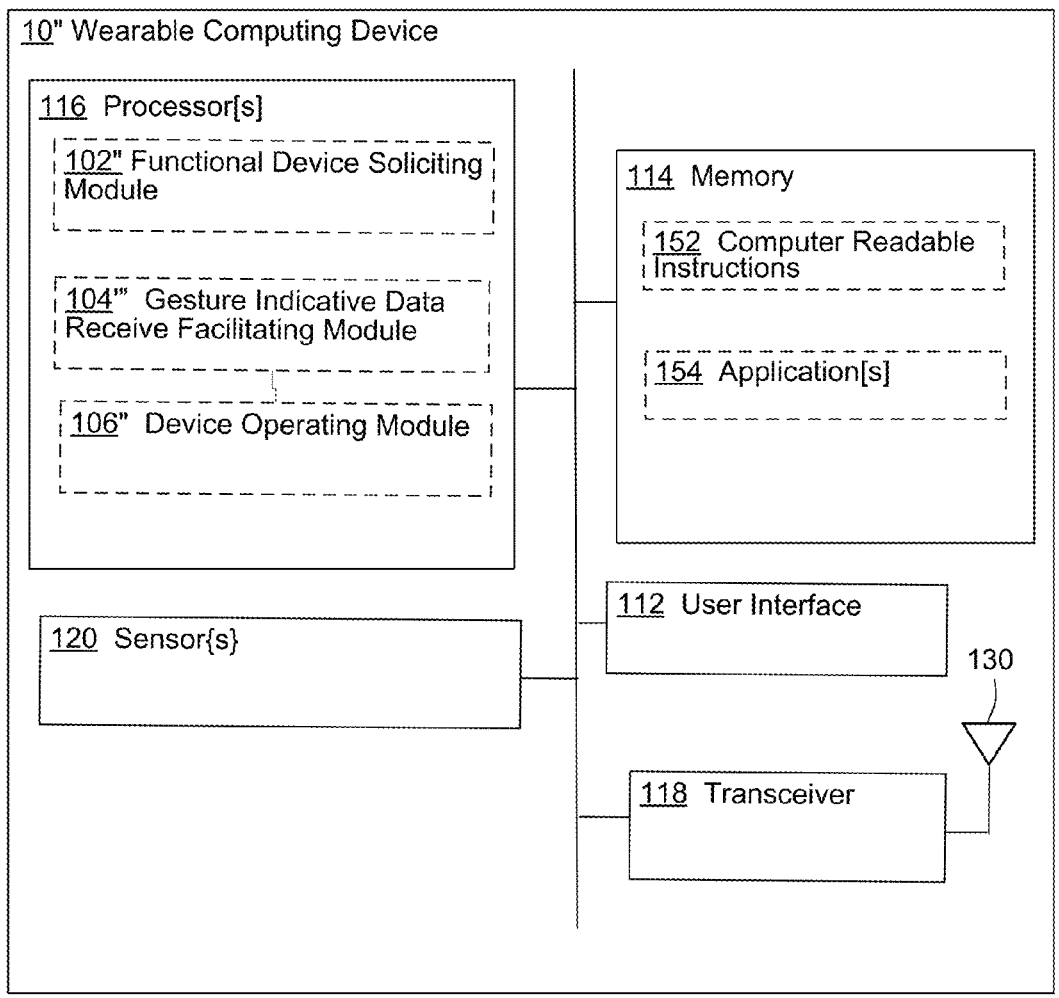
FIG. 4B shows a block diagram of another implementation of the limb wearable computing device 10* of FIGS. 1A, 2A, 2B, and 2C.

Referring now to FIGS. 4A and 4B, illustrating two block diagrams representing two different implementations of the limb wearable computing device 10* of FIGS. 1A, 2A, 2B, and 2C and that are designed to execute the operations and processes to be described herein. In particular, and as will be further described herein, FIG. 4A illustrates a limb wearable computing device 10' that is the "hardwired" or "hard" implementation of a small form-factor limb wearable device that can implement the operations and processes to be described herein. The limb wearable computing device 10' may comprise certain logic modules including, for example, a functional device soliciting module 102', a gesture indicative data receive facilitating module 104', and/or a device operating module 106' that are implemented using purely hardware or circuitry components (e.g., application specific integrated circuit or "ASIC"). In contrast, FIG. 4B illustrates a limb wearable computing device 10" that is the "soft" implementation of a small form-factor wearable device that can implement the operations and processes to be described herein. In various embodiments, the limb wearable computing device 10" may also include certain logic modules including, for example, a functional device soliciting module 102", a gesture indicative data receive facilitating module 104", and/or a device operating module 106" that are implemented using electronic circuitry (e.g., one or more processors 116 including one or more microprocessors, controllers, etc.) executing one or more programming instructions (e.g., software in the form of computer readable instructions 152—see FIG. 4B).

The embodiments of the limb wearable computing device 10* illustrated in FIGS. 4A and 4B are two extreme implementations of a small form-factor limb wearable system in which all of the logic modules (e.g., the functional device soliciting module 102', the gesture indicative data receive facilitating module 104', and the device operating module 106') are implemented using purely hardware solutions (e.g., circuitry such as ASIC) as illustrated in, for example, FIG. 4A or in which all of the logic modules (e.g., the functional device soliciting module 102", the gesture indicative data receive facilitating module 104", and the device operating module 106") are implemented using software solutions (e.g., programmable instructions in the form of computer readable instructions 152 being executed by hardware such as one or more processors 116) as illustrated in, for example, FIG. 4B. Since there are many ways of combining hardware, software, and/or firmware in order to implement the various logic modules (e.g., the functional device soliciting module 102*, the gesture indicative data receive facilitating module 104*, and the device operating module 106*), only the two extreme implementations (e.g., the purely hardware solution as illustrated in FIG. 4A and the software solution of FIG. 4B) are illustrated here. It should be noted here that with respect to the "soft" implementation illustrated in FIG. 4B, hardware in the form of circuitry such as one or more processors 116 are still needed in order to execute the software. Further details related to the two implementations of the limb wearable computing device 10* illustrated in FIGS. 4A and 4B will be provided in greater detail below.

In still other implementations, the limb wearable computing device 10* may not actually include the various logic modules (e.g., the functional device soliciting module 102*, the gesture indicative data receive facilitating module 104*, and the device operating module 106*) that implements the various operations/processes described herein. Instead, such logic modules may be located in a remote device such as at another device located near the limb wearable computing device 10* (e.g., another computing device located within the communication range 50* of the limb wearable computing device 10*). In such implementations, the other device having the various logic may direct or instruct the limb wearable computing device 10* to perform at least some of the processes and operations to be described herein.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 4A, which illustrates a block diagram of an limb wearable computing device 10' that includes a functional device soliciting module 102', a gesture indicative data receive facilitating module 104', a device operating module 106', memory 114, user interface 112 (e.g., a display, a speaker, and so forth), one or more processors 116 (e.g., one or more microprocessors), transceiver 118, one or more sensors 120, and an antenna 130 (e.g., a directional antenna such as a metamaterial antenna, or an omnidirectional antenna). In various embodiments, the memory 114 may store one or more applications 154 (e.g., communication applications such as email, instant messaging, text messaging, and VoIP applications, personal information manager applications such as Microsoft Outlook, gaming applications, productivity applications, and so forth). The one or more sensors 120 that may be included in the limb wearable computing device 10' may include, for example, one or more audio sensors (e.g., microphones), one or more visual sensors (e.g., cameras), one or more myoelectric sensors, and so forth.

In various embodiments, the functional device soliciting module 102' of FIG. 4A is a logic module that may be designed to, among other things, solicit, to provide to the limb wearable computing device 10' that is designed to be worn around a limb of a user 2, gesture indicative data 87* that is indicative of one or more user gestures from one or more functional devices 20* that are within the communication range 50* of the limb wearable computing device 10', the communication range 50* of the limb wearable computing device 10' being a spatial volume that includes the limb wearable computing device 10' and being externally defined by an enveloping boundary 52*, where low-power signals 70* transmitted by the limb wearable computing device 10' being discernible over background noise within the enveloping boundary 52* and not discernible over background noise outside the enveloping boundary 52*. In contrast, the gesture indicative data receive facilitating module 104' of FIG. 4A is a logic module that may be configured to facilitate the limb wearable computing device 10' to receive the gesture indicative data 87* from the one or more functional devices 20*. The device operating module 106' of FIG. 4A, on the other hand, is a logic module that may be configured to operate (e.g., control or direct) the limb wearable computing device 10' based, at least in part, on the gesture indicative data 87* provided by the one or more functional devices.

Turning now to FIG. 4B, which illustrates a block diagram of another limb wearable computing device 10" that can implement the operations and processes to be described herein. As indicated earlier, the limb wearable computing device 10" in FIG. 4B is merely the "soft" version of the limb wearable computing device 10' of FIG. 4A because the various logic modules: the functional device soliciting module 102", the gesture indicative data receive facilitating module 104", and the device operating module 106" are implemented using one or more processors 116 (e.g., one or more microprocessors or controllers) executing software (e.g., computer readable instructions 152) rather than being implemented using purely hardware (e.g., ASIC) solutions as was the case in the limb wearable computing device 10' of FIG. 4A. Thus, the functional device soliciting module 102", the gesture indicative data receive facilitating module 104", and the device operating module 106" of FIG. 4B may be designed to execute the same functions as the functional device soliciting module 102', the gesture indicative data receive facilitating module 104', and the device operating module 106' of FIG. 4A. The limb wearable computing device 10", as illustrated in FIG. 4B, may include other components (e.g., the user interface 112, the transceiver 118, directional antenna 130, memory 114 that stores one or more applications 154 as well as the computer readable instructions 152, and so forth) that are the same or similar to the other components that may be included in the limb wearable computing device 10' of FIG. 4A. Note that in the embodiment of the limb wearable computing device 10" illustrated in FIG. 4B, the various logic modules (e.g., the functional device soliciting module 102", the gesture indicative data receive facilitating module 104", and the device operating module 106") may be implemented by the one or more processors 116 (or other types of circuitry such as field programmable gate arrays or FPGAs) executing one or more computer readable instructions 152 stored in memory 114.

In various embodiments, the memory 114 of the limb wearable computing device 10' of FIG. 4A and the limb wearable computing device 10" of FIG. 4B may comprise one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 5A:
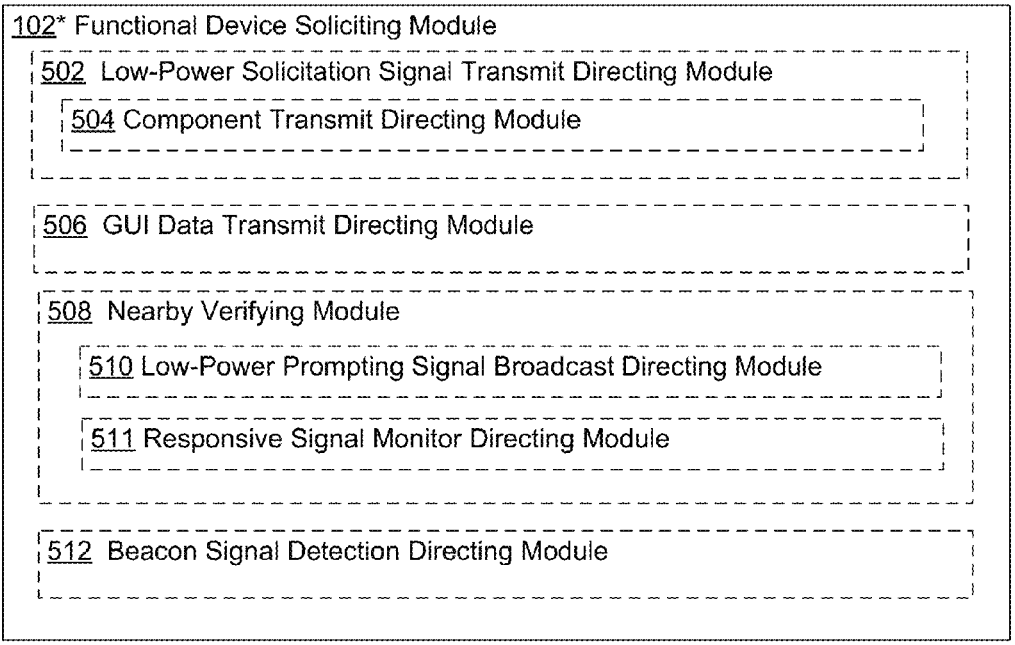
FIG. 5A shows another perspective of the functional device soliciting module 102* of FIGS. 4A and 4B (e.g., the functional device soliciting module 102' of FIG. 4A or the functional device soliciting module 102" of FIG. 4B) in accordance with various implementations.

Turning now to FIG. 5A illustrating a particular implementation of the functional device soliciting module 102* (e.g., the functional device soliciting module 102' or the functional device soliciting module 102") of FIGS. 4A and 4B. As illustrated, the functional device soliciting module 102* may include one or more sub-logic modules in various alternative implementations. For example, in various embodiments, the functional device soliciting module 102* may include a low-power solicitation signal transmit directing module 502 (which may further include a component transmit directing module 504), a GUI data transmit directing module 506, a nearby verifying module 508 (which may further include a low-power prompting signal broadcast directing module 510 and/or a responsive signal monitor directing module 511), and/or a beacon signal detection directing module 512. Specific details related to the functional device soliciting module 102* as well as the above-described sub-modules of the functional device soliciting module 102* will be provided below with respect to the operations and processes to be described herein.

Figure 5B:
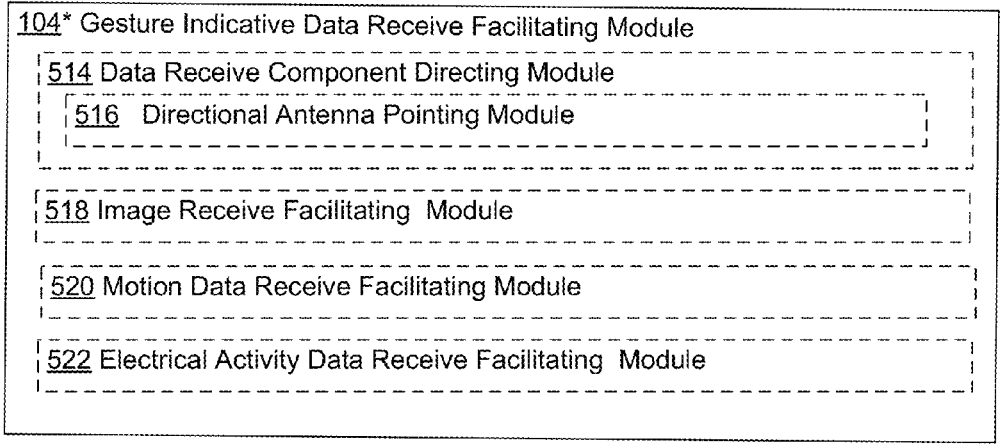
FIG. 5B shows another perspective of the gesture indicative data receive facilitating module 104* of FIGS. 4A and 4B (e.g., the gesture indicative data receive facilitating module 104' of FIG. 4A or the gesture indicative data receive facilitating module 104" of FIG. 4B) in accordance with various implementations.

Turning now to FIG. 5B illustrating a particular implementation of the gesture indicative data receive facilitating module 104* (e.g., the gesture indicative data receive facilitating module 104' or the gesture indicative data receive facilitating module 104") of FIGS. 4A and 4B. As illustrated, the gesture indicative data receive facilitating module 104* may include one or more sub-logic modules in various alternative implementations. For example, in various embodiments, the gesture indicative data receive facilitating module 104* may include a data receive component directing module 514 (which may further include a directional antenna pointing module 516), an image receive facilitating module 518, a motion data receive facilitating module 520, and/or an electrical activity data receive facilitating module 522. Specific details related to the gesture indicative data receive facilitating module 104* as well as the above-described sub-modules of the gesture indicative data receive facilitating module 104* will be provided below with respect to the operations and processes to be described herein.

Figure 5C:
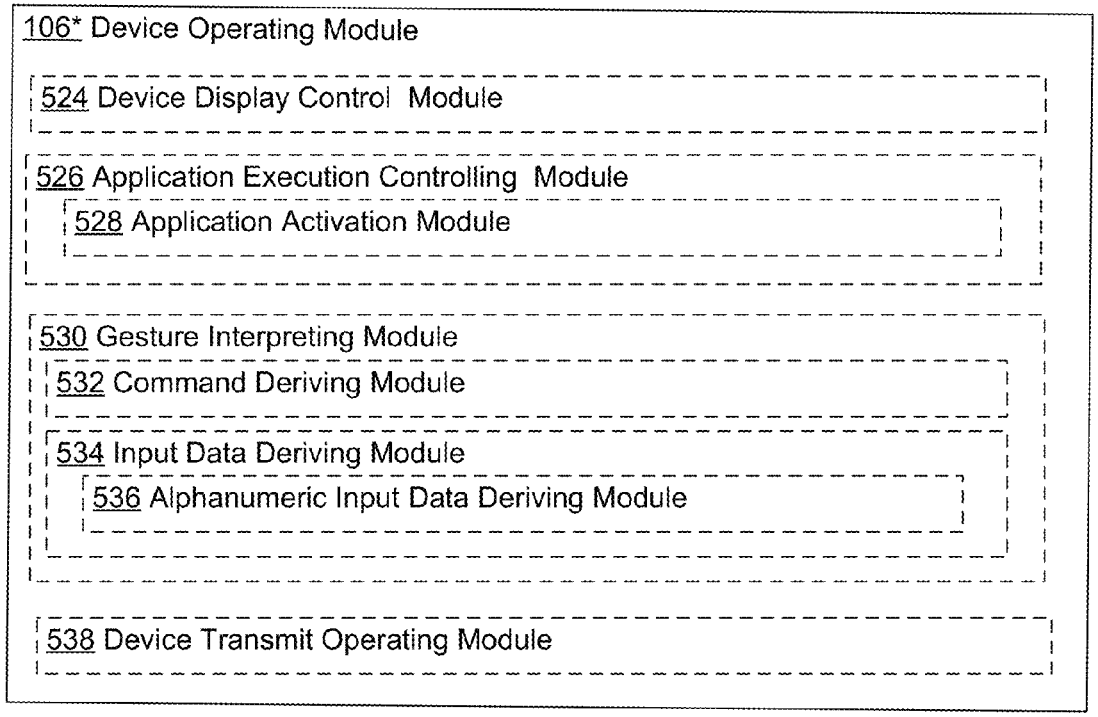
FIG. 5C shows another perspective of the device operating module 106* of FIGS. 4A and 4B (e.g., the device operating module 106' of FIG. 4A or the device operating module 106" of FIG. 4B) in accordance with various implementations.

FIG. 5C illustrates a particular implementation of the device operating module 106* (e.g., the device operating module 106' or the device operating module 106") of FIG. 4A or 4B. As illustrated, the device operating module 106* may include one or more sub-logic modules in various alternative embodiments. For example, in various embodiments, the device operating module 106* may include a device display control module 524, an application execution controlling module 526 (which may further include an application activation module 528), a gesture interpreting module 530 that may further include a command deriving module 532 and/or an input data deriving module 534 (which may further include an alphanumeric input data deriving module 536), and/or a device transmit operating module 538. Specific details related to the device operating module 106*, as well as the above-described sub-modules of the device operating module 106*, will be provided below with respect to the operations and processes to be described herein.

Figure 6:
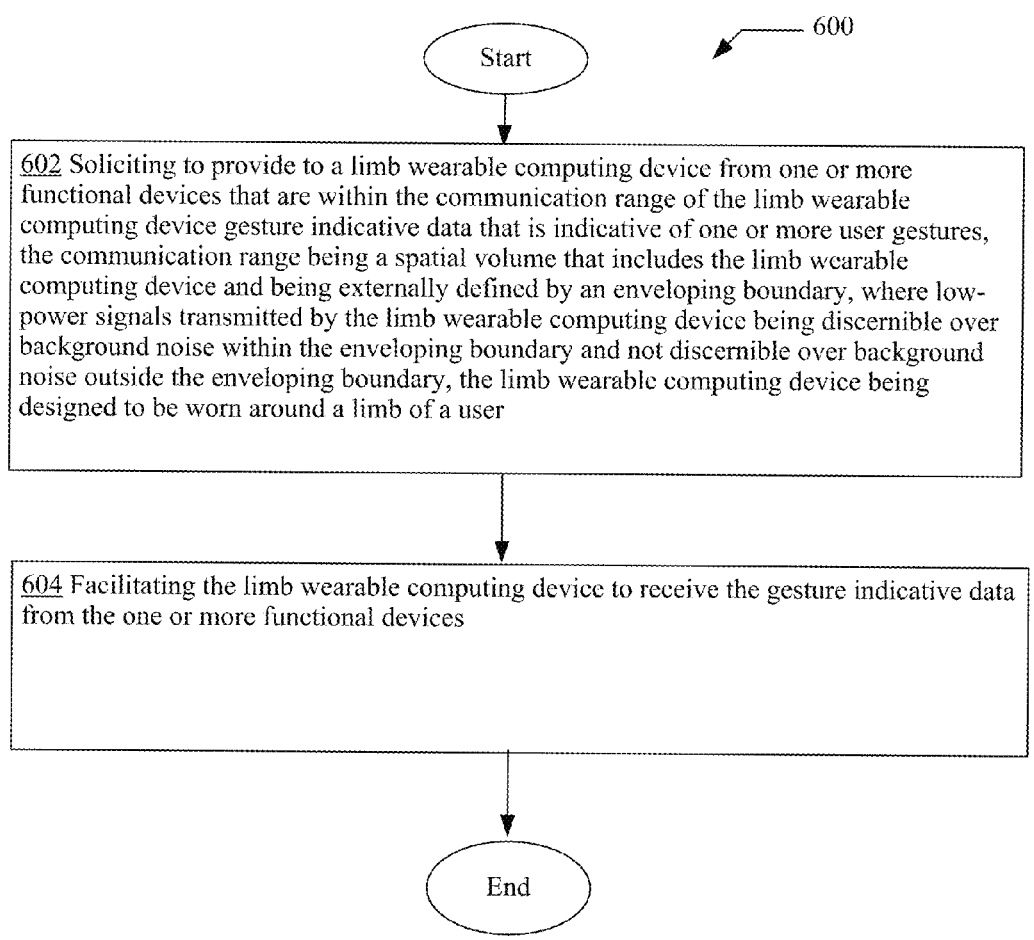
FIG. 6 is a high-level logic flowchart of a process, e.g., operational flow 600, according to some embodiments.

In the following, various operations will be presented that are associated with the above described limb wearable computing device 10* (e.g., the limb wearable computing device 10' of FIG. 4A or the limb wearable computing device 10" of FIG. 4B) and that may be executed in various alternative embodiments. FIG. 6, for example, illustrates an operational flow 600 representing example computationally-implemented operations that may be implemented for, among other things, soliciting to provide to a limb wearable computing device 10* from one or more functional devices 20* that are within the communication range 50* of the limb wearable computing device 10* gesture indicative data 87* that is indicative of one or more user gestures (e.g., finger, hand, and/or arm gestures) and that may be used as the basis, at least in part, for controlling or operating the limb wearable computing device 10*; and facilitating the limb wearable computing device 10* to receive the solicited gesture indicative data 87* from the one or more functional devices 20*. In some implementations, at least some portions of these operations may be implemented through the limb wearable computing device 10* of, for example, FIG. 4A or 4B.

In FIG. 6 and in the following figures that include various examples of operational flows, discussions and explanations will be provided with respect to the limb wearable computing device 10* described above and as illustrated in FIGS. 4A, 4B, 5A, 5B, 5C, and/or with respect to other examples (e.g., as provided in FIGS. 1A, 1B, 1C, 1D, 2A, 2B, 2C, 3A, 3B, 3C, and 3D) and contexts. However, it should be understood that the operational flows may be executed in a number of other environments and contexts, and/or in modified versions of FIGS. 1A, 1B, 1C, 1D, 2A, 2B, 2C, 3A, 3B, 3C, 3D, 4A, 4B, 5A, 5B, and/or 5C. Also, although the various operational flows are presented in the sequence(s) illustrated, it should be understood that the various operations may be performed in orders other than those which are illustrated, or may be performed concurrently.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 600 of FIG. 6 may move to a functional device soliciting operation 602 for soliciting to provide to a limb wearable computing device from one or more functional devices that are within the communication range of the limb wearable computing device gesture indicative data that is indicative of one or more user gestures, the communication range being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary, the limb wearable computing device being designed to be worn around a limb of a user. For instance, and as illustration, the functional device soliciting module 102* of the limb wearable computing device 10* of FIG. 4A or 4B (e.g., the functional device soliciting module 102' of FIG. 4A or the functional device soliciting module 102" of FIG. 4B) soliciting to provide to a limb wearable computing device 10* from one or more functional devices 20* that are within the communication range 50* (see FIG. 2A, 2B, or 2C) of the limb wearable computing device 10* gesture indicative data 87* (see FIG. 2C) that is indicative of one or more user gestures (e.g., finger, hand, and/or arm gestures), the communication range 50* being a spatial volume that includes the limb wearable computing device 10* and being externally defined by an enveloping boundary 52*, where low-power signals 70* transmitted wirelessly by the limb wearable computing device 10* being discernible over background noise (e.g., noise associated with background radiation) within the enveloping boundary 52* and not discernible over background noise outside the enveloping boundary 52*, the limb wearable computing device 10* being designed to be worn around a limb (e.g., an arm, which includes a hand, a wrist, forearm, etc.) of a user 2. Note that references in the following to "low-power" such as, for example, the one or more "low-power" signals 70* (or similar such phrases such as the "low-power" solicitation signals 80* or the "low-power" prompting signals 82) may be in reference to the relatively low amount of transmit power (e.g., less than 0.8 milliwatt) that may be used to wirelessly transmit such signals. As described earlier, a functional device 20* may be any device that can provide one or more functionalities for providing gesture indicative data 87* that is indicative of one or more user gestures (e.g., finger/hand/arm gesture).

Operational flow 600 may also include a gesture indicative data reception facilitating operation 604 for facilitating the limb wearable computing device to receive the gesture indicative data from the one or more functional devices. For instance, the gesture indicative data receive facilitating module 104* (e.g., the gesture indicative data receive facilitating module 104' of FIG. 4A or the gesture indicative data receive facilitating module 104" of FIG. 4B) of the limb wearable computing device 10* of FIG. 4A or 4B facilitating the limb wearable computing device 10* to receive the gesture indicative data 87* from the one or more functional devices 20*. In various embodiments, and as will be further described herein, the limb wearable computing device 10* may be facilitated to receive the gesture indicative data 87* in a variety of different ways including by, for example, configuring or instructing one or more components of the limb wearable computing device 10* to receive the gesture indicative data 87*. Note that although the above described functional device soliciting operation 602 and the gesture indicative data reception facilitating operation 604 will be generally described below as being performed at the limb wearable computing device 10*, in alternative embodiments, at least portions of these operations (as well as at least portions of the various operations to be described herein) may be performed remotely (e.g., remotely performed by a nearby functional device 20*). For example, with respect to the gesture indicative data reception facilitating operation 604 described above, a nearby functional device 20* may wirelessly instruct the limb wearable computing device 10* to receive the gesture indicative data 87*.

As will be described below, the functional device soliciting operation 602 and the gesture indicative data reception facilitating operation 604 may be executed in a variety of different ways in various alternative implementations. FIGS. 7A, 7B, 7C, 7D, 7E, 7F, 7G, and 7H, for example, illustrate at least some of the alternative ways that the functional device soliciting operation 602 of FIG. 6 may be executed in various alternative implementations. In some cases, for example, the functional device soliciting operation 602 may include an operation 702 for soliciting to provide to the limb wearable computing device from the one or more functional devices that are within the communication range of the limb wearable computing device the gesture indicative data that is indicative of one or more user gestures by directing the limb wearable computing device to transmit to the one or more functional devices one or more low-power solicitation signals that when detected by the one or more functional devices causes the one or more functional devices to transmit to the limb wearable computing device the gesture indicative data as illustrated in FIGS. 7A, 7B, 7C, and 7D. For instance, the functional device soliciting module 102* including the low-power solicitation signal transmit directing module 502 of the limb wearable computing device 10* (e.g., the limb wearable computing device 10' of FIG. 4A or the limb wearable computing device 10" of FIG. 4B) soliciting or requesting to provide to the limb wearable computing device 10* from that one or more functional devices 20* that are within the communication range 50* of the limb wearable computing device 10* the gesture indicative data 87* that is indicative of one or more user gestures when the low-power solicitation signal transmit directing module 502 directs (e.g., instructs or controls) the limb wearable computing device 10* to transmit to the one or more functional devices 20* one or more low-power solicitation signals 80* (e.g., signals transmitted using less than 0.8 milliwatt of transmit power for soliciting gesture indicative data 87*) that when detected by the one or more functional devices 20* causes the one or more functional devices 20* to transmit to the limb wearable computing device 10* the gesture indicative data 87*.

In various implementations, operation 702 may further include one or more additional operations including, in some implementations, an operation 703 for directing the limb wearable computing device to transmit to the one or more functional devices the one or more low-power solicitation signals by directing one or more components including a transceiver of the limb wearable computing device to transmit to the one or more functional devices the one or more low-power solicitation signals. For instance, the low-power solicitation signal transmit directing module 502 including the component transmit directing module 504 (see FIG. 5A) of the limb wearable computing device 10* of FIG. 4A or 4B directing the limb wearable computing device 10* to transmit to the one or more functional devices 20* the one or more low-power solicitation signals 80* (see FIG. 2B) by having the component transmit directing module 504 direct (e.g., instruct) one or more components including a transceiver 118 of the limb wearable computing device 10* to transmit to the one or more functional devices 20* the one or more low-power solicitation signals 80*.

In the same or alternative implementations, operation 702 may alternatively or additionally include or involve an operation 704 for directing the limb wearable computing device to transmit to the one or more functional devices the one or more low-power solicitation signals by directing the limb wearable computing device to transmit to the one or more functional devices one or more low-power solicitation signals that are transmitted using less than 0.8 milliwatt of transmit power. For instance, the low-power solicitation signal transmit directing module 502 of the limb wearable computing device 10* of FIG. 4A or 4B directing the limb wearable computing device 10* to transmit to the one or more functional devices 20* the one or more low-power solicitation signals 80* by directing the limb wearable computing device 10* to transmit to the one or more functional devices 20* one or more low-power solicitation signals 80* that are transmitted using less than 0.8 milliwatt of transmit power.

In some implementations, the operation 702 may actually include or involve an operation 705 for directing the limb wearable computing device to transmit to the one or more functional devices the one or more low-power solicitation signals by directing the limb wearable computing device to transmit to the one or more functional devices one or more low-power solicitation signals that are transmitted using 0.5 milliwatt or less of transmit power. For instance, the low-power solicitation signal transmit directing module 502 of the limb wearable computing device 10* of FIG. 4A or 4B directing the limb wearable computing device 10* to transmit to the one or more functional devices 20* the one or more low-power solicitation signals 80* by directing (e.g., controlling or instructing) the limb wearable computing device 10* to transmit to the one or more functional devices 20* one or more low-power solicitation signals 80* that are transmitted using 0.5 milliwatt or less of transmit power.

In the same or alternative implementations, operation 702 may additionally or alternatively include or involve an operation 706 for directing the limb wearable computing device to transmit to the one or more functional devices the one or more low-power solicitation signals by directing the limb wearable computing device to transmit to the one or more functional devices the one or more low-power solicitation signals having one or more frequencies from a frequency band having a frequency range between 2.400 GHz and 2.4835 GHz or having one or more frequencies from a frequency band having a frequency range between 5.180 GHz and 5.825 GHz. For instance, the low-power solicitation signal transmit directing module 502 of the limb wearable computing device 10* of FIG. 4A or 4B directing the limb wearable computing device 10* to transmit to the one or more functional devices 20* the one or more low-power solicitation signals 80* by directing the limb wearable computing device 10* to transmit to the one or more functional devices 20* the one or more low-power solicitation signals 80* having one or more frequencies from a frequency band having a frequency range between 2.400 GHz and 2.4835 GHz or having one or more frequencies from a frequency band having a frequency range between 5.180 GHz and 5.825 GHz. For example, directing the limb wearable computing device 10* to transmit to the one or more functional devices 20* the one or more low-power solicitation signals 80* having frequencies between 2.405 GHz and 2.4200 GHz.

In some alternative implementations, operation 702 may include or involve an operation 707 for directing the limb wearable computing device to transmit to the one or more functional devices the one or more low-power solicitation signals by directing the limb wearable computing device to transmit to the one or more functional devices the one or more low-power solicitation signals having one or more frequencies from a frequency band having a frequency range between 57 GHz and 64 GHz. For instance, the low-power solicitation signal transmit directing module 502 of the limb wearable computing device 10* of FIG. 4A or 4B directing the limb wearable computing device 10* to transmit to the one or more functional devices 20* the one or more low-power solicitation signals 80* by directing the limb wearable computing device 10* to transmit to the one or more functional devices 20* the one or more low-power solicitation signals 80* having one or more frequencies from a frequency band having a frequency range between 57 GHz and 64 GHz. For example, directing the limb wearable computing device 10* to transmit to the one or more functional devices 20* the one or more low-power solicitation signals 80* having frequencies between 58 GHz and 63 GHz.

Figure 7A:
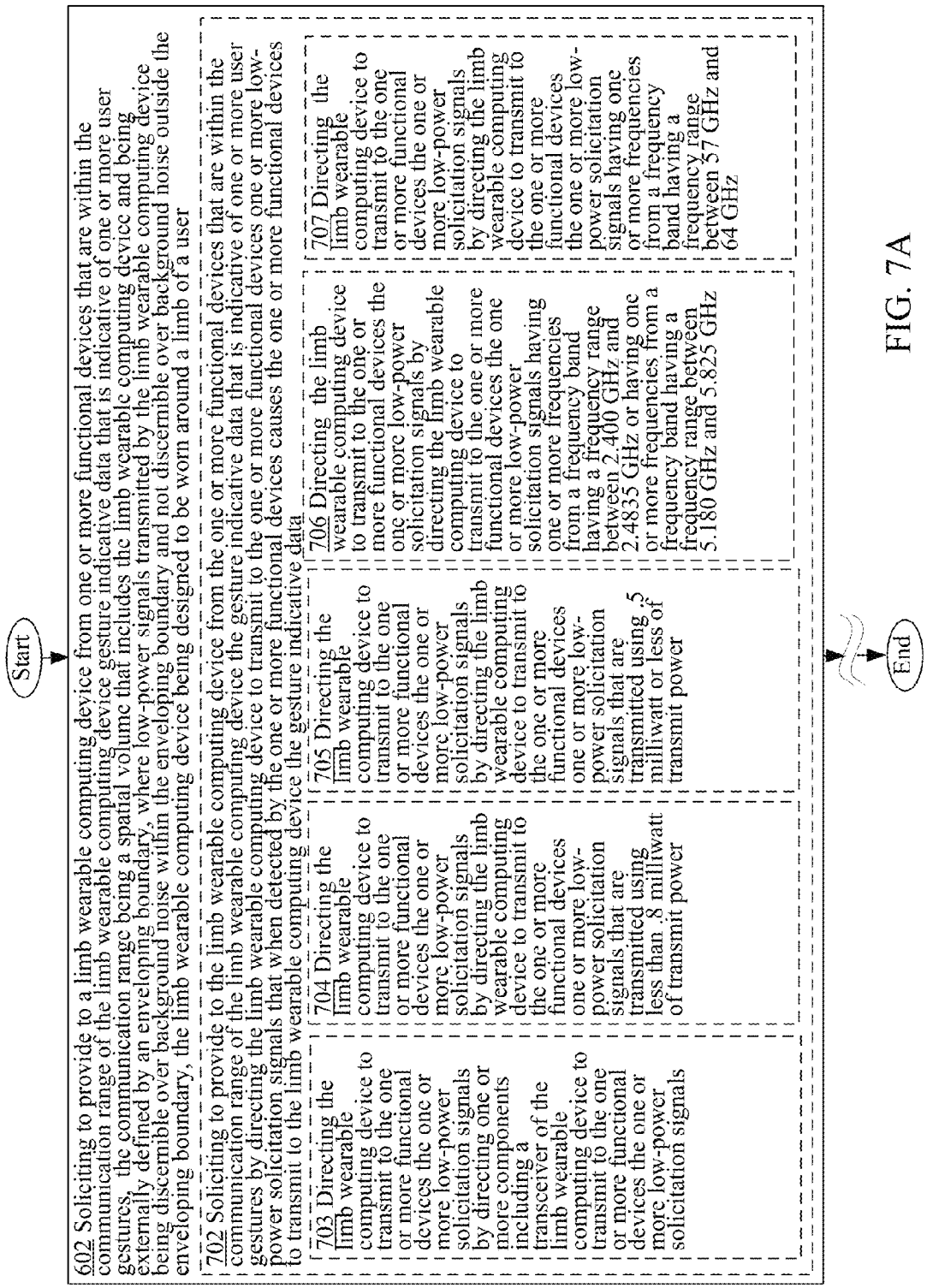
FIG. 7A is a high-level logic flowchart of a process depicting alternate implementations of the functional device soliciting operation 602 of FIG. 6.
Figure 7B:
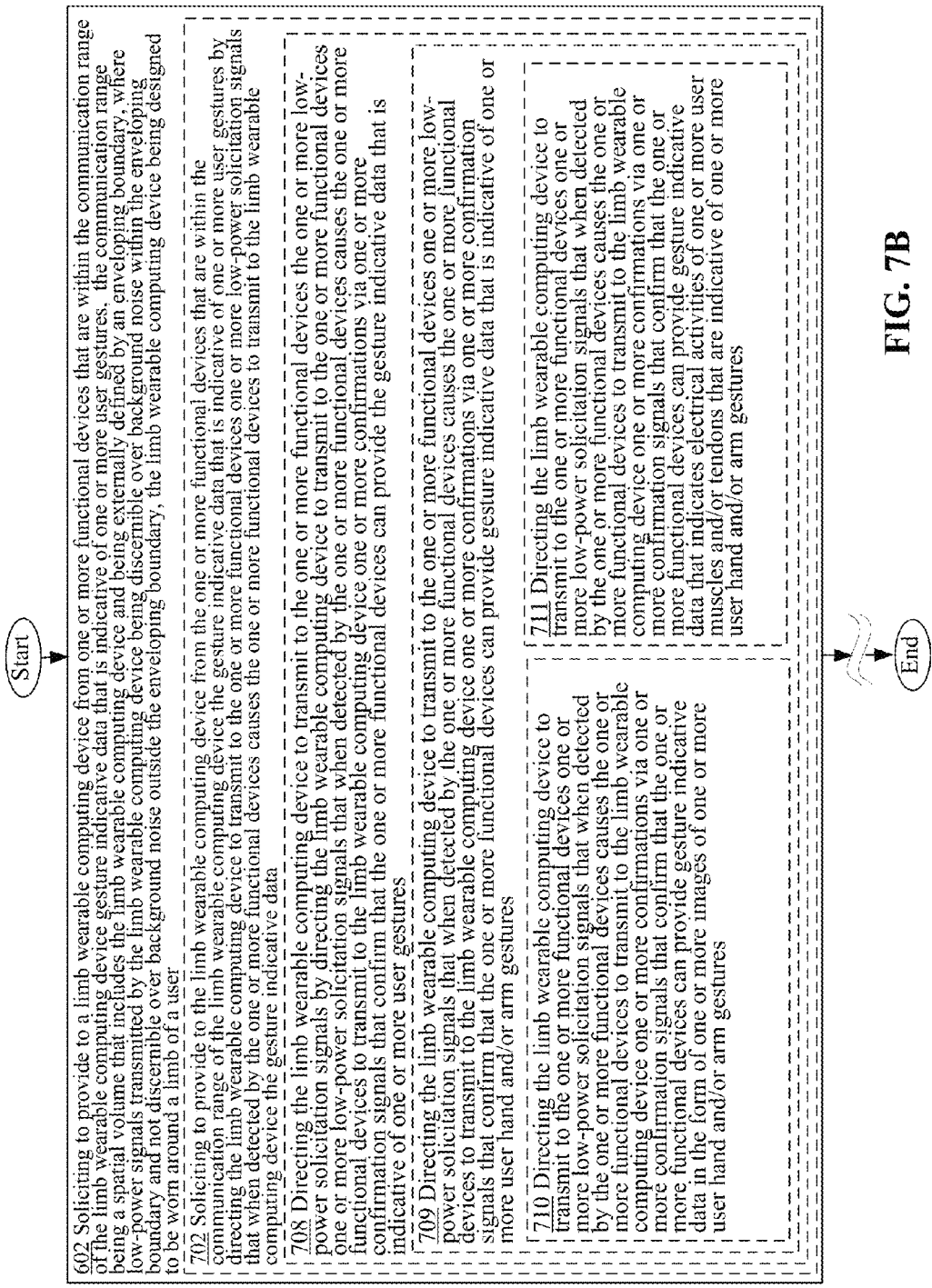
FIG. 7B is a high-level logic flowchart of a process depicting alternate implementations of the functional device soliciting operation 602 of FIG. 6.

In the same or alternative implementations, operation 702 may include or involve an operation 708 for directing the limb wearable computing device to transmit to the one or more functional devices the one or more low-power solicitation signals by directing the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide the gesture indicative data that is indicative of one or more user gestures as illustrated, for example, in FIG. 7B. For instance, the low-power solicitation signal transmit directing module 502 of the limb wearable computing device 10* of FIG. 4A or 4B directing the limb wearable computing device 10* to transmit to the one or more functional devices 20* the one or more low-power solicitation signals 80* by directing (e.g., controlling or instructing) the limb wearable computing device 10* to transmit to the one or more functional devices 20* one or more low-power solicitation signals 80* that when detected by the one or more functional devices 20* causes the one or more functional devices 20* to transmit to the limb wearable computing device 10* one or more confirmations via one or more confirmation signals 85* (see FIG. 2B) that confirm that the one or more functional devices 20* can provide the gesture indicative data 87* that is indicative of one or more user gestures.

As further illustrated in FIG. 7B, operation 708 in some implementations may further include or involve an operation 709 for directing the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data that is indicative of one or more user hand and/or arm gestures. For instance, the low-power solicitation signal transmit directing module 502 of the limb wearable computing device 10* of FIG. 4A or 4B directing the limb wearable computing device 10* to transmit to the one or more functional devices 20* one or more low-power solicitations signals 80* that when detected by the one or more functional devices 20* causes the one or more functional devices 20* to transmit to the limb wearable computing device 10* one or more confirmations via one or more confirmation signals 85* that confirm that the one or more functional devices 20* can provide gesture indicative data 87* that is indicative of one or more user hand and/or arm gestures.

As further illustrated in FIG. 7B, in some implementations operation 709 may, in turn, further include or involve an operation 710 for directing the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data in the form of one or more images of one or more user hand and/or arm gestures.

For instance, the low-power solicitation signal transmit directing module 502 of the limb wearable computing device 10* of FIG. 4A or 4B directing the limb wearable computing device 10* to transmit to the one or more functional devices 20* one or more low-power solicitations signals 80* that when detected by the one or more functional devices 20* causes the one or more functional devices 20* to transmit to the limb wearable computing device 10* one or more confirmations via one or more confirmation signals 85* that confirm that the one or more functional devices 20* can provide gesture indicative data 87* in the form of one or more images (e.g., still images and/or motion images) of one or more user hand and/or arm gestures.

In the same or alternative implementations, operation 709 may additionally or alternatively include or involve an operation 711 for directing the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data that indicates electrical activities of one or more user muscles and/or tendons that are indicative of one or more user hand and/or arm gestures. For instance, the low-power solicitation signal transmit directing module 502 of the limb wearable computing device 10* of FIG. 4A or 4B directing the limb wearable computing device 10* to transmit to the one or more functional devices 20* one or more low-power solicitation signals 80* that when detected by the one or more functional devices 20* causes the one or more functional devices 20* to transmit to the limb wearable computing device 10* one or more confirmations via one or more confirmation signals 85* that confirm that the one or more functional devices 20* can provide gesture indicative data 87* that indicates electrical activities of one or more user muscles and/or tendons that are indicative of one or more user hand and/or arm gestures.

Figure 7C:
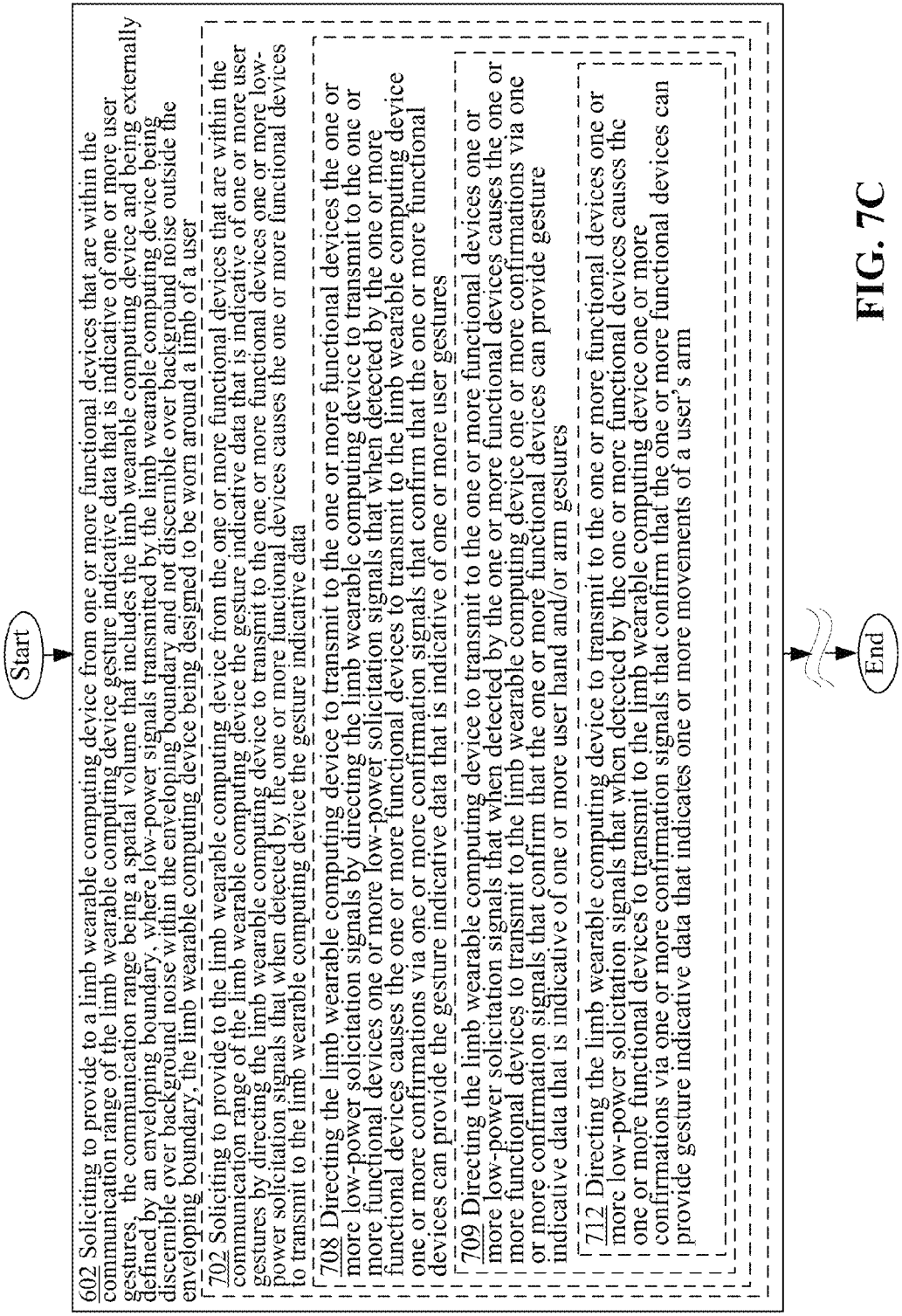
FIG. 7C is a high-level logic flowchart of a process depicting alternate implementations of the functional device soliciting operation 602 of FIG. 6.

Turning to FIG. 7C, in various implementations, operation 709 may additionally or alternatively include or involve an operation 712 for directing the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data that indicates one or more movements of a user's arm. For instance, the low-power solicitation signal transmit directing module 502 of the limb wearable computing device 10* of FIG. 4A or 4B directing the limb wearable computing device 10* to transmit to the one or more functional devices 20* one or more low-power solicitation signals 80* that when detected by the one or more functional devices 20* causes the one or more functional devices 20* to transmit to the limb wearable computing device 10* one or more confirmations via one or more confirmation signals 85* that confirm that the one or more functional devices 20* can provide gesture indicative data 87* that indicates one or more movements of a user's arm (e.g., movements of at least one portion of a user's arm).

Figure 7D:
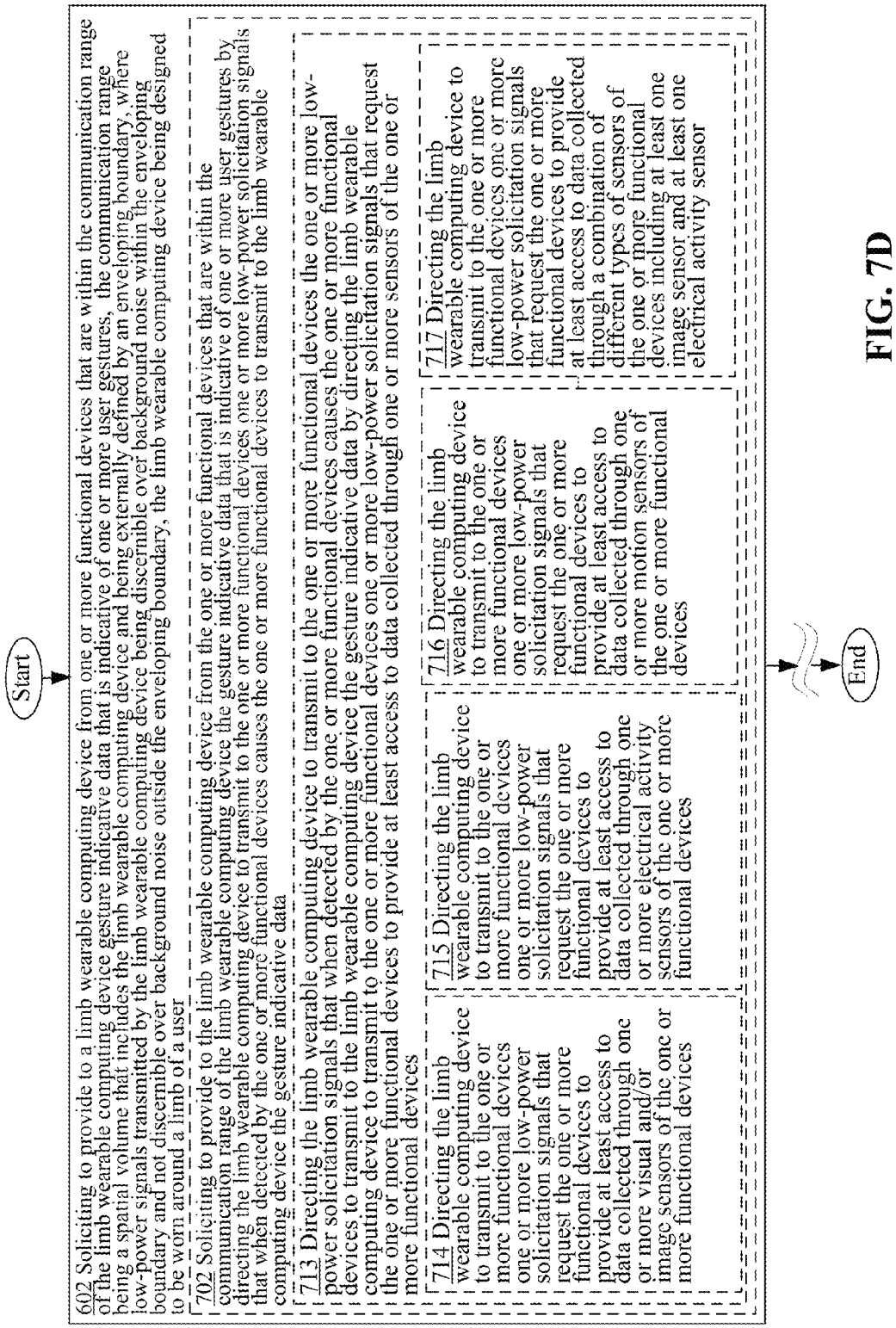
FIG. 7D is a high-level logic flowchart of a process depicting alternate implementations of the functional device soliciting operation 602 of FIG. 6.

Referring now to FIG. 7D, in some cases, operation 702 for soliciting to provide to the limb wearable computing device from the one or more functional devices that are within the communication range of the limb wearable computing device the gesture indicative data that is indicative of one or more user gestures by directing the limb wearable computing device to transmit to the one or more functional devices one or more low-power solicitation signals that when detected by the one or more functional devices causes the one or more functional devices to transmit to the limb wearable computing device the gesture indicative data may further include or involve an operation 713 for directing the limb wearable computing device to transmit to the one or more functional devices the one or more low-power solicitation signals that when detected by the one or more functional devices causes the one or more functional devices to transmit to the limb wearable computing device the gesture indicative data by directing the limb wearable computing device to transmit to the one or more functional devices one or more low-power solicitation signals that request the one or more functional devices to provide at least access to data collected through one or more sensors of the one or more functional devices. For instance, the low-power solicitation signal transmit directing module 502 of the limb wearable computing device 10* of FIG. 4A or 4B directing the limb wearable computing device 10* to transmit to the one or more functional devices 20* the one or more low-power solicitation signals 80* that when detected by the one or more functional devices 20* causes the one or more functional devices 20* to transmit to the limb wearable computing device 10* the gesture indicative data 87* by directing (e.g., instructing or controlling) the limb wearable computing device 10* to transmit to the one or more functional devices 20* one or more low-power solicitation signals 80* that request the one or more functional devices 20* to provide at least access to data (e.g., gesture indicative data 87*) collected through one or more sensors (e.g. visible or infrared cameras, electromyography (EMG) sensors, motion sensors such as accelerometers, and so forth) of the one or more functional devices 20*.

As further illustrated in FIG. 7D, operation 713 may further include or involve one or more additional operations in various alternative implementations including, in some cases, an operation 714 for directing the limb wearable computing device to transmit to the one or more functional devices one or more low-power solicitation signals that request the one or more functional devices to provide at least access to data collected through one or more visual and/or image sensors of the one or more functional devices. For instance, the low-power solicitation signal transmit directing module 502 of the limb wearable computing device 10* of FIG. 4A or 4B directing the limb wearable computing device 10* to transmit to the one or more functional devices 20* one or more low-power solicitation signals 80* that request the one or more functional devices 20* when the one or more functional devices 20* detect the one or more low-power solicitation signals 80* to provide at least access to data collected through one or more visual and/or image sensors (e.g., webcam, infrared sensor or camera, black silicon sensors, and so forth) of the one or more functional devices 20*.

In the same or alternative implementations, operation 713 may additionally or alternatively include an operation 715 for directing the limb wearable computing device to transmit to the one or more functional devices one or more low-power solicitation signals that request the one or more functional devices to provide at least access to data collected through one or more electrical activity sensors of the one or more functional devices. For instance, the low-power solicitation signal transmit directing module 502 of the limb wearable computing device 10* of FIG. 4A or 4B directing the limb wearable computing device 10* to transmit to the one or more functional devices 20* one or more low-power solicitation signals 80* that request the one or more functional devices 20* when the one or more functional devices 20* detects the one or more low-power solicitation signals 80* to provide at least access to data collected through one or more electrical activity sensors of the one or more functional devices 20*.

In the same or alternative implementations, operation 713 may additionally or alternatively include an operation 716 for directing the limb wearable computing device to transmit to the one or more functional devices one or more low-power solicitation signals that request the one or more functional devices to provide at least access to data collected through one or more motion sensors of the one or more functional devices. For instance, the low-power solicitation signal transmit directing module 502 of the limb wearable computing device 10* of FIG. 4A or 4B directing the limb wearable computing device 10* to transmit to the one or more functional devices 20* one or more low-power solicitation signals 80* that request the one or more functional devices 20* when the one or more functional devices 20* detects the one or more low-power solicitation signals 80* to provide at least access to data collected through one or more motion sensors (e.g., accelerometers, gyro sensors, inertia sensors, etc.) of the one or more functional devices 20*.

In the same or alternative implementations, operation 713 may additionally or alternatively include an operation 717 for directing the limb wearable computing device to transmit to the one or more functional devices one or more low-power solicitation signals that request the one or more functional devices to provide at least access to data collected through a combination of different types of sensors of the one or more functional devices including at least one image sensor and at least one electrical activity sensor. For instance, the low-power solicitation signal transmit directing module 502 of the limb wearable computing device 10* of FIG. 4A or 4B directing the limb wearable computing device 10* to transmit to the one or more functional devices 20* one or more low-power solicitation signals 80* that request the one or more functional devices 20* when the one or more functional devices 20* detects the one or more low-power solicitation signals 80* to provide at least access to data collected through a combination of different types of sensors of the one or more functional devices including at least one image sensor (e.g., infrared camera) and at least one electrical activity sensor (e.g., EMG sensor).

Figure 7E:
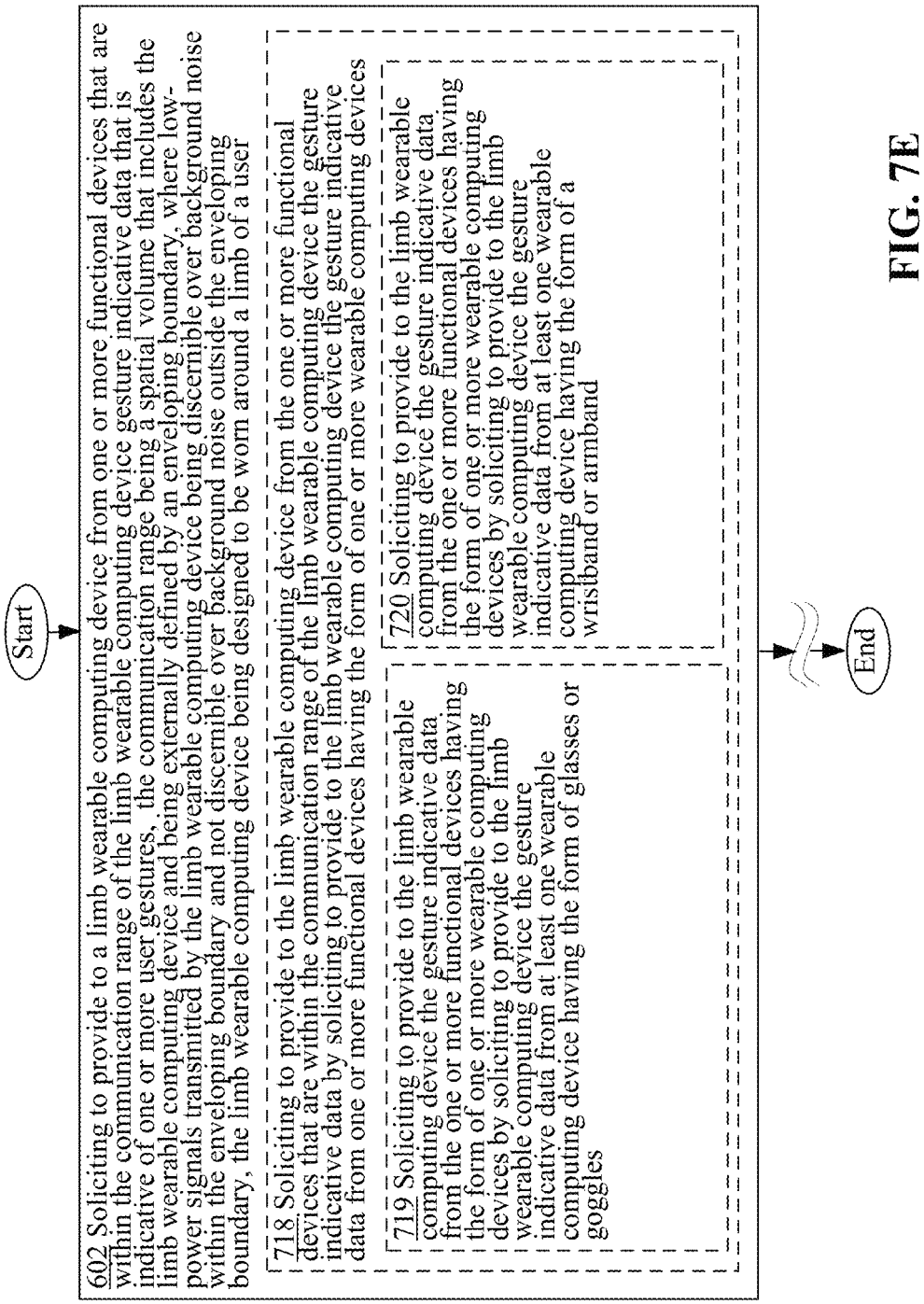
FIG. 7E is a high-level logic flowchart of a process depicting alternate implementations of the functional device soliciting operation 602 of FIG. 6.

Turning now to FIG. 7E, in some implementations, the functional device soliciting operation 602 may include or involve an operation 718 for soliciting to provide to the limb wearable computing device from the one or more functional devices that are within the communication range of the limb wearable computing device the gesture indicative data by soliciting to provide to the limb wearable computing device the gesture indicative data from one or more functional devices having the form of one or more wearable computing devices. For instance, the functional device soliciting module 102* of the limb wearable computing device 10* of FIG. 4A or 4B soliciting to provide to the limb wearable computing device 10* from the one or more functional devices 20* that are within the communication range 50* of the limb wearable computing device 10* the gesture indicative data 87* by soliciting or requesting to provide to the limb wearable computing device 10* the gesture indicative data 87* from one or more functional devices 20* having the form of one or more wearable computing devices (e.g., computing devices that are designed to be coupled to a portion of a user's body).

In some implementations operation 718 may further include or involve an operation 719 for soliciting to provide to the limb wearable computing device the gesture indicative data from the one or more functional devices having the form of one or more wearable computing devices by soliciting to provide to the limb wearable computing device the gesture indicative data from at least one wearable computing device having the form of glasses or goggles. For instance, the functional device soliciting module 102* of the limb wearable computing device 10* of FIG. 4A or 4B soliciting to provide to the limb wearable computing device 10* the gesture indicative data 87* from the one or more functional devices 20* having the form of one or more wearable computing devices by soliciting to provide to the limb wearable computing device 10* the gesture indicative data 87* from at least one wearable computing device (e.g., functional device 20b of FIG. 1A) having the form of glasses or goggles.

In some implementations, operation 718 may include or involve an operation 720 for soliciting to provide to the limb wearable computing device the gesture indicative data from the one or more functional devices having the form of one or more wearable computing devices by soliciting to provide to the limb wearable computing device the gesture indicative data from at least one wearable computing device having the form of a wristband or armband. For instance, the functional device soliciting module 102* of the limb wearable computing device 10* of FIG. 4A or 4B soliciting to provide to the limb wearable computing device 10* the gesture indicative data 87* from the one or more functional devices 20* having the form of one or more wearable computing devices by soliciting to provide to the limb wearable computing device 10* the gesture indicative data 87* from at least one wearable computing device (e.g. the functional device 20a of FIG. 1A) having the form of a wristband or armband.

Figure 7F:
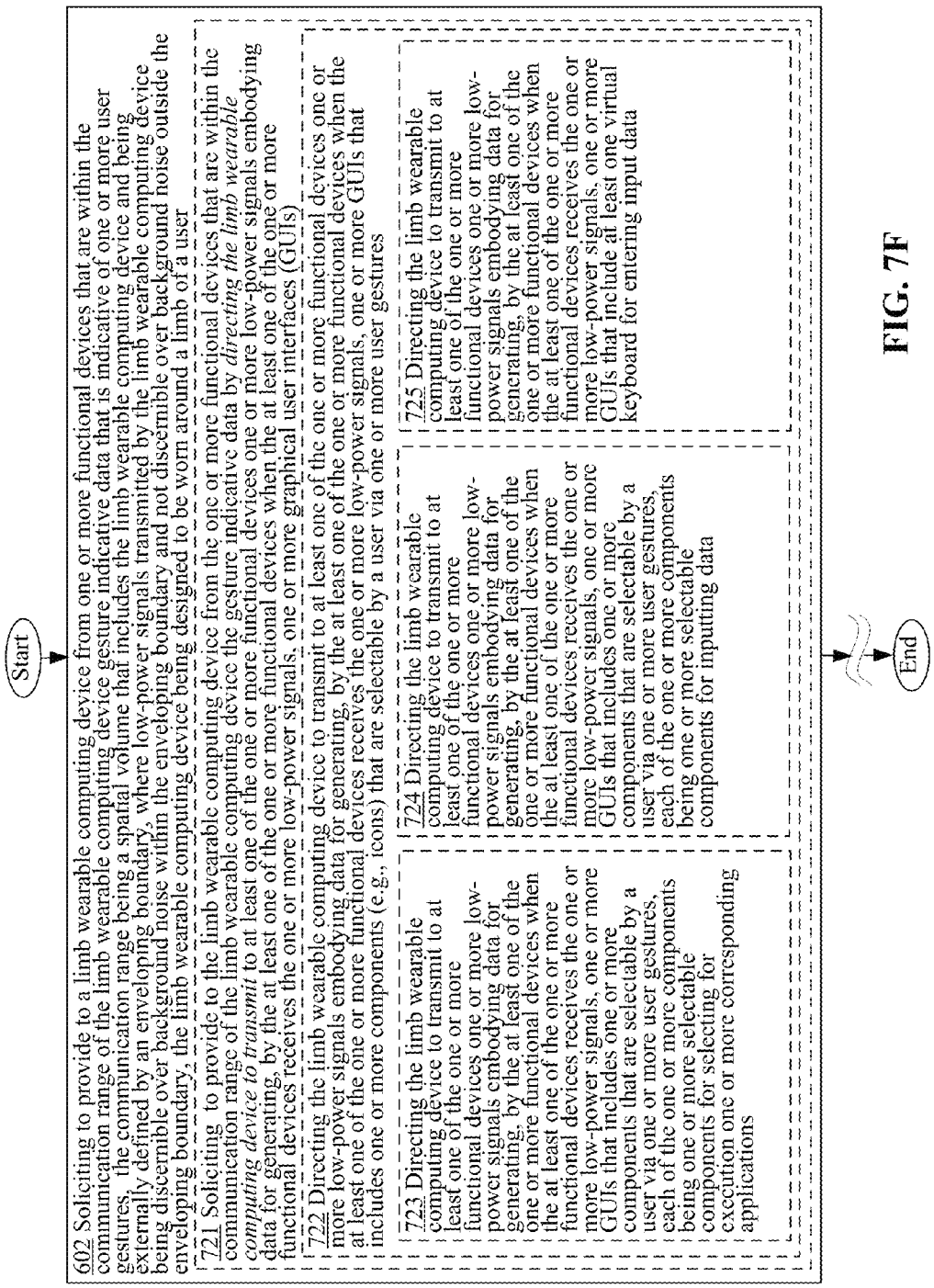
FIG. 7F is a high-level logic flowchart of a process depicting alternate implementations of the functional device soliciting operation 602 of FIG. 6.

Referring to FIG. 7F, in some implementations, the functional device soliciting operation 602 may include or involve an operation 721 for soliciting to provide to the limb wearable computing device from the one or more functional devices that are within the communication range of the limb wearable computing device the gesture indicative data by directing the limb wearable computing device to transmit to at least one of the one or more functional devices one or more low-power signals embodying data for generating, by the at least one of the one or more functional devices when the at least one of the one or more functional devices receives the one or more low-power signals, one or more graphical user interfaces (GUIs). For instance, the functional device soliciting module 102* including the GUI data transmit directing module 506 (see FIG. 5A) of the limb wearable computing device 10* of FIG. 4A or 4B soliciting to provide to the limb wearable computing device 10* from the one or more functional devices 20* that are within the communication range 50* of the limb wearable computing device 10* the gesture indicative data 87* by having the GUI data transmit directing module 506 direct or instruct the limb wearable computing device 10* to transmit to at least one (e.g., the functional device 20b of FIG. 2C) of the one or more functional devices 20* one or more low-power GUI data signals 81 (see FIG. 2C) embodying data for generating, by the at least one of the one or more functional devices 20* when the at least one of the one or more functional devices 20* receives the one or more low-power GUI data signals 81, one or more graphical user interfaces (GUIs). Such GUIs (e.g., a virtual keyboard displayed through an augmented reality device such as the computing glasses 20b of (FIG. 1D) may be designed to, when displayed to a user 2, prompt the user 2 to exhibit particular user gestures (e.g., hand gestures).

As further illustrated in FIG. 7F, operation 721 may include one or more additional operations in various alternative implementations, including, in some cases, an operation 722 for directing the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that includes one or more components that are selectable by a user via one or more user gestures. For instance, the GUI data transmit directing module 506 of the limb wearable computing device 10* of FIG. 4A or 4B directing the limb wearable computing device 10* to transmit to at least one of the one or more functional devices 20* one or more low-power GUI data signals 81 embodying data for generating, by the at least one of the one or more functional devices 20* when the at least one of the one or more functional devices 20* receives the one or more low-power GUI data signals 81, one or more GUIs that includes one or more components (e.g., icons 312* of, for example, FIG. 3C) that are selectable by a user 2 via one or more user gestures. For example, if the augmented view 310 of FIG. 3C is presented to a user 2, then the user 2 may select one of the icons 312a, 312b, or 312c using hand gestures (e.g., finger tapping an icon) in order to activate an associated application.

In some cases, operation 722 may, in turn, further include or involve an operation 723 for directing the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that includes one or more components that are selectable by a user via one or more user gestures, each of the one or more components being one or more selectable components for selecting for execution one or more corresponding applications. For instance, the GUI data transmit directing module 506 of the limb wearable computing device 10* of FIG. 4A or 4B directing the limb wearable computing device 10* to transmit to at least one (e.g., functional device 20b of FIG. 2C) of the one or more functional devices 20* one or more low-power GUI data signals 81 embodying data for generating, by the at least one (e.g., functional device 20b) of the one or more functional devices 20* when the at least one (e.g., functional device 20b) of the one or more functional devices 20* receives the one or more low-power GUI data signals 81, one or more GUIs (e.g., GUI 311 of FIG. 3C) that includes one or more components (e.g., icons 312a, 312b, and 312c) that are selectable by a user 2 via one or more user gestures (e.g., finger gestures), each of the one or more components (e.g., icons 312a, 312b, and 312c) being one or more selectable components for selecting for execution one or more corresponding applications (e.g., a gaming application, an electronic messaging application, an audio application, and so forth as illustrated, for example, in FIG. 3C).

In some cases, operation 722 may include or involve an operation 724 for directing the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that includes one or more components that are selectable by a user via one or more user gestures, each of the one or more components being one or more selectable components for inputting data. For instance, the GUI data transmit directing module 506 of the limb wearable computing device 10* of FIG. 4A or 4B directing the limb wearable computing device 10* to transmit to at least one (e.g., functional device 20b of FIG. 2C) of the one or more functional devices 20* one or more low-power GUI data signals 81 embodying data for generating, by the at least one (e.g., functional device 20b) of the one or more functional devices 20* when the at least one (e.g., functional device 20b) of the one or more functional devices 20* receives the one or more low-power GUI data signals 81, one or more GUIs (e.g., virtual keyboard 314 of FIG. 3D) that includes one or more components (e.g., virtual keys 315) that are selectable by a user 2 via one or more user gestures (e.g., finger gestures), each of the one or more components (e.g., virtual keys 315) being one or more selectable components for inputting data (e.g., textual data).

In some cases, operation 722 may include or involve an operation 725 for directing the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that include at least one virtual keyboard for entering input data. For instance, the GUI data transmit directing module 506 of the limb wearable computing device 10* of FIG. 4A or 4B directing the limb wearable computing device 10* to transmit to at least one (e.g., functional device 20b) of the one or more functional devices 20* one or more low-power GUI data signals 81 embodying data for generating, by the at least one (e.g., functional device 20b) of the one or more functional devices 20* when the at least one (e.g., functional device 20b) of the one or more functional devices 20* receives the one or more low-power GUI data signals 81, one or more GUIs that include at least one virtual keyboard 314 for entering input data.

Figure 7G:
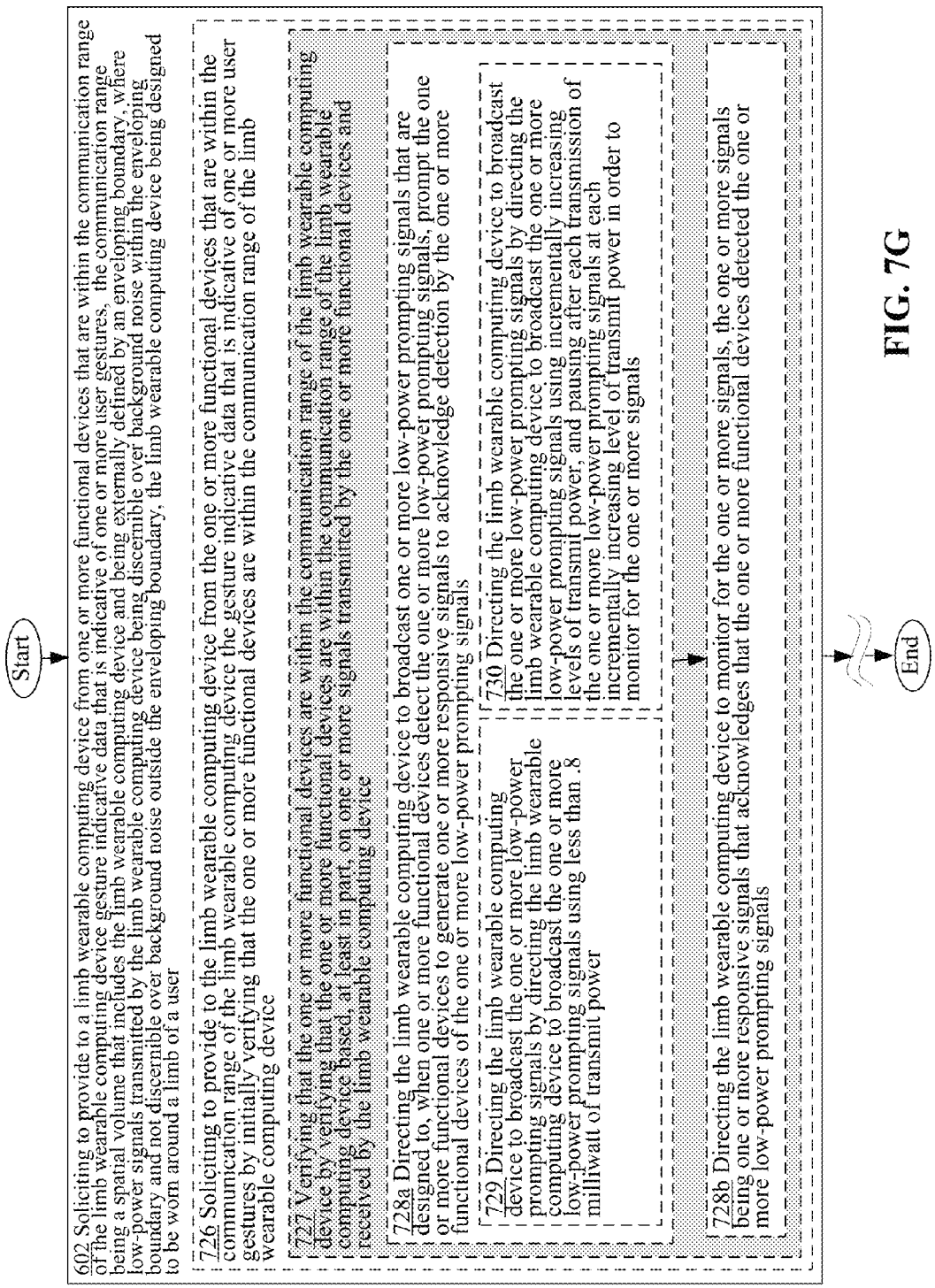
FIG. 7G is a high-level logic flowchart of a process depicting alternate implementations of the functional device soliciting operation 602 of FIG. 6.

Referring to FIG. 7G, in some implementations, the functional device soliciting operation 602 may include or involve an operation 726 for soliciting to provide to the limb wearable computing device from the one or more functional devices that are within the communication range of the limb wearable computing device the gesture indicative data that is indicative of one or more user gestures by initially verifying that the one or more functional devices are within the communication range of the limb wearable computing device. For instance, the functional device soliciting module 102* including the nearby verifying module 508 (see FIG. 5A) of the limb wearable computing device 10* of FIG. 4A or 4B soliciting to provide to the limb wearable computing device 10* from the one or more functional devices 20* that are within the communication range 50* of the limb wearable computing device 10* the gesture indicative data 87* that is indicative of one or more user gestures by having the nearby verifying module 508 initially verifying (e.g., ascertaining or determining) that the one or more functional devices 20* are indeed within the communication range 50* of the limb wearable computing device 10*.

In some implementations, operation 726 may, in turn, further include or involve an operation 727 for verifying that the one or more functional devices are within the communication range of the limb wearable computing device by verifying that the one or more functional devices are within the communication range of the limb wearable computing device based, at least in part, on one or more signals transmitted by the one or more functional devices and received by the limb wearable computing device. For instance, the nearby verifying module 508 of the limb wearable computing device 10* of FIG. 4A or 4B verifying that the one or more functional devices 20* are within the communication range 50* of the limb wearable computing device 10* by verifying (e.g., ascertaining or determining) that the one or more functional devices 20* are within the communication range 50* of the limb wearable computing device 10* based, at least in part, on one or more signals 83* transmitted by the one or more functional devices 20* and received by the limb wearable computing device 10*.

As further illustrated in FIG. 7G, operation 727 may actually include or involve an operation 728a for directing the limb wearable computing device to broadcast one or more low-power prompting signals that are designed to, when one or more functional devices detect the one or more low-power prompting signals, prompt the one or more functional devices to generate one or more responsive signals to acknowledge detection by the one or more functional devices of the one or more low-power prompting signals and an operation 728b for directing the limb wearable computing device to monitor for the one or more signals, the one or more signals being one or more responsive signals that acknowledges that the one or more functional devices detected the one or more low-power prompting signals. For instance, the low-power prompting signal broadcast directing module 510 (see FIG. 5A) of the limb wearable computing device 10* of FIG. 4A or 4B directing (e.g., instructing or controlling) the limb wearable computing device 10* to broadcast one or more low-power prompting signals 82 that are designed to, when one or more functional devices 20* detect the one or more low-power prompting signals 82, prompt the one or more functional devices 20* to generate one or more responsive signals (e.g., signals 83*) to acknowledge detection by the one or more functional devices 20* of the one or more low-power prompting signals 82, and the responsive signal monitor directing module 511 (see FIG. 5A) of the limb wearable computing device 10* of FIG. 4A or 4B directing (e.g., instructing or controlling) the limb wearable computing device 10* to monitor for the one or more signals 83*, the one or more signals 83* being one or more responsive signals that acknowledges that the one or more functional devices 20* detected the one or more low-power prompting signals 82.

In some implementations, operation 728a may actually include or involve an operation 729 for directing the limb wearable computing device to broadcast the one or more low-power prompting signals by directing the limb wearable computing device to broadcast the one or more low-power prompting signals using less than 0.8 milliwatt of transmit power. For instance, the low-power prompting signal broadcast directing module 510 of the limb wearable computing device 10* of FIG. 4A or 4B directing the limb wearable computing device 10* to broadcast the one or more low-power prompting signals 82 by directing the limb wearable computing device 10* to broadcast the one or more low-power prompting signals 82 using less than 0.8 milliwatt of transmit power (e.g., 0.5 milliwatt of transmit power).

In the same or alternative implementations, operation 728a may include or involve an operation 730 for directing the limb wearable computing device to broadcast the one or more low-power prompting signals by directing the limb wearable computing device to broadcast the one or more low-power prompting signals using incrementally increasing levels of transmit power, and pausing after each transmission of the one or more low-power prompting signals at each incrementally increasing levels of transmit power in order to monitor for the one or more signals. For instance, the low-power prompting signal broadcast directing module 510 of the limb wearable computing device 10* of FIG. 4A or 4B directing the limb wearable computing device 10* to broadcast the one or more low-power prompting signals 82 by directing the limb wearable computing device 10* to broadcast the one or more low-power prompting signals 82 using incrementally increasing levels of transmit power (e.g., 0.1 milliwatt, 0.2 milliwatt, 0.3 milliwatt, and so forth), and pausing after each transmission of the one or more low-power prompting signals 82 at each incrementally increasing level of transmit power in order to monitor for the one or more signals 83*.

Figure 7H:
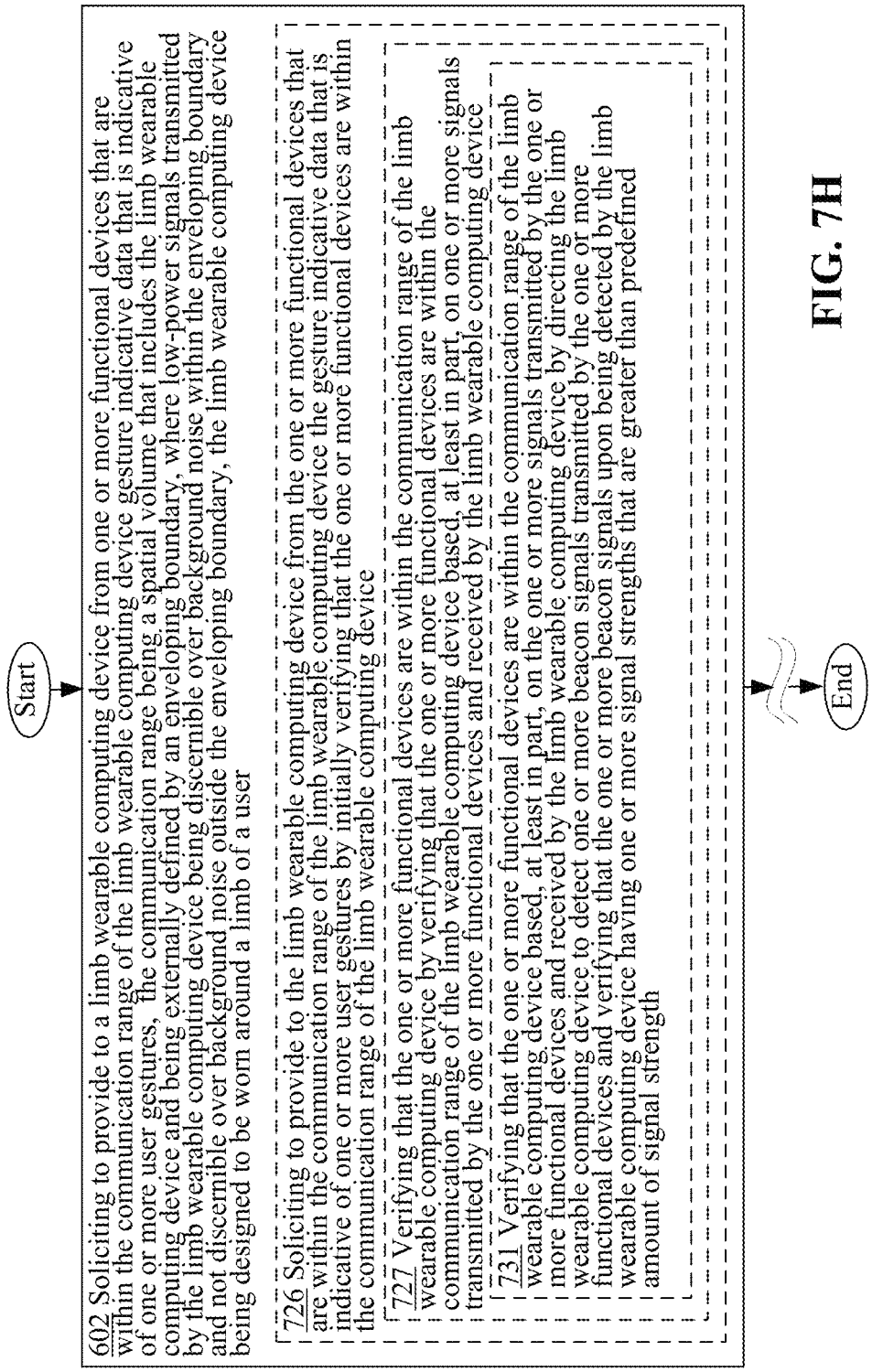
FIG. 7H is a high-level logic flowchart of a process depicting alternate implementations of the functional device soliciting operation 602 of FIG. 6.

Turning to FIG. 7H, in some implementations, operation 727 may actually involve or involve an operation 731 for verifying that the one or more functional devices are within the communication range of the limb wearable computing device based, at least in part, on the one or more signals transmitted by the one or more functional devices and received by the limb wearable computing device by directing the limb wearable computing device to detect one or more beacon signals transmitted by the one or more functional devices and verifying that the one or more beacon signals upon being detected by the limb wearable computing device having one or more signal strengths that are greater than predefined amount of signal strength. For instance, the nearby verifying module 508 including the beacon signal detection directing module 512 (see FIG. 5A) of the limb wearable computing device 10* of FIG. 4A or 4B verifying (e.g., determining or ascertaining) that the one or more functional devices 20* are within the communication range 50* of the limb wearable computing device 10* based, at least in part, on the one or more signals 83* transmitted by the one or more functional devices 20* and received by the limb wearable computing device 10* by having the beacon signal detection directing module 512 direct the limb wearable computing device 10* to detect one or more beacon signals (e.g., one or more signals 83*) transmitted by the one or more functional devices 20* and verifying that the one or more beacon signals (e.g., one or more signals 83*) upon being detected by the limb wearable computing device 10* having one or more signal strengths that are greater than predefined amount of signal strength. That is, if the received beacon signals are detected as being weaker signals than some predefined signal strength, then that may indicate or suggest that the functional devices 20* that transmitted the beacon signals may be outside the communication range 50* of the limb wearable computing device 10*.

Figure 8B:
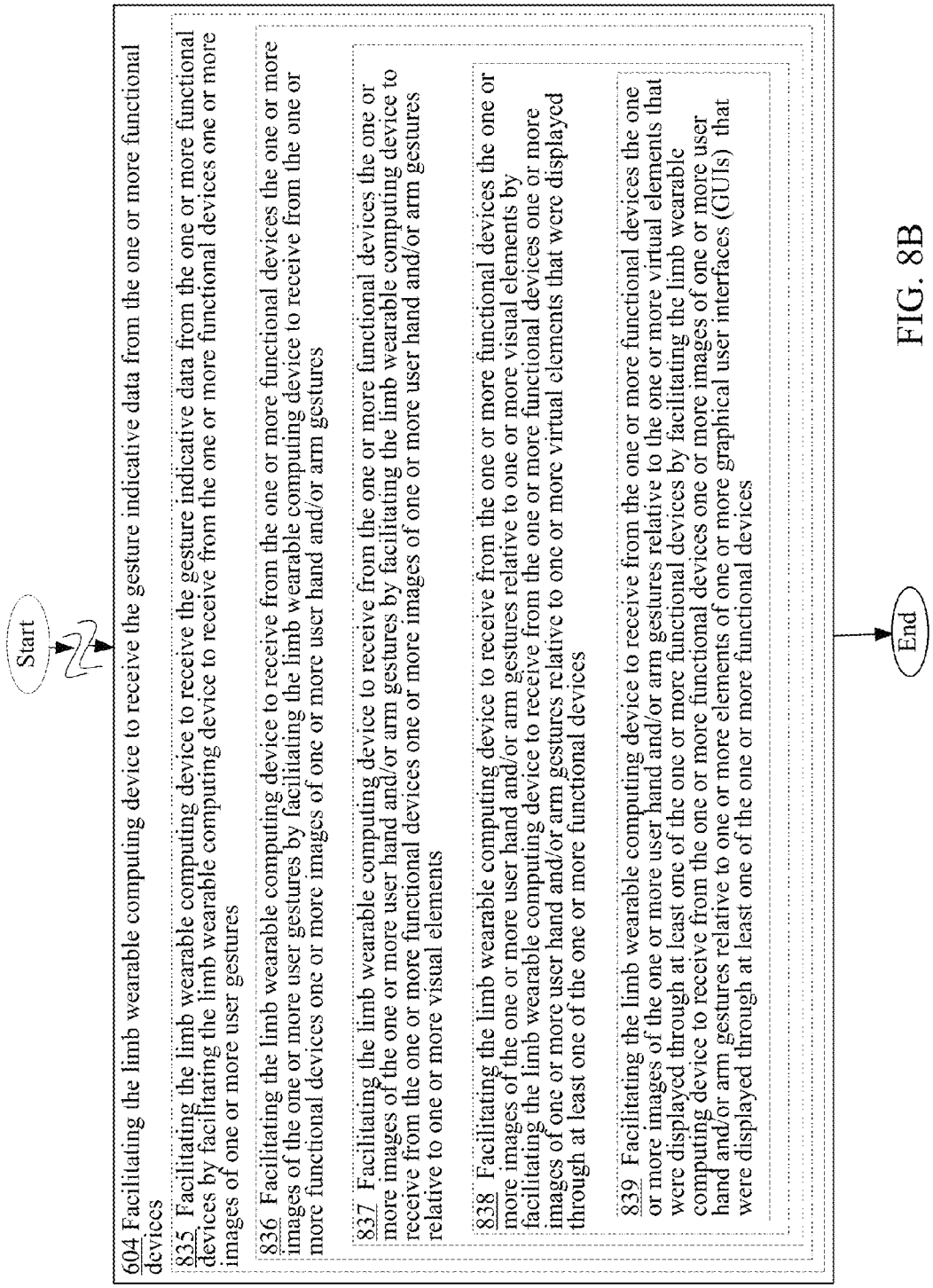
FIG. 8B is a high-level logic flowchart of a process depicting alternate implementations of the gesture indicative data reception facilitating operation 604 of FIG. 6.

Referring back to the gesture indicative data reception facilitating operation 604 of FIG. 6, the gesture indicative data reception facilitating operation 604 similar to the functional device soliciting operation 602 of FIG. 6 may be executed in a number of different ways in various alternative embodiments as illustrated, for example, in FIGS. 8A, 8B, 8C, and 8D. In some cases, for example, the gesture indicative data reception facilitating operation 604 may actually include or involve an operation 832 for facilitating the limb wearable computing device to receive the gesture indicative data from the one or more functional devices by directing one or more components of the limb wearable computing device to receive one or more data signals embodying the gesture indicative data from the one or more functional devices as illustrated in FIG. 8A. For instance, the gesture indicative data receive facilitating module 104* including the data receive component directing module 514 (see FIG. 5B) of the limb wearable computing device 10* of FIG. 4A or 4B facilitating the limb wearable computing device 10* to receive the gesture indicative data 87* from the one or more functional devices 20* by having the data receive component directing module 514 direct (e.g., instruct or control) one or more components (e.g., transceiver 118, antenna 130, and so forth) of the limb wearable computing device 10* to receive one or more data signals embodying the gesture indicative data 87* from the one or more functional devices 20*.

In some implementations, operation 832 may further include or involve an operation 833 for directing the one or more components of the limb wearable computing device to receive the one or more data signals embodying the gesture indicative data from the one or more functional devices by directing at least a transceiver of the limb wearable computing device to receive the one or more data signals from the one or more functional devices. For instance, the data receive component directing module 514 of the limb wearable computing device 10* of FIG. 4A or 4B directing the one or more components of the limb wearable computing device 10* to receive the one or more data signals embodying the gesture indicative data 87* from the one or more functional devices 20* by directing at least a transceiver 118 of the limb wearable computing device 10* to receive the one or more data signals from the one or more functional devices 20*.

In the same or alternative implementations, operation 832 may alternatively or additionally include or involve an operation 834 for directing the one or more components of the limb wearable computing device to receive the one or more data signals embodying the gesture indicative data from the one or more functional devices by pointing a directional antenna of the limb wearable computing device towards the one or more functional devices in order to receive the one or more data signals from the one or more functional devices. For instance, the data receive component directing module 514 including the directional antenna pointing module 516 (see FIG. 5B) of the limb wearable computing device 10* of FIG. 4A or 4B directing the one or more components of the limb wearable computing device 10* to receive the one or more data signals embodying the gesture indicative data 87* from the one or more functional devices 20* by having the directional antenna pointing module 516 point a directional antenna of the limb wearable computing device 10* towards the one or more functional devices 20* in order to receive the one or more data signals embodying the gesture indicative data 87* from the one or more functional devices 20*. In some embodiments, in order to properly point the directional antenna towards the one or more functional devices 20*, the locations or directions of the one or more functional devices 20* relative to the location of the limb wearable computing device 10* may be initially determined and logged by, for example, the limb wearable computing device 10*.

Turning to FIG. 8B, in various implementations, the gesture indicative data reception facilitating operation 604 may further include or involve an operation 835 for facilitating the limb wearable computing device to receive the gesture indicative data from the one or more functional devices by facilitating the limb wearable computing device to receive from the one or more functional devices one or more images of one or more user gestures. For instance, the gesture indicative data receive facilitating module 104* including the image receive facilitating module 518 (see FIG. 5B) of the limb wearable computing device 10* of FIG. 4A or 4B facilitating the limb wearable computing device 10* to receive the gesture indicative data 87* from the one or more functional devices 20* by having the image receive facilitating module 518 facilitate the limb wearable computing device 10* (e.g., direct or configure the one or more components of the limb wearable computing device 10*) to receive from the one or more functional devices 20* one or more images (via gesture indicative data 87*) of one or more user gestures (e.g., hand and/or arm gestures including, for example, American sign language).

In some cases, operation 835 may, in turn, further include an operation 836 for facilitating the limb wearable computing device to receive from the one or more functional devices the one or more images of the one or more user gestures by facilitating the limb wearable computing device to receive from the one or more functional devices one or more images of one or more user hand and/or arm gestures. For instance, the image receive facilitating module 518 of the limb wearable computing device 10* of FIG. 4A or 4B facilitating the limb wearable computing device 10* to receive from the one or more functional devices 20* the one or more images of the one or more user gestures by facilitating the limb wearable computing device 10* (e.g., directing or configuring the one or more components of the limb wearable computing device 10*) to receive from the one or more functional devices 20* one or more images (via gesture indicative data 87*) of one or more user hand and/or arm gestures.

In some cases, operation 836 may further include or involve an operation 837 for facilitating the limb wearable computing device to receive from the one or more functional devices the one or more images of the one or more user hand and/or arm gestures by facilitating the limb wearable computing device to receive from the one or more functional devices one or more images of one or more user hand and/or arm gestures relative to one or more visual elements. For instance, the image receive facilitating module 518 of the limb wearable computing device 10* of FIG. 4A or 4B facilitating the limb wearable computing device 10* to receive from the one or more functional devices 20* the one or more images of the one or more user hand and/or arm gestures by facilitating the limb wearable computing device 10* to receive from the one or more functional devices 20* one or more images (via gesture indicative data 87*) of one or more user hand and/or arm gestures relative to one or more visual elements. For example, images of a user's hand making gestures over the limb wearable computing device 10* or a keypad.

In some implementations, operation 837 may further include or involve an operation 838 for facilitating the limb wearable computing device to receive from the one or more functional devices the one or more images of the one or more user hand and/or arm gestures relative to one or more visual elements by facilitating the limb wearable computing device to receive from the one or more functional devices one or more images of one or more user hand and/or arm gestures relative to one or more virtual elements that were displayed through at least one of the one or more functional devices. For instance, the image receive facilitating module 518 of the limb wearable computing device 10* of FIG. 4A or 4B facilitating the limb wearable computing device 10* to receive from the one or more functional devices 20* the one or more images of the one or more user hand and/or arm gestures relative to one or more visual elements by facilitating the limb wearable computing device 10* to receive from the one or more functional devices 20* one or more images (via gesture indicative data 87b) of one or more user hand and/or arm gestures relative to one or more virtual elements (e.g., image of at least a portion of the dial face or display of the limb wearable computing device 10*) that were displayed through at least one (e.g., the functional device 20b of FIGS. 1A, 2A, 2B, and 2C) of the one or more functional devices 20*.

In some implementations, operation 838 may further include or involve an operation 839 for facilitating the limb wearable computing device to receive from the one or more functional devices the one or more images of the one or more user hand and/or arm gestures relative to the one or more virtual elements that were displayed through at least one of the one or more functional devices by facilitating the limb wearable computing device to receive from the one or more functional devices one or more images of one or more user hand and/or arm gestures relative to one or more elements of one or more graphical user interfaces (GUIs) that were displayed through at least one of the one or more functional devices. For instance, the image receive facilitating module 518 of the limb wearable computing device 10* of FIG. 4A or 4B facilitating the limb wearable computing device 10* to receive from the one or more functional devices 20* the one or more images of the one or more user hand and/or arm gestures relative to the one or more virtual elements that were displayed through at least one of the one or more functional devices 20* by facilitating the limb wearable computing device 10* to receive from the one or more functional devices 20* one or more images (via gesture indicative data 87*b*) of one or more user hand and/or arm gestures relative to one or more elements of one or more GUIs (e.g., the GUI 311 of FIG. 3C or the virtual keyboard 314 of FIG. 3D) that were displayed through at least one of the one (e.g., the functional device 20***b* of FIGS. 1A, 2A, 2B, and 2C) or more functional devices 20*.

Figure 8C:
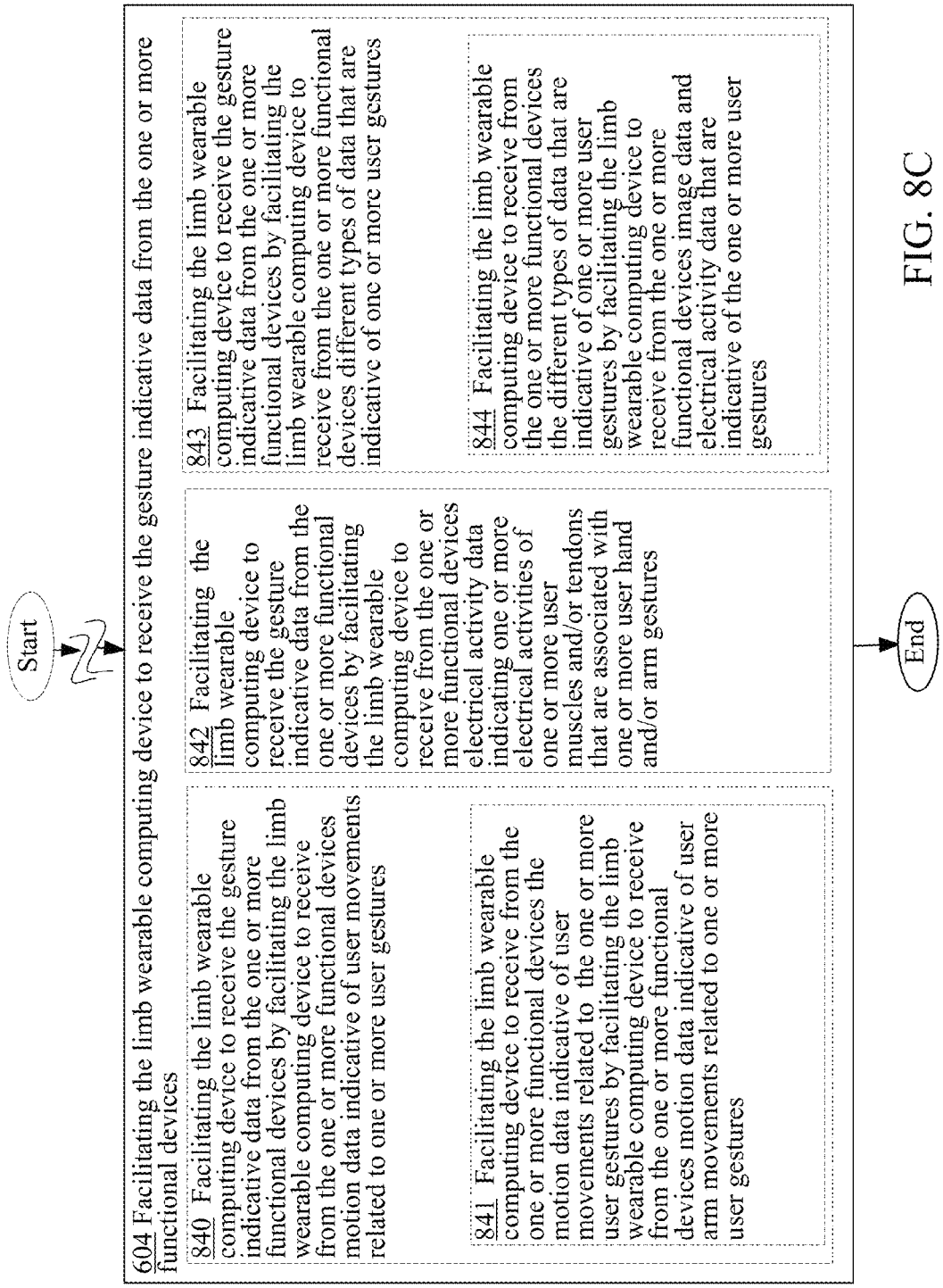
FIG. 8C is a high-level logic flowchart of a process depicting alternate implementations of the gesture indicative data reception facilitating operation 604 of FIG. 6.

Referring to FIG. 8C, in various implementations, the gesture indicative data reception facilitating operation 604 may further include or involve an operation 840 for facilitating the limb wearable computing device to receive the gesture indicative data from the one or more functional devices by facilitating the limb wearable computing device to receive from the one or more functional devices motion data indicative of user movements related to one or more user gestures. For instance, the gesture indicative data receive facilitating module 104* including the motion data receive facilitating module 520 (see FIG. 5B) of the limb wearable computing device 10* of FIG. 4A or 4B facilitating the limb wearable computing device 10* to receive the gesture indicative data 87* from the one or more functional devices 20* by having the motion data receive facilitating module 520 facilitate the limb wearable computing device 10* (e.g., direct or configure the one or more components of the limb wearable computing device 10*) to receive from the one or more functional devices 20* (e.g., functional device 20*a* of FIGS. 1A, 2A, 2B, and 2C) motion data indicative of user movements (e.g., arm movements) related to one or more user gestures.

In some cases, operation 840 may further include an operation 841 for facilitating the limb wearable computing device to receive from the one or more functional devices the motion data indicative of user movements related to the one or more user gestures by facilitating the limb wearable computing device to receive from the one or more functional devices motion data indicative of user arm movements related to one or more user gestures. For instance, the motion data receive facilitating module 520 of the limb wearable computing device 10* of FIG. 4A or 4B facilitating the limb wearable computing device 10* to receive from the one or more functional devices 20* (e.g., functional device 20*a*) the motion data indicative of user movements related to the one or more user gestures by facilitating the limb wearable computing device 10* (e.g., directing or configuring the one or more components of the limb wearable computing device 10*) to receive from the one or more functional devices 20* motion data indicative of user arm movements related to one or more user gestures.

In the same or alternative implementations, the gesture indicative data reception facilitating operation 604 may additionally or alternatively include an operation 842 for facilitating the limb wearable computing device to receive the gesture indicative data from the one or more functional devices by facilitating the limb wearable computing device to receive from the one or more functional devices electrical activity data indicating one or more electrical activities of one or more user muscles and/or tendons that are associated with one or more user hand and/or arm gestures. For instance, the gesture indicative data receive facilitating module 104* including the electrical activity data receive facilitating module 522 (see FIG. 5B) of the limb wearable computing device 10* of FIG. 4A or 4B facilitating the limb wearable computing device 10* to receive the gesture indicative data 87* from the one or more functional devices 20* by having the electrical activity data receive facilitating module 522 facilitate the limb wearable computing device 10* (e.g., direct or configure the one or more components of the limb wearable computing device 10*) to receive from the one or more functional devices 20* (e.g., the functional device 20*a* of FIGS. 1A, 2A, 2B, and 2C) electrical activity data indicating one or more electrical activities of one or more user muscles and/or tendons that are associated with one or more user hand and/or arm gestures.

In the same or alternative implementations, the gesture indicative data reception facilitating operation 604 may additionally or alternatively include an operation 843 for facilitating the limb wearable computing device to receive the gesture indicative data from the one or more functional devices by facilitating the limb wearable computing device to receive from the one or more functional devices different types of data that are indicative of one or more user gestures. For instance, the gesture indicative data receive facilitating module 104* of the limb wearable computing device 10* of FIG. 4A or 4B facilitating the limb wearable computing device 10* to receive the gesture indicative data 87* from the one or more functional devices 20* by facilitating the limb wearable computing device 10* (e.g., directing or configuring the one or more components of the limb wearable computing device 10*) to receive from the one or more functional devices 20* different types of data (e.g., image data, motion data, electrical activity data, and so forth) that are indicative of one or more user gestures.

In some implementations, operation 843, in turn, may further include or involve an operation 844 for facilitating the limb wearable computing device to receive from the one or more functional devices the different types of data that are indicative of one or more user gestures by facilitating the limb wearable computing device to receive from the one or more functional devices image data and electrical activity data that are indicative of the one or more user gestures. For instance, the gesture indicative data receive facilitating module 104* of the limb wearable computing device 10* of FIG. 4A or 4B facilitating the limb wearable computing device 10* to receive from the one or more functional devices 20* the different types of data that are indicative of one or more user gestures by facilitating the limb wearable computing device 10* to receive from the one or more functional devices 20* image data and electrical activity data that are indicative of the one or more user gestures.

Figure 8D:
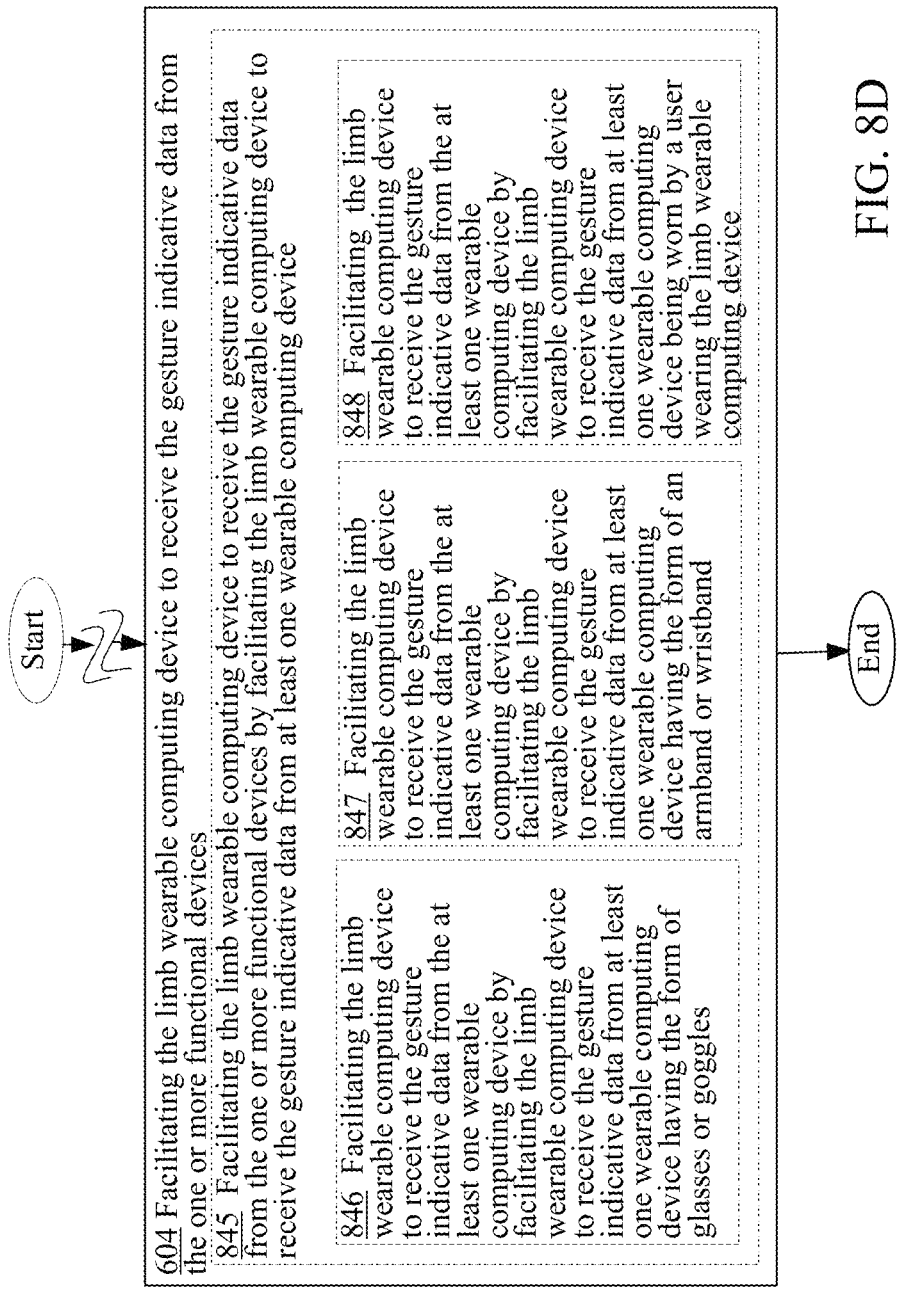
FIG. 8D is a high-level logic flowchart of a process depicting alternate implementations of the gesture indicative data reception facilitating operation 604 of FIG. 6.

Turning to FIG. 8D, in various implementations, the gesture indicative data reception facilitating operation 604 may further include or involve an operation 845 for facilitating the limb wearable computing device to receive the gesture indicative data from the one or more functional devices by facilitating the limb wearable computing device to receive the gesture indicative data from at least one wearable computing device. For instance, the gesture indicative data receive facilitating module 104* of the limb wearable computing device 10* of FIG. 4A or 4B facilitating the limb wearable computing device 10* to receive the gesture indicative data 87* from the one or more functional devices 20* by facilitating the limb wearable computing device 10* to receive the gesture indicative data 87* from at least one wearable computing device (e.g., functional device 20*a* or functional device 20*b* of FIG. 1A).

As further illustrated in FIG. 8D, operation 845 may include one or more additional operations in various alternative implementations including, in some cases, an operation 846 for facilitating the limb wearable computing device to receive the gesture indicative data from the at least one wearable computing device by facilitating the limb wearable computing device to receive the gesture indicative data from at least one wearable computing device having the form of glasses or goggles. For instance, the gesture indicative data receive facilitating module 104* of the limb wearable computing device 10* of FIG. 4A or 4B facilitating the limb wearable computing device 10* to receive the gesture indicative data 87* from the at least one wearable computing device by facilitating the limb wearable computing device 10* to receive the gesture indicative data 87b from at least one wearable computing device (e.g., functional device 20b of FIG. 1A) having the form of glasses or goggles.

In the same or alternative implementations, operation 845 may additionally or alternatively include an operation 847 for facilitating the limb wearable computing device to receive the gesture indicative data from the at least one wearable computing device by facilitating the limb wearable computing device to receive the gesture indicative data from at least one wearable computing device having the form of an armband or wristband. For instance, the gesture indicative data receive facilitating module 104* of the limb wearable computing device 10* of FIG. 4A or 4B facilitating the limb wearable computing device 10* to receive the gesture indicative data 87* from the at least one wearable computing device by facilitating the limb wearable computing device 10* to receive the gesture indicative data 87* from at least one wearable computing device (e.g., functional device 20a of FIG. 1A) having the form of an armband or wristband.

In the same or alternative implementations, operation 845 may additionally or alternatively include an operation 848 for facilitating the limb wearable computing device to receive the gesture indicative data from the at least one wearable computing device by facilitating the limb wearable computing device to receive the gesture indicative data from at least one wearable computing device being worn by a user wearing the limb wearable computing device. For instance, the gesture indicative data receive facilitating module 104* of the limb wearable computing device 10* of FIG. 4A or 4B facilitating the limb wearable computing device 10* to receive the gesture indicative data 87* from the at least one wearable computing device by facilitating the limb wearable computing device 10* to receive the gesture indicative data 87* from at least one wearable computing device (e.g., functional device 20a or functional device 20b) being worn by a user 2 wearing the limb wearable computing device 10*.

Figure 9:
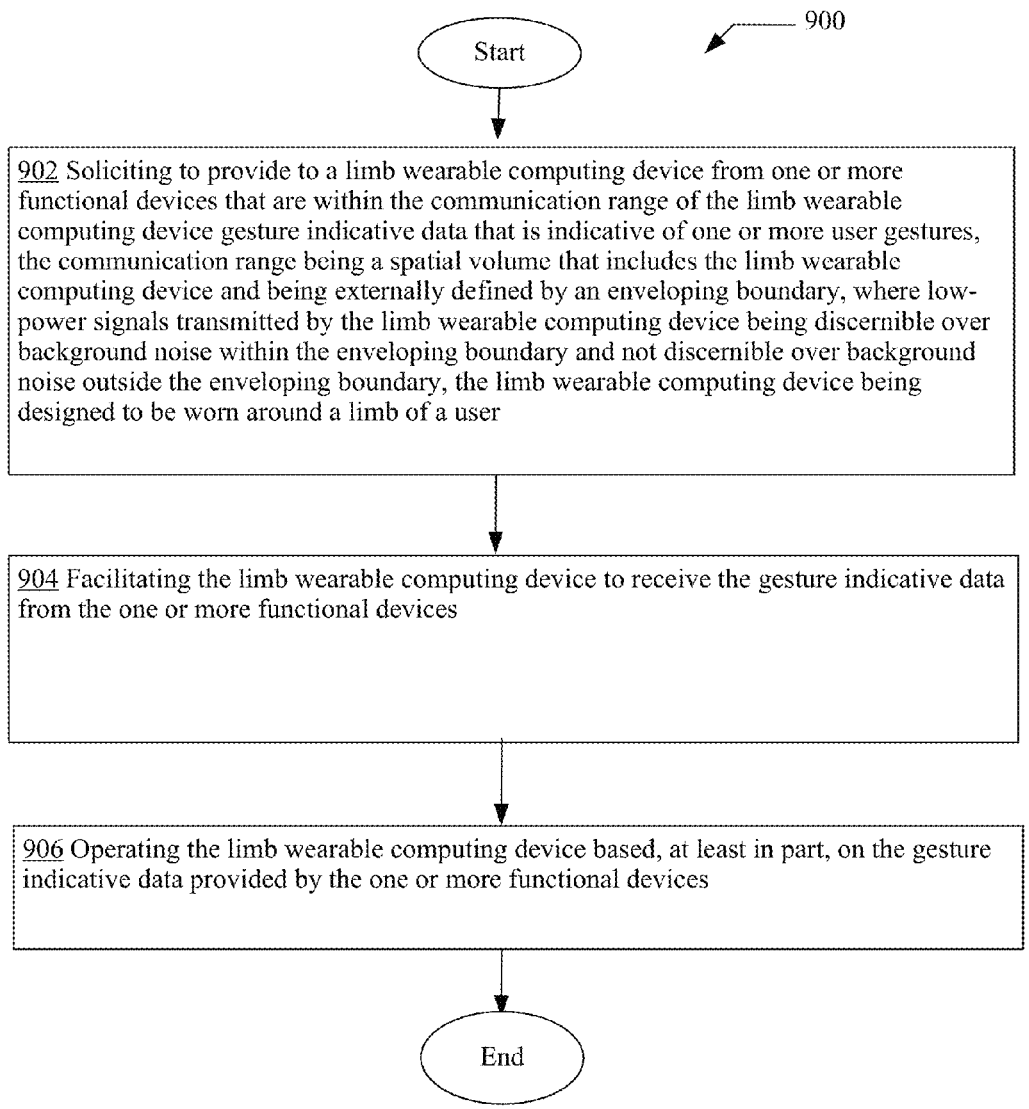
FIG. 9 is another high-level logic flowchart of another process, e.g., operational flow 900, according to some embodiments.

Turning now to FIG. 9 illustrating another operational flow 900. Operational flow 900 includes certain operations that mirror the operations included in operational flow 600 of FIG. 6. These operations include a functional device soliciting operation 902 and a gesture indicative data reception facilitating operation 904 that corresponds to and mirrors the functional device soliciting operation 602 and the gesture indicative data reception facilitating operation 604, respectively, of FIG. 6.

In addition, operational flow 900 further includes a device operating operation 906 for operating the limb wearable computing device based, at least in part, on the gesture indicative data provided by the one or more functional devices. For instance, the device operating module 106* of the limb wearable computing device 10* of FIG. 4A or 4B operating (e.g., instructing, controlling, or directing) the limb wearable computing device 10* based, at least in part, on the gesture indicative data 87* provided by the one or more functional devices 20*.

As further illustrated in FIGS. 10A, 10B, 10C, 10D, and 10E, the device operating operation 906 may be implemented in a number of different ways in various alternative implementations. For example, in some embodiments, the device operating operation 906 may include an operation 1049a for operating the limb wearable computing device by controlling what is being presented through a display of the limb wearable computing device based, at least in part, on the gesture indicative data provided by the one or more functional devices. For instance, the device operating module 106* including the device display control module 524 (see FIG. 5C) of the limb wearable computing device 10* of FIG. 4A or 4B operating the limb wearable computing device 10* by having the device display control module 524 control or direct what is being presented through a display 160 (see FIG. 1B) of the limb wearable computing device 10* based, at least in part, on the gesture indicative data 87* provided by the one or more functional devices 20*.

In the same or alternative implementations, the device operating operation 906 may additionally or alternatively include an operation 1050 for operating the limb wearable computing device by controlling execution of one or more applications of the limb wearable computing device based, at least in part, on the gesture indicative data provided by the one or more functional devices. For instance, the device operating module 106* including the application execution controlling module 526 (see FIG. 5C) of the limb wearable computing device 10* of FIG. 4A or 4B operating the limb wearable computing device 10* by controlling execution of one or more applications (e.g., messaging application, gaming application, audio application, chronographic application, and so forth) of the limb wearable computing device 10* based, at least in part, on the gesture indicative data 87* provided by the one or more functional devices 20*.

Figure 10A:
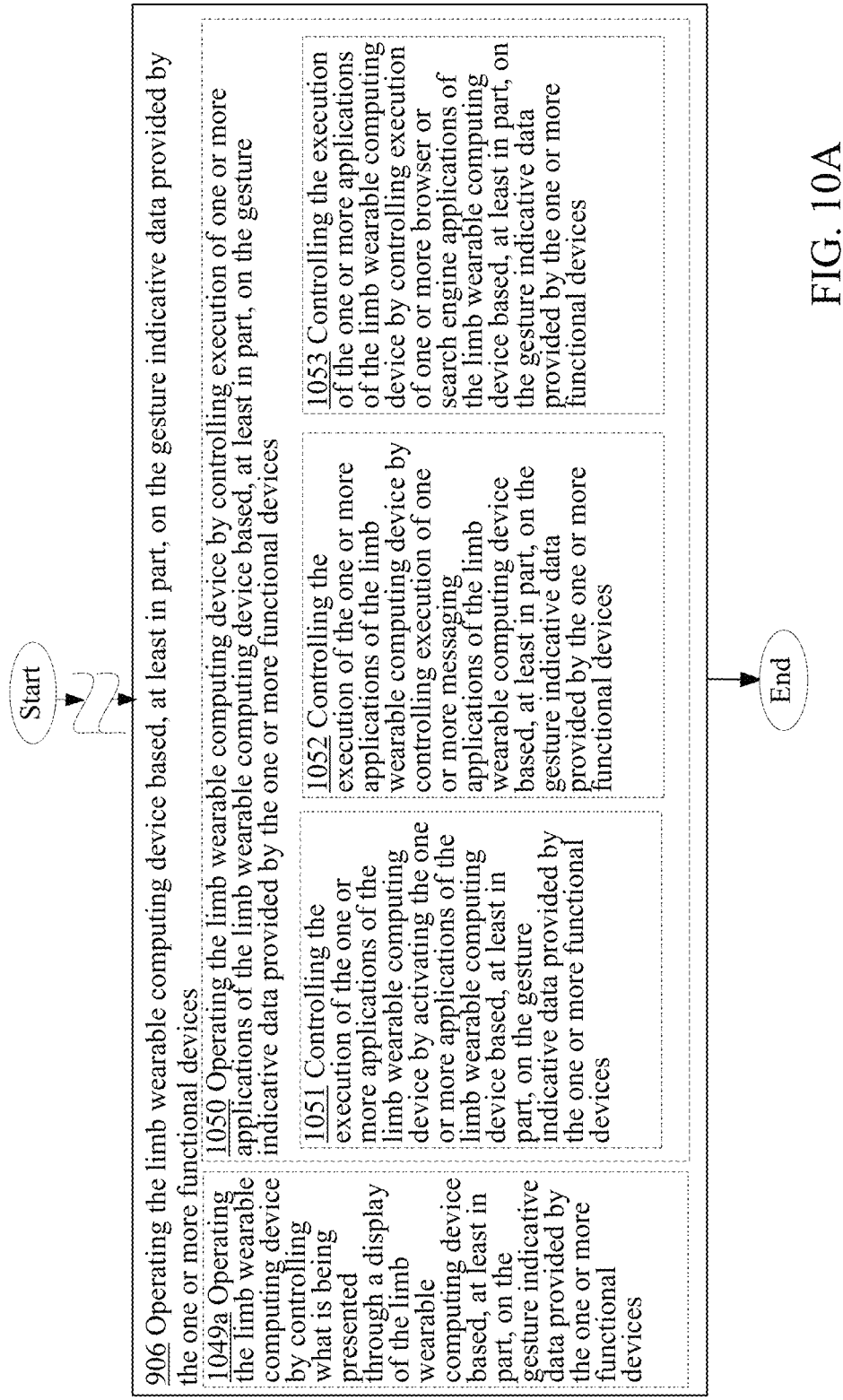
FIG. 10A is a high-level logic flowchart of a process depicting alternate implementations of the device operating operation 906 of FIG. 9.

As further illustrated in FIG. 10A, operation 1050 may further include or involve one or more additional operations in various alternative implementations, including, in some cases, an operation 1051 for controlling the execution of the one or more applications of the limb wearable computing device by activating the one or more applications of the limb wearable computing device based, at least in part, on the gesture indicative data provided by the one or more functional devices. For instance, the application execution controlling module 526 including the application activation module 528 (see FIG. 5C) of the limb wearable computing device 10* of FIG. 4A or 4B controlling the execution of the one or more applications of the limb wearable computing device 10* by having the application activation module 528 activate or initiate the one or more applications of the limb wearable computing device 10* based, at least in part, on the gesture indicative data 87* provided by the one or more functional devices 20*.

In the same or alternative implementations, operation 1050 may additionally or alternatively include an operation 1052 for controlling the execution of the one or more applications of the limb wearable computing device by controlling execution of one or more messaging applications of the limb wearable computing device based, at least in part, on the gesture indicative data provided by the one or more functional devices. For instance, the application execution controlling module 526 of the limb wearable computing device 10* of FIG. 4A or 4B controlling the execution of the one or more applications of the limb wearable computing device 10* by controlling or directing execution of one or more messaging applications (e.g., email application, instant messaging application, text messaging application, Voice over Internet Protocol or VoIP application, and so forth) of the limb wearable computing device 10* based, at least in part, on the gesture indicative data 87* provided by the one or more functional devices 20*.

In the same or alternative implementations, operation 1050 may additionally or alternatively include an operation 1053 for controlling the execution of the one or more applications of the limb wearable computing device by controlling execution of one or more browser or search engine applications of the limb wearable computing device based, at least in part, on the gesture indicative data provided by the one or more functional devices. For instance, the application execution controlling module 526 of the limb wearable computing device 10* of FIG. 4A or 4B controlling the execution of the one or more applications of the limb wearable computing device 10* by controlling or directing execution of one or more browser or search engine applications of the limb wearable computing device 10* based, at least in part, on the gesture indicative data 87* provided by the one or more functional devices 20*.

Figure 10B:
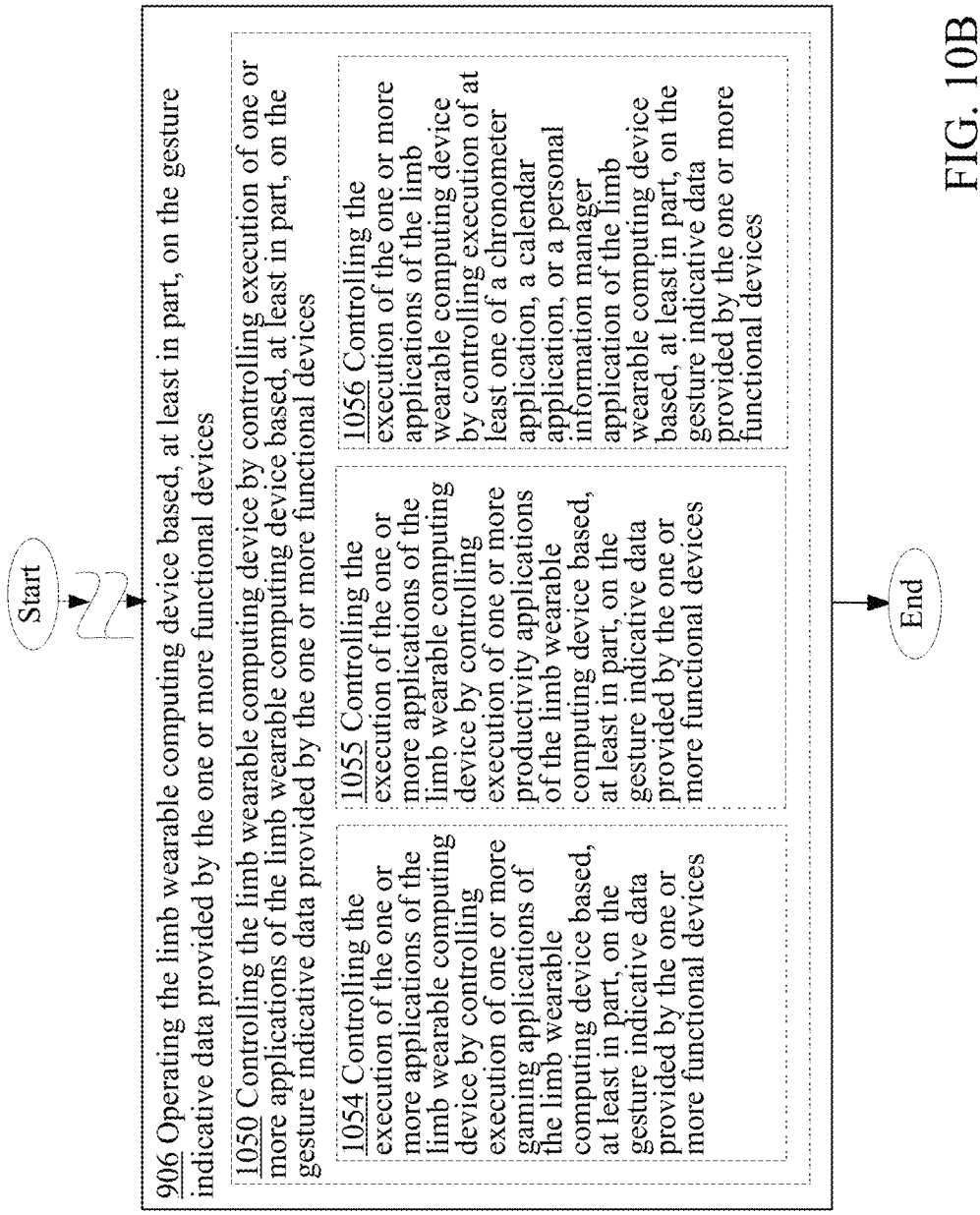
FIG. 10B is a high-level logic flowchart of a process depicting alternate implementations of the device operating operation 906 of FIG. 9.

In the same or alternative implementations, operation 1050 may additionally or alternatively include an operation 1054 for controlling the execution of the one or more applications of the limb wearable computing device by controlling execution of one or more gaming applications of the limb wearable computing device based, at least in part, on the gesture indicative data provided by the one or more functional devices as illustrate in FIG. 10B. For instance, the application execution controlling module 526 of the limb wearable computing device 10* of FIG. 4A or 4B controlling the execution of the one or more applications of the limb wearable computing device 10* by controlling or directing execution of one or more gaming applications of the limb wearable computing device 10* based, at least in part, on the gesture indicative data 87* provided by the one or more functional devices 20*.

In the same or alternative implementations, operation 1050 may additionally or alternatively include an operation 1055 for controlling the execution of the one or more applications of the limb wearable computing device by controlling execution of one or more productivity applications of the limb wearable computing device based, at least in part, on the gesture indicative data provided by the one or more functional devices. For instance, the application execution controlling module 526 of the limb wearable computing device 10* of FIG. 4A or 4B controlling the execution of the one or more applications of the limb wearable computing device 10* by controlling or directing execution of one or more productivity applications (e.g., word processing application, spreadsheet application, and so forth) of the limb wearable computing device 10* based, at least in part, on the gesture indicative data 87* provided by the one or more functional devices 20*.

In the same or alternative implementations, operation 1050 may additionally or alternatively include an operation 1056 for controlling the execution of the one or more applications of the limb wearable computing device by controlling execution of at least one of a chronometer application, a calendar application, or a personal information manager application of the limb wearable computing device based, at least in part, on the gesture indicative data provided by the one or more functional devices. For instance, the application execution controlling module 526 of the limb wearable computing device 10* of FIG. 4A or 4B controlling the execution of the one or more applications of the limb wearable computing device 10* by controlling or directing execution of at least one of a chronometer application, a calendar application, or a personal information manager application (e.g., Microsoft Outlook) of the limb wearable computing device 10* based, at least in part, on the gesture indicative data 87* provided by the one or more functional devices 20*.

Figure 10C:
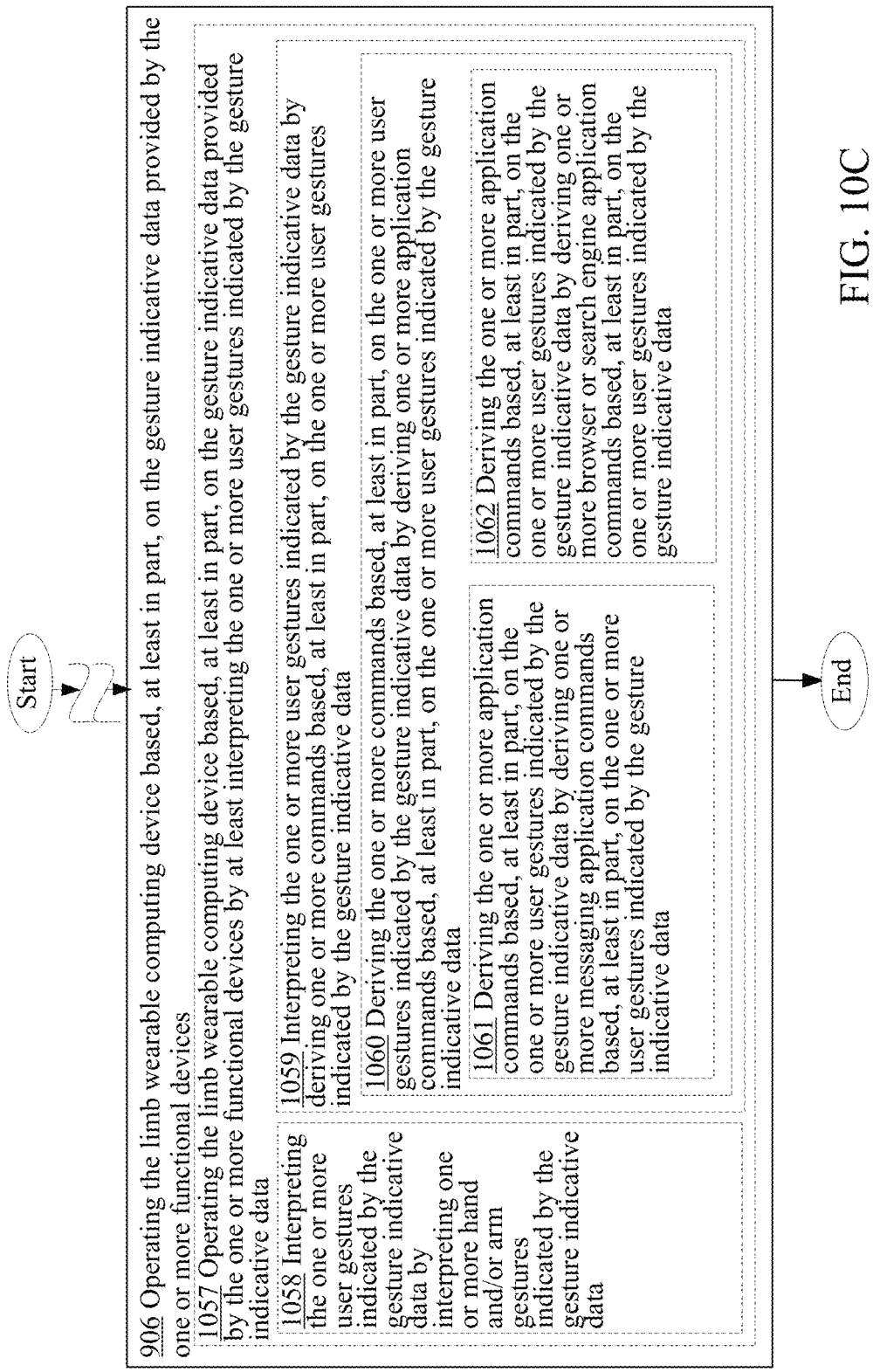
FIG. 10C is a high-level logic flowchart of a process depicting alternate implementations of the device operating operation 906 of FIG. 9.

Referring now to FIG. 10C, in some implementations, the device operating operation 906 may include or involve an operation 1057 for operating the limb wearable computing device based, at least in part, on the gesture indicative data provided by the one or more functional devices by at least interpreting the one or more user gestures indicated by the gesture indicative data. For instance, the device operating module 106* including the gesture interpreting module 530 (see FIG. 5C) of the limb wearable computing device 10* of FIG. 4A or 4B operating the limb wearable computing device 10* based, at least in part, on the gesture indicative data 87* provided by the one or more functional devices 20* by having the gesture interpreting module 530 at least interpret the one or more user gestures indicated by the gesture indicative data 87*.

As further illustrated in FIG. 10C, in various implementations, operation 1057 may further include one or more additional operations including, in some cases, an operation 1058 for interpreting the one or more user gestures indicated by the gesture indicative data by interpreting one or more hand and/or arm gestures indicated by the gesture indicative data. For instance, the gesture interpreting module 530 of the limb wearable computing device 10* of FIG. 4A or 4B interpreting the one or more user gestures indicated by the gesture indicative data 87* by interpreting (e.g., decipher or translate) one or more hand and/or arm gestures indicated by the gesture indicative data 87*.

In the same or alternative implementations, operation 1057 may additionally or alternatively include an operation 1059 for interpreting the one or more user gestures indicated by the gesture indicative data by deriving one or more commands based, at least in part, on the one or more user gestures indicated by the gesture indicative data. For instance, the gesture interpreting module 530 including the command deriving module 532 (see FIG. 5C) of the limb wearable computing device 10* of FIG. 4A or 4B interpreting the one or more user gestures indicated by the gesture indicative data 87* by having the command deriving module 532 derive or determine one or more commands (e.g., requests) based, at least in part, on the one or more user gestures indicated by the gesture indicative data 87*.

In some implementations, operation 1059 may further include or involve an operation 1060 for deriving the one or more commands based, at least in part, on the one or more user gestures indicated by the gesture indicative data by deriving one or more application commands based, at least in part, on the one or more user gestures indicated by the gesture indicative data. For instance, the command deriving module 532 of the limb wearable computing device 10* of FIG. 4A or 4B deriving the one or more commands based, at least in part, on the one or more user gestures indicated by the gesture indicative data 87* by deriving or determining one or more application commands (e.g., operation system (OS) commands, application activation commands, etc.) based, at least in part, on the one or more user gestures indicated by the gesture indicative data 87*.

In some implementations, operation 1060 may further include an operation 1061 for deriving the one or more application commands based, at least in part, on the one or more user gestures indicated by the gesture indicative data by deriving one or more messaging application commands based, at least in part, on the one or more user gestures indicated by the gesture indicative data. For instance, the command deriving module 532 of the limb wearable computing device 10* of FIG. 4A or 4B deriving the one or more application commands based, at least in part, on the one or more user gestures indicated by the gesture indicative data 87* by deriving one or more messaging application commands (e.g., commands associated with an email application, instant messaging application, and/or other messaging applications) based, at least in part, on the one or more user gestures indicated by the gesture indicative data 87*.

In some implementations, operation 1060 may additionally or alternatively include an operation 1062 for deriving the one or more application commands based, at least in part, on the one or more user gestures indicated by the gesture indicative data by deriving one or more browser or search engine application commands based, at least in part, on the one or more user gestures indicated by the gesture indicative data. For instance, the command deriving module 532 of the limb wearable computing device 10* of FIG. 4A or 4B deriving the one or more application commands based, at least in part, on the one or more user gestures indicated by the gesture indicative data 87* by deriving or determining one or more browser or search engine application commands based, at least in part, on the one or more user gestures indicated by the gesture indicative data 87*.

Figure 10D:
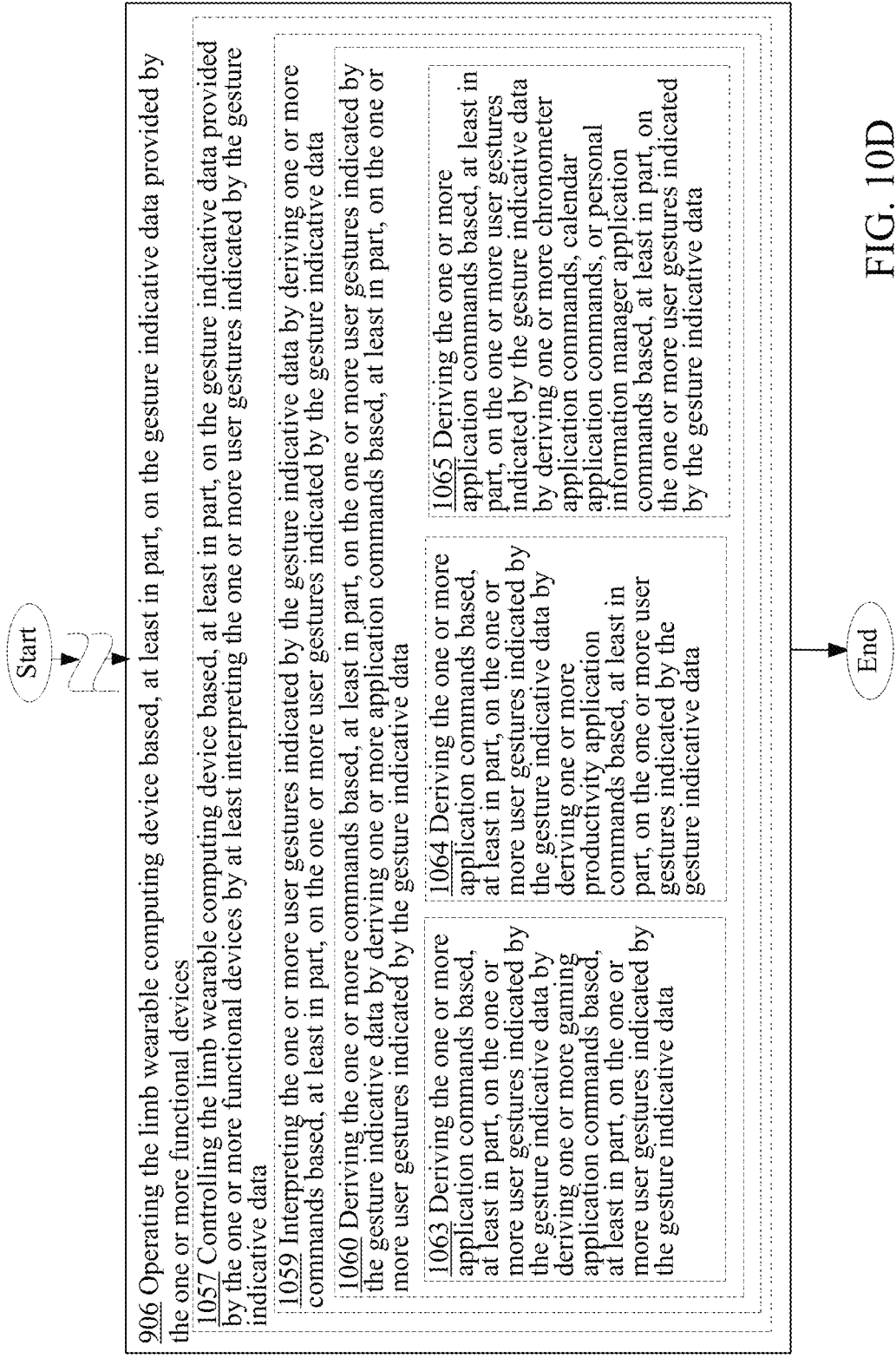
FIG. 10D is a high-level logic flowchart of a process depicting alternate implementations of the device operating operation 906 of FIG. 9.

Referring to FIG. 10D, in some implementations, operation 1060 may additionally or alternatively include an operation 1063 for deriving the one or more application commands based, at least in part, on the one or more user gestures indicated by the gesture indicative data by deriving one or more gaming application commands based, at least in part, on the one or more user gestures indicated by the gesture indicative data. For instance, the command deriving module 532 of the limb wearable computing device 10* of FIG. 4A or 4B deriving the one or more application commands based, at least in part, on the one or more user gestures indicated by the gesture indicative data 87* by deriving or determining one or more gaming application commands based, at least in part, on the one or more user gestures indicated by the gesture indicative data 87*.

In some implementations, operation 1060 may additionally or alternatively include an operation 1064 for deriving the one or more application commands based, at least in part, on the one or more user gestures indicated by the gesture indicative data by deriving one or more productivity application commands based, at least in part, on the one or more user gestures indicated by the gesture indicative data. For instance, the command deriving module 532 of the limb wearable computing device 10* of FIG. 4A or 4B deriving the one or more application commands based, at least in part, on the one or more user gestures indicated by the gesture indicative data 87* by deriving one or more productivity application commands based, at least in part, on the one or more user gestures indicated by the gesture indicative data 87*.

In some implementations, operation 1060 may additionally or alternatively include an operation 1065 for deriving the one or more application commands based, at least in part, on the one or more user gestures indicated by the gesture indicative data by deriving one or more chronometer application commands, calendar application commands, or personal information manager application commands based, at least in part, on the one or more user gestures indicated by the gesture indicative data. For instance, the command deriving module 532 of the limb wearable computing device 10* of FIG. 4A or 4B deriving the one or more application commands based, at least in part, on the one or more user gestures indicated by the gesture indicative data 87* by deriving one or more chronometer application commands, calendar application commands, or personal information manager application commands based, at least in part, on the one or more user gestures indicated by the gesture indicative data 87*.

Figure 10E:
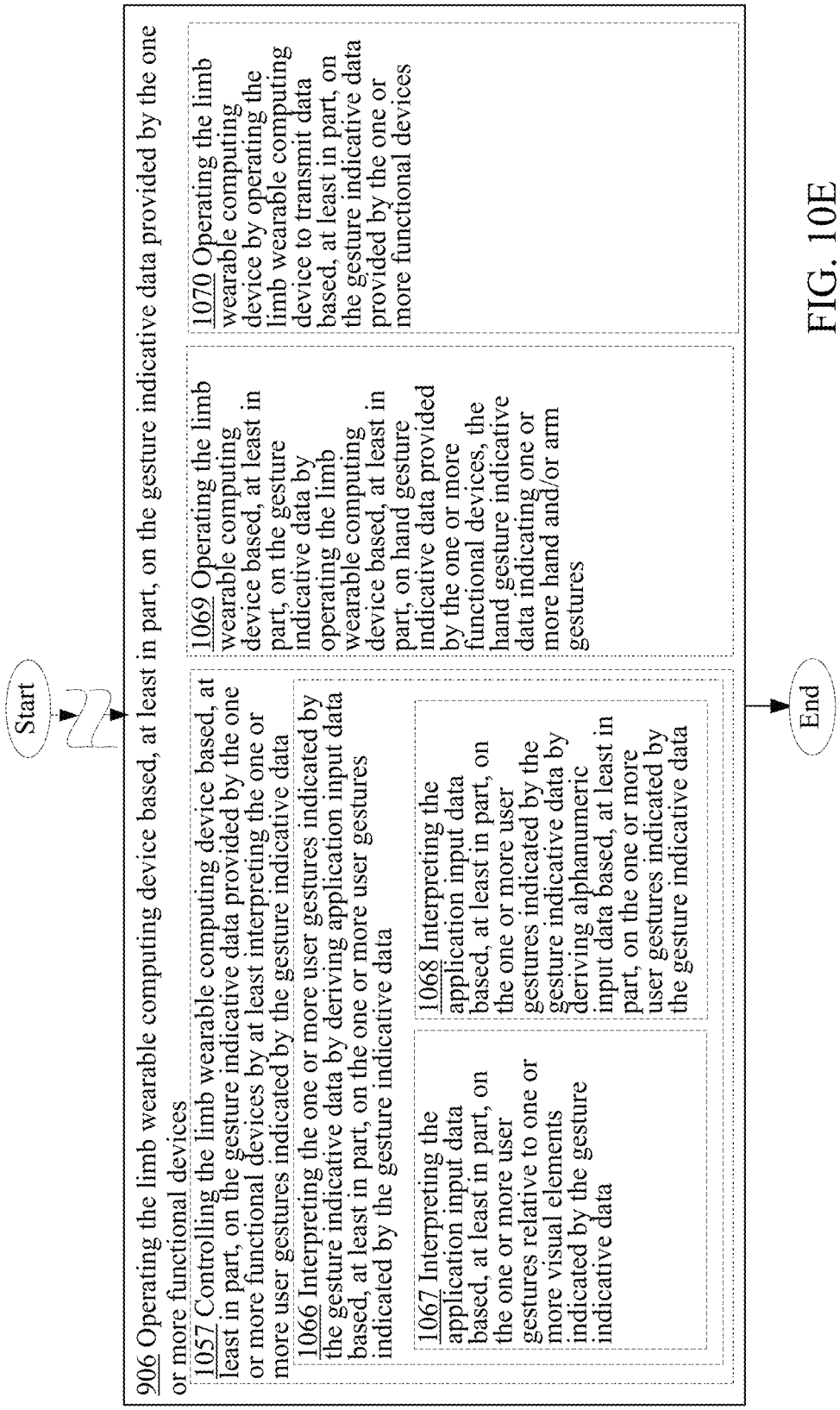
FIG. 10E is a high-level logic flowchart of a process depicting alternate implementations of the device operating operation 906 of FIG. 9.

Referring now to FIG. 10E, in some implementations, the operation 1057 for operating the limb wearable computing device based, at least in part, on the gesture indicative data provided by the one or more functional devices by at least interpreting the one or more user gestures indicated by the gesture indicative data may actually include or involve an operation 1066 for interpreting the one or more user gestures indicated by the gesture indicative data by deriving application input data based, at least in part, on the one or more user gestures indicated by the gesture indicative data. For instance, the gesture interpreting module 530 including the input data deriving module 534 (see FIG. 5C) of the limb wearable computing device 10* of FIG. 4A or 4B interpreting the one or more user gestures indicated by the gesture indicative data 87* by having the input data deriving module 534 derive or determine application input data (e.g., textual message for an email application or a search term for a search engine application) based, at least in part, on the one or more user gestures indicated by the gesture indicative data 87*.

In some cases, operation 1066 may, in turn, further include an operation 1067 for deriving the application input data based, at least in part, on the one or more user gestures relative to one or more visual elements indicated by the gesture indicative data. For instance, the input data deriving module 534 of the limb wearable computing device 10* of FIG. 4A or 4B deriving the application input data based, at least in part, on the one or more user gestures relative to one or more visual elements (e.g., virtual keys 315 of a virtual keyboard 314 of FIG. 3D) indicated by the gesture indicative data 87*.

In some implementations, operation 1066 may additionally or alternatively include an operation 1068 for deriving the application input data based, at least in part, on the one or more user gestures indicated by the gesture indicative data by deriving alphanumeric input data based, at least in part, on the one or more user gestures indicated by the gesture indicative data. For instance, the input data deriving module 534 including the alphanumeric input data deriving module 536 (see FIG. 5C) of the limb wearable computing device 10* of FIG. 4A or 4B deriving the application input data based, at least in part, on the one or more user gestures indicated by the gesture indicative data 87* by having the alphanumeric input data deriving module 536 derive or determine alphanumeric input data based, at least in part, on the one or more user gestures indicated by the gesture indicative data 87*.

In some implementations, the device operating operation 906 may include or involve an operation 1069 for operating the limb wearable computing device based, at least in part, on the gesture indicative data by operating the limb wearable computing device based, at least in part, on hand gesture indicative data provided by the one or more functional devices, the hand gesture indicative data indicating one or more hand and/or arm gestures For instance, the device operating module 106* of the limb wearable computing device 10* of FIG. 4A or 4B operating the limb wearable computing device 10* based, at least in part, on the gesture indicative data 87* by operating or directing the limb wearable computing device 10* based, at least in part, on hand gesture indicative data (e.g., gesture indicative data 87*) provided by the one or more functional devices 20*, the hand gesture indicative data indicating one or more hand and/or arm gestures.

In some implementations, the device operating operation 906 may include or involve an operation 1070 for operating the limb wearable computing device by operating the limb wearable computing device to transmit data based, at least in part, on the gesture indicative data provided by the one or more functional devices. For instance, the device operating module 106\* including the device transmit operating module 538 (see FIG. 5C) of the limb wearable computing device 10\* of FIG. 4A or 4B operating the limb wearable computing device 10\* by having the device transmit operating module 538 operate or direct the limb wearable computing device 10\* to transmit data (e.g., electronic message such as an email) based, at least in part, on the gesture indicative data 87\* provided by the one or more functional devices 20\*.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
a functional device soliciting module configured to solicit, to provide to a limb wearable computing device that is designed to be worn around a limb of a user, gesture indicative data that is indicative of one or more user gestures from one or more functional devices that are within the communication range of the limb wearable computing device, the communication range of the limb wearable computing device being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary;
a gesture indicative data receive facilitating module configured to facilitate the limb wearable computing device to receive the gesture indicative data from the one or more functional devices; and
a device operating module configured to operate the limb wearable computing device based, at least in part, on the gesture indicative data provided by the one or more functional devices.

2. The system of claim 1, wherein said functional device soliciting module configured to solicit, to provide to a limb wearable computing device that is designed to be worn around a limb of a user, gesture indicative data that is indicative of one or more user gestures from one or more functional devices that are within the communication range of the limb wearable computing device, the communication range of the limb wearable computing device being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary comprises:
a low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device the gesture indicative data.

3. The system of claim 2, wherein said low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device the gesture indicative data comprises:
a low-power solicitation signal transmit directing module configured to direct the limb wearable computing device to transmit to the one or more functional devices the one or more low-power solicitation signals having one or more frequencies from a frequency band having a frequency range between 57 GHz and 64 GHz.

4. The system of claim 2, wherein said low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device the gesture indicative data comprises:
a low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide the gesture indicative data that is indicative of one or more user gestures.

5. The system of claim 4, wherein said low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide the gesture indicative data that is indicative of one or more user gestures comprises:
a low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data that is indicative of one or more user hand and/or arm gestures.

6. The system of claim 5, wherein said low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data that is indicative of one or more user hand and/or arm gestures comprises:
a low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data in the form of one or more images of one or more user hand and/or arm gestures.

7. The system of claim 5, wherein said low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data that is indicative of one or more user hand and/or arm gestures comprises:
  a low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device one or more confirmations via one or more confirmation signals that confirm that the one or more functional devices can provide gesture indicative data that indicates electrical activities of one or more user muscles and/or tendons that are indicative of one or more user hand and/or arm gestures.

8. The system of claim 2, wherein said low-power solicitation signal transmit directing module configured to direct the limb wearable computing device to transmit to the one or more functional devices one or more low-power solicitation signals that when detected by the one or more functional devices causes the one or more functional devices to transmit to the limb wearable computing device the gesture indicative data comprises:
  a low-power solicitation signal transmit directing module configured to direct the limb wearable computing device to transmit to the one or more functional devices one or more low-power solicitation signals that request the one or more functional devices to provide at least access to data collected through one or more sensors of the one or more functional devices.

9. The system of claim 8, wherein said low-power solicitation signal transmit directing module configured to direct the limb wearable computing device to transmit to the one or more functional devices one or more low-power solicitation signals that request the one or more functional devices to provide at least access to data collected through one or more sensors of the one or more functional devices comprises:
  a low-power solicitation signal transmit directing module configured to direct the limb wearable computing device to transmit to the one or more functional devices one or more low-power solicitation signals that request the one or more functional devices to provide at least access to data collected through a combination of different types of sensors of the one or more functional devices including at least one image sensor and at least one electrical activity sensor.

10. The system of claim 1, wherein said functional device soliciting module configured to solicit, to provide to a limb wearable computing device that is designed to be worn around a limb of a user, gesture indicative data that is indicative of one or more user gestures from one or more functional devices that are within the communication range of the limb wearable computing device, the communication range of the limb wearable computing device being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary comprises:
  a GUI data transmit directing module configured to direct the limb wearable computing device to transmit to at least one of the one or more functional devices one or more low-power signals embodying data for generating, by the at least one of the one or more functional devices when the at least one of the one or more functional devices receives the one or more low-power signals, one or more graphical user interfaces (GUIs).

11. The system of claim 10, wherein GUI data transmit directing module configured to direct the limb wearable computing device to transmit to at least one of the one or more functional devices one or more low-power signals embodying data for generating, by the at least one of the one or more functional devices when the at least one of the one or more functional devices receives the one or more low-power signals, one or more graphical user interfaces (GUIs) comprises:
  a GUI data transmit directing module configured to direct the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that includes one or more components that are selectable by a user via one or more user gestures.

12. The system of claim 11, wherein said GUI data transmit directing module configured to direct the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that includes one or more components that are selectable by a user via one or more user gestures comprises:
  a GUI data transmit directing module configured to direct the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that includes one or more components that are selectable by a user via one or more user gestures, each of the one or more components being one or more selectable components for selecting for execution one or more corresponding applications.

13. The system of claim 11, wherein said GUI data transmit directing module configured to direct the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that includes one or more components that are selectable by a user via one or more user gestures comprises:
  a GUI data transmit directing module configured to direct the limb wearable computing device to transmit to at least one of the one or more functional devices one or more low-power signals embodying data for generating, by the at least one of the one or more functional devices when the at least one of the one or more functional devices receives the one or more low-power signals, one or more GUIs that include at least one virtual keyboard for entering input data.

14. The system of claim 1, wherein said functional device soliciting module configured to solicit, to provide to a limb wearable computing device that is designed to be worn around a limb of a user, gesture indicative data that is indicative of one or more user gestures from one or more functional devices that are within the communication range of the limb wearable computing device, the communication range of the limb wearable computing device being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary comprises:
a nearby verifying module configured to verify that the one or more functional devices are within the communication range of the limb wearable computing device.

15. The system of claim 14, wherein said nearby verifying module configured to verify that the one or more functional devices are within the communication range of the limb wearable computing device comprises:
a nearby verifying module configured to verify that the one or more functional devices are within the communication range of the limb wearable computing device based, at least in part, on one or more signals transmitted by the one or more functional devices and received by the limb wearable computing device.

16. The system of claim 15, wherein said nearby verifying module configured to verify that the one or more functional devices are within the communication range of the limb wearable computing device based, at least in part, on one or more signals transmitted by the one or more functional devices and received by the limb wearable computing device comprises:
a beacon signal detection directing module configured to direct the limb wearable computing device to detect one or more beacon signals transmitted by the one or more functional devices and verifying that the one or more beacon signals upon being detected by the limb wearable computing device having one or more signal strengths that are greater than predefined amount of signal strength.

17. The system of claim 1, wherein said gesture indicative data receive facilitating module configured to facilitate the limb wearable computing device to receive the gesture indicative data from the one or more functional devices comprises:
a data receive component directing module configured to direct one or more components of the limb wearable computing device to receive one or more data signals embodying the gesture indicative data from the one or more functional devices.

18. The system of claim 17, wherein said data receive component directing module configured to direct one or more components of the limb wearable computing device to receive one or more data signals embodying the gesture indicative data from the one or more functional devices comprises:
a directional antenna pointing module configured to point a directional antenna of the limb wearable computing device towards the one or more functional devices in order to receive the one or more data signals from the one or more functional devices.

19. The system of claim 1, wherein said gesture indicative data receive facilitating module configured to facilitate the limb wearable computing device to receive the gesture indicative data from the one or more functional devices comprises:
an image receive facilitating module configured to facilitate the limb wearable computing device to receive from the one or more functional devices one or more images of one or more user gestures.

20. The system of claim 19, wherein said image receive facilitating module configured to facilitate the limb wearable computing device to receive from the one or more functional devices one or more images of one or more user gestures comprises:
an image receive facilitating module configured to facilitate the limb wearable computing device to receive from the one or more functional devices one or more images of one or more user hand and/or arm gestures.

21. The system of claim 20, wherein said image receive facilitating module configured to facilitate the limb wearable computing device to receive from the one or more functional devices one or more images of one or more user hand and/or arm gestures comprises:
an image receive facilitating module configured to facilitate the limb wearable computing device to receive from the one or more functional devices one or more images of one or more user hand and/or arm gestures relative to one or more visual elements.

22. The system of claim 21, wherein said image receive facilitating module configured to facilitate the limb wearable computing device to receive from the one or more functional devices one or more images of one or more user hand and/or arm gestures relative to one or more visual elements comprises:
an image receive facilitating module configured to facilitate the limb wearable computing device to receive from the one or more functional devices one or more images of one or more user hand and/or arm gestures relative to one or more virtual elements that were displayed through at least one of the one or more functional devices.

23. The system of claim 1, wherein said gesture indicative data receive facilitating module configured to facilitate the limb wearable computing device to receive the gesture indicative data from the one or more functional devices comprises:
a motion data receive facilitating module configured to facilitate the limb wearable computing device to receive from the one or more functional devices motion data indicative of user movements related to one or more user gestures.

24. The system of claim 1, wherein said gesture indicative data receive facilitating module configured to facilitate the limb wearable computing device to receive the gesture indicative data from the one or more functional devices comprises:
an electrical activity data receive facilitating module configured to facilitate the limb wearable computing device to receive from the one or more functional devices electrical activity data indicating one or more electrical activities of one or more user muscles and/or tendons that are associated with one or more user hand and/or arm gestures.

25. The system of claim 1, wherein said gesture indicative data receive facilitating module configured to facilitate the limb wearable computing device to receive the gesture indicative data from the one or more functional devices comprises:
a gesture indicative data receive facilitating module configured to facilitate the limb wearable computing device to receive the gesture indicative data from at least one wearable computing device.

26. The system of claim 25, wherein said gesture indicative data receive facilitating module configured to facilitate the limb wearable computing device to receive the gesture indicative data from at least one wearable computing device comprises:
a gesture indicative data receive facilitating module configured to facilitate the limb wearable computing device to receive the gesture indicative data from at least one wearable computing device being worn by a user wearing the limb wearable computing device.

27. The system of claim 1, wherein said device operating module configured to operate the limb wearable computing device based, at least in part, on the gesture indicative data provided by the one or more functional devices comprises:
a device display control module configured to control what is being presented through a display of the limb wearable computing device based, at least in part, on the gesture indicative data provided by the one or more functional devices.

28. The system of claim 1, wherein said device operating module configured to operate the limb wearable computing device based, at least in part, on the gesture indicative data provided by the one or more functional devices comprises:
an application execution controlling module configured to control execution of one or more applications of the limb wearable computing device based, at least in part, on the gesture indicative data provided by the one or more functional devices.

29. The system of claim 1, wherein said device operating module configured to operate the limb wearable computing device based, at least in part, on the gesture indicative data provided by the one or more functional devices comprises:
a gesture interpreting module configured to interpret the one or more user gestures indicated by the gesture indicative data.

30. The system of claim 29, wherein said gesture interpreting module configured to interpret the one or more user gestures indicated by the gesture indicative data comprises:
a gesture interpreting module configured to interpret one or more hand and/or arm gestures indicated by the gesture indicative data.

31. The system of claim 29, wherein said gesture interpreting module configured to interpret the one or more user gestures indicated by the gesture indicative data comprises:
a command deriving module configured to derive one or more commands based, at least in part, on the one or more user gestures indicated by the gesture indicative data.

32. The system of claim 31, wherein said command deriving module configured to derive one or more commands based, at least in part, on the one or more user gestures indicated by the gesture indicative data comprises:
a command deriving module configured to derive one or more application commands based, at least in part, on the one or more user gestures indicated by the gesture indicative data.

33. The system of claim 32, wherein said command deriving module configured to derive one or more application commands based, at least in part, on the one or more user gestures indicated by the gesture indicative data comprises:
a command deriving module configured to derive one or more chronometer application commands, calendar application commands, or personal information manager application commands based, at least in part, on the one or more user gestures indicated by the gesture indicative data.

34. The system of claim 29, wherein said gesture interpreting module configured to interpret the one or more user gestures indicated by the gesture indicative data comprises:
an input data deriving module configured to derive application input data based, at least in part, on the one or more user gestures indicated by the gesture indicative data.

35. The system of claim 34, wherein said input data deriving module configured to derive application input data based, at least in part, on the one or more user gestures indicated by the gesture indicative data comprises:
an alphanumeric input data deriving module configured to derive alphanumeric input data based, at least in part, on the one or more user gestures indicated by the gesture indicative data.

36. The system of claim 1, wherein said device operating module configured to operate the limb wearable computing device based, at least in part, on the gesture indicative data provided by the one or more functional devices comprises:
a device operating module configured to operate the limb wearable computing device based, at least in part, on hand gesture indicative data provided by the one or more functional devices, the hand gesture indicative data indicating one or more hand and/or arm gestures.

37. The system of claim 1, wherein said device operating module configured to operate the limb wearable computing device based, at least in part, on the gesture indicative data provided by the one or more functional devices comprises:
a device transmit operating module configured to operate the limb wearable computing device to transmit data based, at least in part, on the gesture indicative data provided by the one or more functional devices.

38. An article of manufacture, comprising:
a non-transitory storage medium bearing:
one or more instructions for soliciting, to provide to a limb wearable computing device that is designed to be worn around a limb of a user, gesture indicative data that is indicative of one or more user gestures from one or more functional devices that are within the communication range of the limb wearable computing device, the communication range of the limb wearable computing device being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary;
one or more instructions for facilitating the limb wearable computing device to receive the gesture indicative data from the one or more functional devices; and
one or more instructions for operating the limb wearable computing device based, at least in part, on the gesture indicative data provided by the one or more functional devices.

39. A limb wearable computing device designed to be worn by a person, comprising:
a functional device soliciting module configured to solicit, to provide to a limb wearable computing device that is designed to be worn around a limb of a user, gesture indicative data that is indicative of one or more user gestures from one or more functional devices that are within the communication range of the limb wearable computing device, the communication range of the limb wearable computing device being a spatial volume that includes the limb wearable computing device and being externally defined by an enveloping boundary, where low-power signals transmitted by the limb wearable computing device being discernible over background noise within the enveloping boundary and not discernible over background noise outside the enveloping boundary;
a gesture indicative data receive facilitating module configured to facilitate the limb wearable computing device to receive the gesture indicative data from the one or more functional devices;

a device operating module configured to operate the limb wearable computing device based, at least in part, on the gesture indicative data provided by the one or more functional devices; and one or more components for facilitating the limb wearable computing device to couple to a limb of the person.

* * * * *

UNITED STATES PATENT AND TRADEMARK OFFICE
CERTIFICATE OF CORRECTION

| | | |
|---|---|---|
| PATENT NO. | : 9,219,975 B2 | Page 1 of 1 |
| APPLICATION NO. | : 14/072207 | |
| DATED | : December 22, 2015 | |
| INVENTOR(S) | : Pablos Holman et al. | |

It is certified that error appears in the above-identified patent and that said Letters Patent is hereby corrected as shown below:

On the title page at item (54) please replace:

"...SYSTEMS AND METHODS FOR RECEIVING GESTURE INDICATIVE DATA AT A LIMB WEARABLE..."

with --...SYSTEMS AND METHODS FOR RECEIVING GESTURE INDICATIVE DATA AT A LIMB WEARABLE COMPUTING DEVICE...--

Signed and Sealed this
Tenth Day of May, 2016

Michelle K. Lee
*Director of the United States Patent and Trademark Office*